United States Patent
Song et al.

(10) Patent No.: US 12,480,098 B1
(45) Date of Patent: Nov. 25, 2025

(54) ADENO-ASSOCIATED VIRUS VARIANT

(71) Applicant: Aavatar Therapeutics Co., Ltd., Gyeonggi-do (KR)

(72) Inventors: Dong Woo Song, Seoul (KR); Hyekyung Oh, Seoul (KR)

(73) Assignee: AAVATAR THERAPEUTICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/052,822

(22) Filed: Feb. 13, 2025

Related U.S. Application Data

(63) Continuation of application No. PCT/KR2024/015929, filed on Oct. 18, 2024.

(51) Int. Cl.
*C12N 7/00* (2006.01)
*C07K 14/005* (2006.01)

(52) U.S. Cl.
CPC .............. *C12N 7/00* (2013.01); *C07K 14/005* (2013.01); *C12N 2750/14121* (2013.01); *C12N 2750/14122* (2013.01)

(58) Field of Classification Search
None
See application file for complete search history.

(56) References Cited

U.S. PATENT DOCUMENTS

| | | | |
|---|---|---|---|
| 6,498,244 B1 | 12/2002 | Patel et al. | |
| 11,028,131 B2 | 6/2021 | Okada et al. | |
| 2013/0310443 A1* | 11/2013 | Srivastava | A61P 35/00 435/320.1 |
| 2022/0280655 A1* | 9/2022 | Zucman-Rossi | A61K 48/005 |
| 2022/0372512 A1* | 11/2022 | Lisowski | C07K 14/005 |

FOREIGN PATENT DOCUMENTS

| | | | | |
|---|---|---|---|---|
| CN | 116063404 A | * | 5/2023 | ........... C07K 14/005 |
| CN | 118027157 A | * | 5/2024 | ......... A61K 48/0075 |
| CN | 118546217 A | * | 8/2024 | ......... A01K 67/0278 |
| KR | 10-2019-0111966 A | | 10/2019 | |
| KR | 10-2020-0088853 A | | 7/2020 | |
| KR | 10-2022-0004114 A | | 1/2022 | |
| KR | 10-2024-0045198 A | | 4/2024 | |
| WO | WO-2008027084 A2 | * | 3/2008 | .............. A61P 31/12 |
| WO | 2019104279 A1 | | 5/2019 | |
| WO | WO-2019221992 A1 | * | 11/2019 | ........... C07K 14/005 |
| WO | 2020219933 A1 | | 10/2020 | |
| WO | WO-2021000024 A1 | * | 1/2021 | .............. C12N 15/86 |
| WO | 2021-030764 A1 | | 2/2021 | |
| WO | 2021-092298 A1 | | 5/2021 | |
| WO | WO-2022126189 A1 | * | 6/2022 | .............. C12N 7/00 |
| WO | 2022/256557 A1 | | 12/2022 | |

OTHER PUBLICATIONS

Office Action of KR 10-2024-0142842 issued on Jan. 7, 2025.
Internation Search Report of PCT-KR2024-015929 issued on Jul. 10, 2025.
Written Opinion of PCT-KR2024-015929 issued on Jul. 10, 2025.

* cited by examiner

*Primary Examiner* — Benjamin P Blumel
*Assistant Examiner* — Jeffrey Mark Sifford
(74) *Attorney, Agent, or Firm* — Harness, Dickey & Pierce, P.L.C.

(57) ABSTRACT

The present disclosure relates to an AAV variant, for example, an AAV2 variant. An AAV variant according to some embodiments of the present disclosure comprises a VP1 variant comprising having any one amino acid sequence selected from SEQ ID NOS: 02 to 31.

18 Claims, 4 Drawing Sheets
Specification includes a Sequence Listing.

ADENO-ASSOCIATED VIRUS VARIANT

CROSS-REFERENCE TO RELATED APPLICATIONS

This application is a continuation application of PCT Application No. PCT/KR2024/015929, filed on 18 Oct. 2024. The entire disclosures of the applications identified in this paragraph are incorporated herein by references.

SEQUENCE LISTING

This application contains references to amino acid sequences and/or nucleic acid sequences which have been submitted concurrently herewith as the sequence listing XML file entitled "000098uscoa_SequenceListing.XML", file size 229,707 bytes, created on 30 Jan. 2025. The aforementioned sequence listing is hereby incorporated by reference in its entirety pursuant to 37 C.F.R. § 1.52(e)(5).

FIELD

The present disclosure relates to a variant of an adeno-associated virus and a use thereof. Some embodiments of the present disclosure provide an AAV2 variant comprising a capsid variant.

BACKGROUND

Adeno-associated virus (AAV) is a small, single-stranded DNA-containing virus that belongs to the Parvoviridae family. AAV is classified as a non-enveloped virus. AAV comprises a capsid comprising three viral proteins (for example, VP1, VP2, and VP3) and single-stranded DNA, and the single-stranded DNA is packaged in the capsid. Since wild-type AAVs possess wide tissue tropism and low pathogenicity, recombinant AAV vectors (rAAVs) are now the preferred vehicles for therapeutic gene delivery. To date, the FDA has approved a number of AAV therapeutics. Among these approved AAV therapeutics, Luxturna™ is a therapeutic agent for treating RPE65-related retinal dystrophy using AAV serotype 2 (AAV2). Despite these successes, the development of new AAV variants with high transduction efficiency into retinal cells remains crucial for wider clinical application and is also in high demand in the market. Literature related to AAV variants and their development comprises International Patent Application Publication No. PCT/US2020/059294.

SUMMARY

Technical Problem

The development of novel AAV variants is important and also in high demand in the market. A technical problem of the present disclosure is to provide a novel AAV variant. Furthermore, a technical problem of the present disclosure is to provide an AAV variant that has excellent delivery efficiency to a target site.

Technical Solution

The present disclosure provides a novel AAV variant. An AAV variant according to some embodiments of the present disclosure comprises an AAV capsid variant comprising VP1 (or a VP1 variant) having any one amino acid sequence of SEQ ID NOs: 02 to 31. The AAV variant of the present disclosure may have excellent delivery efficiency to a target site.

Effects

An AAV variant of the present disclosure has excellent delivery efficiency to a target site. For example, the AAV variant of the present disclosure has excellent delivery efficiency to a retina tissue or a RPE tissue.

DETAILED DESCRIPTION

Figure 1:
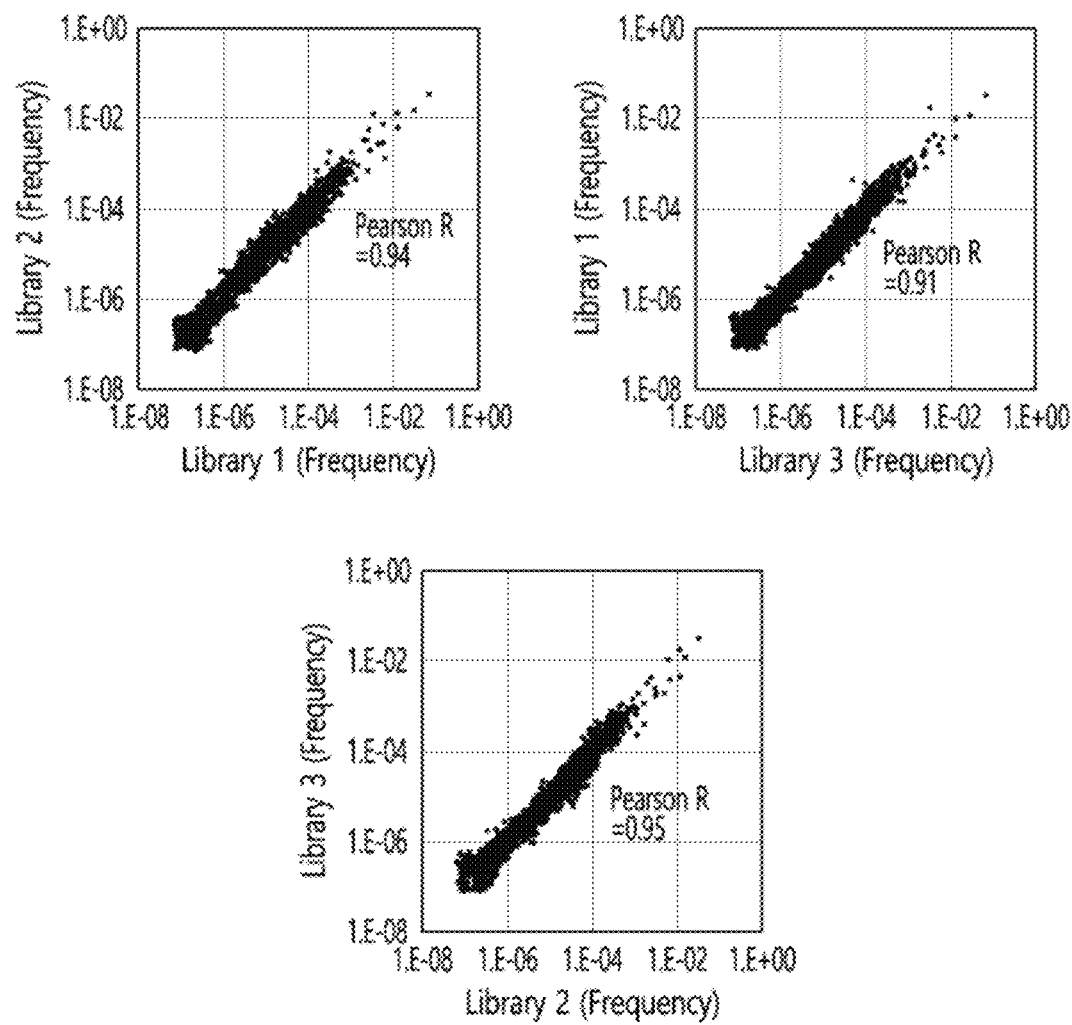
FIG. 1 illustrates the results of a correlation analysis of three biological replicates of an AAV library.

Some embodiments of the present application provide an AAV variant.

In some embodiments, the AAV variant comprises:

AAV capsid variant, wherein the AAV capsid variant comprises VP1 variant having amino acid sequence of SEQ ID NOs: 02 to 31.

In some embodiments, the AAV capsid variant is any one selected from:

the AAV capsid variant comprising the VP1 variant having an amino acid sequence of SEQ ID NO: 02, a VP2 variant having an amino acid sequence of SEQ ID NO: 33, and a VP3 variant having an amino acid sequence of SEQ ID NO: 64;

the AAV capsid variant comprising the VP1 variant having an amino acid sequence of SEQ ID NO: 03, a VP2 variant having an amino acid sequence of SEQ ID NO: 34, and a VP3 variant having an amino acid sequence of SEQ ID NO: 65;

the AAV capsid variant comprising the VP1 variant having an amino acid sequence of SEQ ID NO: 04, a VP2 variant having an amino acid sequence of SEQ ID NO: 35, and a VP3 variant having an amino acid sequence of SEQ ID NO: 66;

the AAV capsid variant comprising the VP1 variant having an amino acid sequence of SEQ ID NO: 05, a VP2 variant having an amino acid sequence of SEQ ID NO: 36, and a VP3 variant having an amino acid sequence of SEQ ID NO: 67;

the AAV capsid variant comprising the VP1 variant having an amino acid sequence of SEQ ID NO: 06, a VP2 variant having an amino acid sequence of SEQ ID NO: 37, and a VP3 variant having an amino acid sequence of SEQ ID NO: 68;

the AAV capsid variant comprising the VP1 variant having an amino acid sequence of SEQ ID NO: 07, a VP2 variant having an amino acid sequence of SEQ ID NO: 38, and a VP3 variant having an amino acid sequence of SEQ ID NO: 69;

the AAV capsid variant comprising the VP1 variant having an amino acid sequence of SEQ ID NO: 08, a VP2 variant having an amino acid sequence of SEQ ID NO: 39, and a VP3 variant having an amino acid sequence of SEQ ID NO: 70;

the AAV capsid variant comprising the VP1 variant having an amino acid sequence of SEQ ID NO: 09, a VP2 variant having an amino acid sequence of SEQ ID NO: 40, and a VP3 variant having an amino acid sequence of SEQ ID NO: 71;

the AAV capsid variant comprising the VP1 variant having an amino acid sequence of SEQ ID NO: 10, a VP2 variant having an amino acid sequence of SEQ ID NO: 41, and a VP3 variant having an amino acid sequence of SEQ ID NO: 72;

the AAV capsid variant comprising the VP1 variant having an amino acid sequence of SEQ ID NO: 11, a VP2 variant having an amino acid sequence of SEQ ID NO: 42, and a VP3 variant having an amino acid sequence of SEQ ID NO: 73;

the AAV capsid variant comprising the VP1 variant having an amino acid sequence of SEQ ID NO: 12, a VP2 variant having an amino acid sequence of SEQ ID NO: 43, and a VP3 variant having an amino acid sequence of SEQ ID NO: 74;

the AAV capsid variant comprising the VP1 variant having an amino acid sequence of SEQ ID NO: 13, a VP2 variant having an amino acid sequence of SEQ ID NO: 44, and a VP3 variant having an amino acid sequence of SEQ ID NO: 75;

the AAV capsid variant comprising the VP1 variant having an amino acid sequence of SEQ ID NO: 14, a VP2 variant having an amino acid sequence of SEQ ID NO: 45, and a VP3 variant having an amino acid sequence of SEQ ID NO: 76;

the AAV capsid variant comprising the VP1 variant having an amino acid sequence of SEQ ID NO: 15, a VP2 variant having an amino acid sequence of SEQ ID NO: 46, and a VP3 variant having an amino acid sequence of SEQ ID NO: 77;

the AAV capsid variant comprising the VP1 variant having an amino acid sequence of SEQ ID NO: 16, a VP2 variant having an amino acid sequence of SEQ ID NO: 47, and a VP3 variant having an amino acid sequence of SEQ ID NO: 78;

the AAV capsid variant comprising the VP1 variant having an amino acid sequence of SEQ ID NO: 17, a VP2 variant having an amino acid sequence of SEQ ID NO: 48, and a VP3 variant having an amino acid sequence of SEQ ID NO: 79;

the AAV capsid variant comprising the VP1 variant having an amino acid sequence of SEQ ID NO: 18, a VP2 variant having an amino acid sequence of SEQ ID NO: 49, and a VP3 variant having an amino acid sequence of SEQ ID NO: 80;

the AAV capsid variant comprising the VP1 variant having an amino acid sequence of SEQ ID NO: 19, a VP2 variant having an amino acid sequence of SEQ ID NO: 50, and a VP3 variant having an amino acid sequence of SEQ ID NO: 81;

the AAV capsid variant comprising the VP1 variant having an amino acid sequence of SEQ ID NO: 20, a VP2 variant having an amino acid sequence of SEQ ID NO: 51, and a VP3 variant having an amino acid sequence of SEQ ID NO: 82;

the AAV capsid variant comprising the VP1 variant having an amino acid sequence of SEQ ID NO: 21, a VP2 variant having an amino acid sequence of SEQ ID NO: 52, and a VP3 variant having an amino acid sequence of SEQ ID NO: 83;

the AAV capsid variant comprising the VP1 variant having an amino acid sequence of SEQ ID NO: 22, a VP2 variant having an amino acid sequence of SEQ ID NO: 53, and a VP3 variant having an amino acid sequence of SEQ ID NO: 84;

the AAV capsid variant comprising the VP1 variant having an amino acid sequence of SEQ ID NO: 23, a VP2 variant having an amino acid sequence of SEQ ID NO: 54, and a VP3 variant having an amino acid sequence of SEQ ID NO: 85;

the AAV capsid variant comprising the VP1 variant having an amino acid sequence of SEQ ID NO: 24, a VP2 variant having an amino acid sequence of SEQ ID NO: 55, and a VP3 variant having an amino acid sequence of SEQ ID NO: 86;

the AAV capsid variant comprising the VP1 variant having an amino acid sequence of SEQ ID NO: 25, a VP2 variant having an amino acid sequence of SEQ ID NO: 56, and a VP3 variant having an amino acid sequence of SEQ ID NO: 87;

the AAV capsid variant comprising the VP1 variant having an amino acid sequence of SEQ ID NO: 26, a VP2 variant having an amino acid sequence of SEQ ID NO: 57, and a VP3 variant having an amino acid sequence of SEQ ID NO: 88;

the AAV capsid variant comprising the VP1 variant having an amino acid sequence of SEQ ID NO: 27, a VP2 variant having an amino acid sequence of SEQ ID NO: 58, and a VP3 variant having an amino acid sequence of SEQ ID NO: 89;

the AAV capsid variant comprising the VP1 variant having an amino acid sequence of SEQ ID NO: 28, a VP2 variant having an amino acid sequence of SEQ ID NO: 59, and a VP3 variant having an amino acid sequence of SEQ ID NO: 90;

the AAV capsid variant comprising the VP1 variant having an amino acid sequence of SEQ ID NO: 29, a VP2 variant having an amino acid sequence of SEQ ID NO: 60, and a VP3 variant having an amino acid sequence of SEQ ID NO: 91;

the AAV capsid variant comprising the VP1 variant having an amino acid sequence of SEQ ID NO: 30, a VP2 variant having an amino acid sequence of SEQ ID NO: 61, and a VP3 variant having an amino acid sequence of SEQ ID NO: 92; and the AAV capsid variant comprising the VP1 variant having an amino acid sequence of SEQ ID NO: 31, a VP2 variant having an amino acid sequence of SEQ ID NO: 62, and a VP3 variant having an amino acid sequence of SEQ ID NO: 93.

In some embodiments, the AAV variants may further comprise a nucleic acid molecule, wherein the nucleic acid molecule may comprise a nucleic acid encoding a product of interest, wherein the nucleic acid molecule may be packaged in the AAV capsid variant.

In some embodiments, the nucleic acid molecule may further comprise a promoter, wherein the promoter may be operably linked to the nucleic acid encoding the product of interest. In some embodiments, the nucleic acid molecule may further comprise two ITRs, wherein the promoter and the nucleic acid encoding the product of interest may be located between the two ITRs.

In some embodiments, the nucleic acid molecule is a single-strand DNA.

An AAV variant of the present disclosure may have an enhanced ability for delivering to retinal pigment epithelium (RPE) tissue or RPE cell.

In some embodiments, the AAV capsid variant of the AAV variant may comprise the VP1 variant having an amino acid sequence selected from SEQ ID NOs: 10, 11, 15, 30, and 31, wherein the AAV variant may have an enhanced ability for delivering into RPE tissue or RPE cell when administered via intravitreal injection to a subject.

In some embodiments, the AAV capsid variant of the AAV variant may comprise VP1 variant having an amino acid sequence selected from SEQ ID NOs: 02 to 29, wherein the AAV variant may have an enhanced ability for delivering into RPE tissue or RPE cell when administered via subretinal injection to a subject.

In some embodiments, an AAV variant comprising the following is provided:
an AAV capsid variant,
  wherein the AAV capsid variant comprises VP1 variant having amino acid sequence selected from SEQ ID NOs: 10, 11, 15, 30, and 31,
  wherein the AAV variant has an enhanced ability for delivering into retinal pigment epithelium (RPE) tissue or RPE cell when administered via intravitreal injection to a subject.

In some embodiments, an AAV variant comprising the following is provided:
an AAV capsid variant,
  wherein the AAV capsid variant comprises VP1 variant having an amino acid sequence selected from SEQ ID NOs: 02 to 29,
  wherein the AAV variant has an enhanced ability for delivering into retinal pigment epithelium (RPE) tissue or RPE cell when administered via subretinal injection to a subject.

DETAILED DESCRIPTION

Hereinafter, the content of the invention disclosed in the present disclosure will be described in more detail through embodiments and examples. The invention disclosed by the present disclosure can be implemented in various forms, and is not limited to specific embodiments described herein.

A person with ordinary skill in the art to which the invention disclosed in the present disclosure pertains will be able to conceive of various modifications and other aspects of the content of the invention disclosed in the present disclosure. Therefore, it should be understood that the content of the invention disclosed in the present disclosure is not limited to the specific embodiments or examples described herein, and modifications thereof and other aspects are also comprised within the invention disclosed in the present disclosure.

DEFINITION OF TERMS

Unless otherwise described, all technical terms and scientific terms used in the present disclosure have the same meaning as commonly understood by those skilled in the art relevant to the present disclosure. All publications, patents, and other references mentioned in the present disclosure are incorporated by reference in their entities.

As used in the present disclosure, the term "about" refers to an amount, a level, a value, a number, a frequency, a percentage, a dimension, a size, a quantity, a weight, or a length that varies to the degree of 30, 25, 20, 15, 10, 9, 8, 7, 6, 5, 4, 3, 2, or 1% with respect to a reference amount, level, value, number, frequency, percentage, dimension, size, quantity, weight, or length.

As used in the present disclosure, term "treatment" refers to alleviating or relieving a disease, disorder, and/or symptom, and the like, and/or inhibiting the progression thereof, and encompasses all these meanings. For example, treatment may refer to the partial or complete reversal of a disease, disorder and/or symptom state to the normal state. For example, the treatment may refer to changes in condition in which symptoms are alleviated or beneficially changed, or to any action that causes symptoms to be alleviated or altered, by a composition of the present disclosure. In some cases, treatment may be construed to comprise prophylactic aspects.

As used in the present disclosure, the terms "protein," "peptide," and "polypeptide" are used interchangeably and encompass naturally occurring and non-naturally occurring proteins, and the like. The non-naturally occurring protein, or the like may be, for example, a recombinant protein, a synthetic protein, or the like. For example, a protein, peptide, or polypeptide may be naturally occurring, recombinant, or synthetic, or any combination thereof. For example, the protein, peptide, or polypeptide may be naturally occurring. For example, the protein, peptide, or polypeptide may be recombinant or synthetic, or a combination of recombinant or synthetic and naturally occurring.

As used in the present disclosure, the term "nucleic acid" encompasses naturally occurring and non-naturally occurring nucleic acids. A non-naturally occurring nucleic acid may be, for example, a recombinant nucleic acid or a synthetic nucleic acid. For example, a nucleic acid may be naturally occurring, recombinant, or synthetic, or any combination thereof. For example, the nucleic acid may be naturally occurring. For example, the nucleic acid may be recombinant or synthetic, or a combination of recombinant or synthetic and naturally occurring. In the present disclosure, the term nucleic acid may be used to refer to the molecule itself or a portion of the molecule. For example, the nucleic acid may refer to a DNA molecule or a portion thereof, or a partial region thereof. For example, the nucleic acid may refer to a RNA molecule or a portion thereof, or a partial region thereof. For example, the nucleic acid may refer to a DNA-RNA hybrid molecule or a portion thereof, or a partial region thereof. The nucleic acid may be RNA, DNA, or a DNA-RNA hybrid, but is not limited thereto.

Unless otherwise stated, the nucleic acid or nucleic acid sequence (for example, a DNA sequence, a RNA sequence, and a DNA/RNA hybrid sequence) disclosed in the present disclosure should be understood as being described in the 5' to 3' direction.

Unless otherwise stated, when describing the sequence of a peptide in the present disclosure, one-letter notation or three-letter notation of an amino acid is used, and it is described in the direction from the N-terminus to the C-terminus. For example, when expressed as RNVP, it refers to a peptide in which arginine, asparagine, valine, and proline are sequentially linked in the direction from the N-terminus to the C-terminus. As another example, when expressed as Thr-Leu-Lys, it refers to a peptide in which threonine, leucine, and lysine are sequentially linked in the direction from the N-terminus to the C-terminus. In the case of amino acids that cannot be represented by one-letter notation, other letters are used to describe these amino acids, and will be described via additional description.

In the present disclosure, the term "expression" as used in connection with a nucleic acid, gene, product, or protein, is used to encompass the process of using the information encoded in a nucleic acid or gene to produce a product, such as RNA and/or a protein.

Known Structure of AAV and Wild-Type AAV2 Capsid

The present section provides a description of AAV and AAV2 based on contents known in the art regarding AAV and AAV2 to facilitate understanding by those skilled in the art, and the contents of the present section do not limit the disclosure, comprising the aspects, embodiments, and examples of the present disclosure, and the like.

Adeno-associated virus (AAV) is known as a small virus that belongs to the Parvoviridae family. Wild-type AAV contains about 4.7 to 4.8 kilobases of single-stranded DNA, and the single-stranded DNA is packaged inside a capsid. A capsid of AAV is in the form of an icosahedron, and the AAV capsid comprises a total of 60 units of the VP1 capsid protein (also referred to as VP1 or VP1 subunit), the VP2 capsid protein (also referred to as VP2 or VP2 subunit), and the VP3 capsid protein (also referred to as VP3 or VP3 subunit). That is, the AAV capsid is known to comprise a total of 60 molecules of VPs. For example, the AAV capsid is known to be composed of 60 molecules of VPs. AAVs have been currently used widely in the field of gene therapy, with advantages over other viral vectors, comprising a lower toxicity and the accessibility of 150 or more naturally occurring genotypes and serotypes. These serotypes differ in their tropism, and thus may target most tissues and cell types for gene delivery. Recombinant AAVs (rAAVs), packaging a gene of interest (GOI), have been successfully studied in clinical trials for the treatment of a variety of genetic diseases. Representatively, Luxturna, Zolgensma, Glybera, and the like have been approved by the FDA and/or EMA. In the application of these AAVs, the GOI for treating a genetic disease replaces the natural AAV genome for delivery to tissues and/or cells. In addition, rAAV is one of the widely used research tools for transgenic gene expression in tissue culture and preclinical animal models. (see the literature [Wörner, T. P., Bennett, A., Habka, S., Snijder, J., Friese, O., Powers, T., . . . & Heck, A. J. (2021). Adeno-associated virus capsid assembly is divergent and stochastic. Nature Communications, 12 (1), 1642.], the contents of which are hereby incorporated in their entirety).

As described above, the AAV capsid is known to comprise a total of 60 molecules of VPs, comprising VP1, VP2, and VP3. In natural AAV, VP1, VP2, and VP3 are encoded by a cap open reading frame (ORF). The VPs are generated through alternative splicing of the mRNA and use of an alternate translational start codon. The sequence of VP3 is shared by all VPs and this shared sequence is referred to as the VP3 common region. VP2 is approximately 50aa to 70aa longer than VP3, and the VP2 N-terminal region is referred to as the VP1/VP2 common region. VP1 is known to be approximately 130 to 140 aa longer than VP2, and this region is referred to as the VP1 unique (VP1u) region. Furthermore, among the VPs in natural AAV, the ratio of VP1, VP2, and VP3 is known to be approximately 1:1:10. (see the literature [Wörner, T. P., Bennett, A., Habka, S., Snijder, J., Friese, O., Powers, T., . . . & Heck, A. J. (2021). Adeno-associated virus capsid assembly is divergent and stochastic. Nature Communications, 12 (1), 1642.]).

Meanwhile, there are 11 well-known AAV serotypes (AAV1 to AAV11). Among them, AAV2 (AAV serotype 2) has historically been the best characterized and is generally known to have appropriately safe and efficient packaging and delivery functions.

Wild-type AAV2 and the capsid proteins of the wild-type AAV2 capsid are well known in the art. Wild-type AAV2 VP1 (wild-type VP1) has an amino acid sequence of SEQ ID NO: 01. Wild-type AAV2 VP2 (wild-type VP2) has an amino acid sequence of SEQ ID NO: 32. Wild-type AAV2 VP3 (wild-type VP3) has an amino acid sequence of SEQ ID NO: 63.

In wild-type AAV2, the VP3 common region (533aa) is located at positions 203 to 735 in the amino acid sequence of wild-type VP1. That is, the amino acid sequence from amino acid residue 203 to amino acid residue 735 in the amino acid sequence of wild-type VP1 (that is, the amino acid sequence at positions 203 to 735) corresponds to the VP3 common region.

In the amino acid sequence of wild-type VP2, the VP3 common region is located at positions 66 to 598. That is, the amino acid sequence located between amino acid residues 66 and 598 in the amino acid sequence of wild-type VP2 (that is, the amino acid sequence at positions 66 to 598) corresponds to the VP3 common region.

For example, a wild-type AAV2 capsid comprises VP1 of SEQ ID NO: 01. For example, the wild-type AAV2 capsid comprises VP1 of SEQ ID NO: 01, VP2 of SEQ ID NO: 32, and VP3 of SEQ ID NO: 63.

Adeno-Associated Virus (AAV) Variant

Overview of AAV Variants

Some embodiments of the present disclosure provide an AAV variant.

The AAV variant of the present disclosure may be referred to as a recombinant AAV variant, an AAV variant vector, or a recombinant AAV variant vector, and is not otherwise limited. For example, the AAV variant of the present disclosure may be referred to as an engineered AAV or engineered AAV variant.

In some embodiments, the AAV variant of the present disclosure comprises an AAV capsid variant. In some embodiments, the AAV capsid variant may comprise a VP1 variant (for example, also referred to as a VP1 capsid protein variant). In some embodiments, the AAV capsid variant may be referred to as a capsid, an AAV capsid, a capsid variant, an AAV2 capsid variant or the like. The name used to refer to the AAV capsid variant is not limited thereto, and may be referred to by terms commonly used in the art.

In some embodiments, the AAV variant may further comprise a nucleic acid molecule. For example, the AAV variant may further comprise a nucleic acid molecule by packaging the nucleic acid molecule. In this case, the nucleic acid molecule may be packaged inside an AAV capsid. For example, a nucleic acid molecule is located inside an AAV capsid, and in this case, the AAV capsid may surround the nucleic acid molecule. In some embodiments, the nucleic acid molecule may be a recombinant nucleic acid molecule. In some embodiments, the nucleic acid molecule or recombinant nucleic acid molecule may comprise a gene of interest.

In some embodiments, the AAV variant may be referred to as an AAV2 variant, an AAV2 variant vector, a recombinant AAV2 variant, a recombinant AAV2 variant vector, or the like, but is not otherwise limited.

Aav Capsid Variant

Some embodiments of the present disclosure provide an AAV capsid variant.

In some embodiments, as described above, the AAV variant of the present disclosure may comprise an AAV capsid variant (for example, an AAV2 capsid variant).

In some embodiments, the AAV capsid variant may comprise a VP1 variant. In some embodiments, the AAV capsid variant may comprise a VP2 variant. In some embodiments, the AAV capsid variant may comprise a VP3 variant. In some embodiments, the AAV capsid variant may comprise a VP2 variant in addition to a VP1 variant. In some embodiments, the AAV capsid variant may comprise a VP3 variant in addition to a VP1 variant. In some embodiments, the AAV capsid variant may comprise a VP1 variant, a VP2 variant, and a VP3 variant.

In some embodiments, the AAV capsid variant comprises a total of 60 VPs, which may comprise a VP1 variant, a VP2 variant, and a VP3 variant. In some embodiments, the ratio of VP1 variant, VP2 variant, and VP3 variant in the AAV capsid variant may be about 1:1:10, but is not limited thereto.

VP1 Variant

Some embodiments of the present disclosure provide a VP1 variant. The VP1 variant of the present disclosure may be referred to as a VP1 capsid protein variant or AAV (or AAV2) VP1 capsid protein variant, but is not limited thereto.

In some embodiments, the VP1 variant may comprise any one amino acid sequence selected from SEQ ID NOs: 02 to 31. In some embodiments, the VP1 variant may be represented by any amino acid sequence selected from SEQ ID NOs: 02 to 31. Therefore, in some embodiments, the AAV capsid variant may comprise any one amino acid sequence selected from SEQ ID Nos: 02 to 31.

In some embodiments, the VP1 variant may have an amino acid sequence of any one SEQ ID NO selected from the following SEQ ID NOs:

SEQ ID NO: 02; SEQ ID NO: 03; SEQ ID NO: 04; SEQ ID NO: 05; SEQ ID NO: 06; SEQ ID NO: 07; SEQ ID NO: 08; SEQ ID NO: 09; SEQ ID NO: 10; SEQ ID NO: 11; SEQ ID NO: 12; SEQ ID NO: 13; SEQ ID NO: 14; SEQ ID NO: 15; SEQ ID NO: 16; SEQ ID NO: 17; SEQ ID NO: 18; SEQ ID NO: 19; SEQ ID NO: 20; SEQ ID NO: 21; SEQ ID NO: 22; SEQ ID NO: 23; SEQ ID NO: 24; SEQ ID NO: 25; SEQ ID NO: 26; SEQ ID NO: 27; SEQ ID NO: 28; SEQ ID NO: 29; SEQ ID NO: 30; and SEQ ID NO: 31.

Vp2 Variant

Some embodiments of the present disclosure provide a VP2 variant. The VP2 variant of the present disclosure may be referred to as a VP2 capsid protein variant or AAV (or AAV2) VP2 capsid protein variant, but is not limited thereto.

In some embodiments, the VP2 variant may comprise any one amino acid sequence selected from SEQ ID NOs: 33 to 62. In some embodiments, the VP2 variant may be represented by any amino acid sequence selected from SEQ ID NOs: 33 to 62. Therefore, in some embodiments, the AAV capsid variant may comprise any one amino acid sequence selected from SEQ ID Nos: 33 to 62.

In some embodiments, the VP2 variant may have an amino acid sequence of any one SEQ ID NO selected from the following SEQ ID NOs:

SEQ ID NO: 33; SEQ ID NO: 34; SEQ ID NO: 35; SEQ ID NO: 36; SEQ ID NO: 37; SEQ ID NO: 38; SEQ ID NO: 39; SEQ ID NO: 40; SEQ ID NO: 41; SEQ ID NO: 42; SEQ ID NO: 43; SEQ ID NO: 44; SEQ ID NO: 45; SEQ ID NO: 46; SEQ ID NO: 47; SEQ ID NO: 48; SEQ ID NO: 49; SEQ ID NO: 50; SEQ ID NO: 51; SEQ ID NO: 52; SEQ ID NO: 53; SEQ ID NO: 54; SEQ ID NO: 55; SEQ ID NO: 56; SEQ ID NO: 57; SEQ ID NO: 58; SEQ ID NO: 59; SEQ ID NO: 60; SEQ ID NO: 61; and SEQ ID NO: 62.

Vp3 Variant

Some embodiments of the present disclosure provide a VP3 variant (for example, a variant of a VP3 capsid protein). The VP3 variant of the present disclosure may be referred to as a VP3 capsid protein variant or AAV (or AAV2) VP3 capsid protein variant, but is not limited thereto.

In some embodiments, the VP3 variant may comprise any one amino acid sequence selected from SEQ ID NOs: 64 to 93. In some embodiments, the VP3 variant may be represented by any one amino acid sequence selected from SEQ ID NOs: 64 to 92. Therefore, in some embodiments, the AAV capsid variant may comprise any one amino acid sequence selected from SEQ ID Nos: 64 to 93.

In some embodiments, the VP3 variant may have an amino acid sequence of any one SEQ ID NO selected from the following SEQ ID NOs:

SEQ ID NO: 64; SEQ ID NO: 65; SEQ ID NO: 66; SEQ ID NO: 67; SEQ ID NO: 68; SEQ ID NO: 69; SEQ ID NO: 70; SEQ ID NO: 71; SEQ ID NO: 72; SEQ ID NO: 73; SEQ ID NO: 74; SEQ ID NO: 75; SEQ ID NO: 76; SEQ ID NO: 77; SEQ ID NO: 78; SEQ ID NO: 79; SEQ ID NO: 80; SEQ ID NO: 81; SEQ ID NO: 82; SEQ ID NO: 83; SEQ ID NO: 84; SEQ ID NO: 85; SEQ ID NO: 86; SEQ ID NO: 87; SEQ ID NO: 88; SEQ ID NO: 89; SEQ ID NO: 90; SEQ ID NO: 91; SEQ ID NO: 92; and SEQ ID NO: 93.

Characteristics of VP1, VP2, and VP3 Variants

The VP1 variant of the present disclosure may be a variant of wild-type AAV2 VP1 (wild-type VP1). Accordingly, the VP1 variant of the present disclosure may be expressed as being derived from VP1 of wild-type AAV2. In some embodiments, the VP1 variant of the present disclosure may be obtained by introducing one or more mutations (for example, amino acid substitution mutations) into the amino acid sequence at positions 561 to 588 (amino acid sequence of 28 aa) of wild-type AAV2 VP1 (wild-type VP1). The amino acid sequence at positions 561 to 588 of wild-type VP1 is located in the VP3 common region of wild-type AAV2.

Wild-type VP1 is represented by SEQ ID NO: 01, and the amino acid sequence at positions 561 to 588 of wild-type VP1 is represented by SEQ ID NO: 94. The VP1 variant of the present disclosure may comprise any one amino acid sequence selected from SEQ ID NOs: 95 to 124, which differs from the amino acid sequence (SEQ ID NO: 94) at positions 561 to 588 of wild-type VP1 (SEQ ID NO: 01). In this case, any one amino acid sequence selected from SEQ ID NOs: 95 to 124 may be located at positions 561 to 588 in the VP1 variant.

In some embodiments, the VP1 variant may be a modified or altered form of the wild-type VP1, in which the amino acid sequence at positions 561-588 (SEQ ID NO: 94) in wild-type VP1 has been modified or changed with any one sequence selected from SEQ ID NOs: 95 to 124. Such a VP1 variant may be obtained by substituting or changing the amino acid sequence at positions 561 to 588 of wild-type VP1 (SEQ ID NO: 01) to any one sequence selected from SEQ ID NOs: 95 to 124, or obtained by substituting or changing one or more amino acid residues comprised in the amino acid sequence at positions 561 to 588 to other amino acid residues, but is not otherwise limited. Any one sequence selected from SEQ ID NOs: 95 to 124 may be referred to as a mutated or engineered sequence. In some embodiments, the VP1 variant comprises any one engineered sequence selected from SEQ ID NOs: 95 to 124, and in this case, the engineered sequence may be located at positions 561 to 588 based on the amino acid sequence (SEQ ID NO: 01) of wild-type VP1.

The VP2 variant of the present disclosure may be a variant of wild-type AAV VP2 (wild-type VP2). Accordingly, the VP2 variant of the present disclosure may be expressed as being derived from wild-type AAV2 VP2. In some embodiments, the VP2 variant of the present disclosure may be obtained by introducing one or more mutations (for example, amino acid substitution mutation) into the amino acid sequence at positions 424 to 451 of VP2 of wild-type AAV2.

Wild-type VP2 is represented by SEQ ID NO: 32, and the amino acid sequence at positions 424 to 451 of wild-type VP2 is represented by SEQ ID NO: 94. The VP2 variant of the present disclosure may comprise any one amino acid sequence selected from SEQ ID NOs: 95 to 124, which differs from the amino acid sequence (SEQ ID NO: 94) at positions 424 to 451 of wild-type VP2 (SEQ ID NO: 32). In this case, any one amino acid sequence selected from SEQ ID NOs: 95 to 124 may be located at positions 424 to 451 in the VP2 variant.

In some embodiments, the VP2 variant may be a modified or changed form of the wild-type VP2, in which the amino acid sequence at positions 424-451 (SEQ ID NO: 94) in wild-type VP2 has been modified or changed with any one sequence selected from SEQ ID NOs: 95 to 124. Such a VP2 variant may be obtained by substituting or changing the amino acid sequence at positions 424 to 451 of wild-type VP2 to any one sequence selected from SEQ ID NOs: 95 to 124, or obtained by substituting or changing one or more amino acid residues comprised in the amino acid sequence at positions 424 to 451 to other amino acid residues, but is not limited thereto. Any one sequence selected from SEQ ID NOs: 95 to 124 may be referred to as a mutated or engineered sequence. In some embodiments, the VP2 variant comprises any one engineered sequence selected from SEQ ID NOs: 95 to 124, and in this case, the engineered sequence may be located at positions 424 to 451 based on the amino acid sequence of wild-type VP2.

The VP3 variant of the present disclosure may be a variant of wild-type AAV2 VP3 (wild-type VP3). Accordingly, the VP3 variant of the present disclosure may be expressed as being derived from wild-type AAV2 VP3. In some embodiments, the VP3 variant of the present disclosure may be obtained by introducing one or more mutations (for example, amino acid substitution mutation) into the amino acid sequence at positions 359 to 386 of VP3 of wild-type AAV2.

Wild-type VP3 is represented by SEQ ID NO: 63, and the amino acid sequence at positions 359 to 386 of wild-type VP3 is represented by SEQ ID NO: 94. The VP3 variant of the present disclosure may comprise any one amino acid sequence selected from SEQ ID NOs: 95 to 124, which differs from the amino acid sequence (SEQ ID NO: 94) at positions 359 to 386 of wild-type VP3 (SEQ ID NO: 63). In this case, any one amino acid sequence selected from SEQ ID NOs: 95 to 124 may be located at positions 359 to 386 in the VP3 variant.

In some embodiments, the VP3 variant may be a modified or changed form of the wild-type VP3, in which the amino acid sequence at positions 359-386 (SEQ ID NO: 94) in wild-type VP3 has been modified or changed with any one sequence selected from SEQ ID NOs: 95 to 124. Such a VP3 variant may be obtained by substituting or changing the amino acid sequence at positions 359 to 386 of wild-type VP3 to any one sequence selected from SEQ ID NOs: 95 to 124, or obtained by substituting or changing one or more amino acid residues comprised in the amino acid sequence at positions 359 to 386 to other amino acid residues, but is not limited thereto. Any one sequence selected from SEQ ID NOs: 95 to 124 may be referred to as a mutated or engineered sequence. In some embodiments, the VP3 variant comprises any one engineered sequence selected from SEQ ID NOs: 95 to 124, and in this case, the engineered sequence may be located at positions 359 to 386 based on the amino acid sequence of wild-type VP3.

Examples of AAV Capsid Variant

In some embodiments, the AAV capsid variant comprises a VP1 variant, and in this case, the VP1 variant may have any one amino acid sequence selected from SEQ ID NOs: 02 to 31.

In some embodiments, the AAV capsid variant may be any one selected from AAV capsid variants 1 to 30 disclosed in the present disclosure. In some embodiments, AAV capsid variant 1 may comprise a VP1 variant having an amino acid sequence of SEQ ID NO: 02. In some embodiments, AAV capsid variant 2 may comprise a VP1 variant having an amino acid sequence of SEQ ID NO: 03. In some embodiments, AAV capsid variant 3 may comprise a VP1 variant having an amino acid sequence of SEQ ID NO: 04. In some embodiments, AAV capsid variant 4 may comprise a VP1 variant having an amino acid sequence of SEQ ID NO: 05. In some embodiments, AAV capsid variant 5 may comprise a VP1 variant having an amino acid sequence of SEQ ID NO: 06. In some embodiments, AAV capsid variant 6 may comprise a VP1 variant having an amino acid sequence of SEQ ID NO: 07. In some embodiments, AAV capsid variant 7 may comprise a VP1 variant having an amino acid sequence of SEQ ID NO: 08. In some embodiments, AAV capsid variant 8 may comprise a VP1 variant having an amino acid sequence of SEQ ID NO: 09. In some embodiments, AAV capsid variant 9 may comprise a VP1 variant having an amino acid sequence of SEQ ID NO: 10. In some embodiments, AAV capsid variant 10 may comprise a VP1 variant having an amino acid sequence of SEQ ID NO: 11. In some embodiments, AAV capsid variant 11 may comprise a VP1 variant having an amino acid sequence of SEQ ID NO: 12. In some embodiments, AAV capsid variant 12 may comprise a VP1 variant having an amino acid sequence of SEQ ID NO: 13. In some embodiments, AAV capsid variant 13 may comprise a VP1 variant having an amino acid sequence of SEQ ID NO: 14. In some embodiments, AAV capsid variant 14 may comprise a VP1 variant having an amino acid sequence of SEQ ID NO: 15. In some embodiments, AAV capsid variant 15 may comprise a VP1 variant having an amino acid sequence of SEQ ID NO: 16. In some embodiments, AAV capsid variant 16 may comprise a VP1 variant having an amino acid sequence of SEQ ID NO: 17. In some embodiments, AAV capsid variant 17 may comprise a VP1 variant having an amino acid sequence of SEQ ID NO: 18. In some embodiments, AAV capsid variant 18 may comprise a VP1 variant having an amino acid sequence of SEQ ID NO: 19. In some embodiments, AAV capsid variant 19 may comprise a VP1 variant having an amino acid sequence of SEQ ID NO: 20. In some embodiments, AAV capsid variant 20 may comprise a VP1 variant having an amino acid sequence of SEQ ID NO: 21. In some embodiments, AAV capsid variant 21 may comprise a VP1 variant having an amino acid sequence of SEQ ID NO: 22. In some embodiments, AAV capsid variant 22 may comprise a VP1 variant having an amino acid sequence of SEQ ID NO: 23. In some embodiments, AAV capsid variant 23 may comprise a VP1 variant having an amino acid sequence of SEQ ID NO: 24. In some embodiments, AAV capsid variant 24 may comprise a VP1 variant having an amino acid sequence of SEQ ID NO: 25. In some embodiments, AAV capsid variant 25 may comprise a VP1 variant having an amino acid sequence of SEQ ID NO: 26. In some embodiments, AAV capsid variant 26 may comprise a VP1 variant having an amino acid sequence of SEQ ID NO: 27. In some embodiments, AAV capsid variant 27 may comprise a VP1 variant having an amino acid sequence of SEQ ID NO: 28. In some embodiments, AAV capsid variant 28 may comprise a VP1 variant having an amino acid sequence of SEQ ID NO: 29. In some embodiments, AAV capsid variant 29 may comprise a VP1 variant having an amino acid sequence of SEQ ID NO: 30. In some embodiments, AAV capsid variant 30 may comprise a VP1 variant having an amino acid sequence of SEQ ID NO: 31.

In some embodiments, the AAV capsid variant (for example, AAV capsid variant 1) comprising the VP1 variant having the amino acid sequence of SEQ ID NO: 02 may further comprise either or both of the VP2 variant having the amino acid sequence of SEQ ID NO: 33 and the VP3 variant having the amino acid sequence of SEQ ID NO: 64.

In some embodiments, the AAV capsid variant (for example, AAV capsid variant 2) comprising the VP1 variant having the amino acid sequence of SEQ ID NO: 03 may further comprise either or both of the VP2 variant having the amino acid sequence of SEQ ID NO: 34 and the VP3 variant having the amino acid sequence of SEQ ID NO: 65.

In some embodiments, the AAV capsid variant (for example, AAV capsid variant 3) comprising the VP1 variant having the amino acid sequence of SEQ ID NO: 04 may further comprise either or both of the VP2 variant having the amino acid sequence of SEQ ID NO: 35 and the VP3 variant having the amino acid sequence of SEQ ID NO: 66.

In some embodiments, the AAV capsid variant (for example, AAV capsid variant 4) comprising the VP1 variant having the amino acid sequence of SEQ ID NO: 05 may further comprise either or both of the VP2 variant having the amino acid sequence of SEQ ID NO: 36 and the VP3 variant having the amino acid sequence of SEQ ID NO: 67.

In some embodiments, the AAV capsid variant (for example, AAV capsid variant 5) comprising the VP1 variant having the amino acid sequence of SEQ ID NO: 06 may further comprise either or both of the VP2 variant having the amino acid sequence of SEQ ID NO: 37 and the VP3 variant having the amino acid sequence of SEQ ID NO: 68.

In some embodiments, the AAV capsid variant (for example, AAV capsid variant 6) comprising the VP1 variant having the amino acid sequence of SEQ ID NO: 07 may further comprise either or both of the VP2 variant having the amino acid sequence of SEQ ID NO: 38 and the VP3 variant having the amino acid sequence of SEQ ID NO: 69.

In some embodiments, the AAV capsid variant (for example, AAV capsid variant 7) comprising the VP1 variant having the amino acid sequence of SEQ ID NO: 08 may further comprise either or both of the VP2 variant having the amino acid sequence of SEQ ID NO: 39 and the VP3 variant having the amino acid sequence of SEQ ID NO: 70.

In some embodiments, the AAV capsid variant (for example, AAV capsid variant 8) comprising the VP1 variant having the amino acid sequence of SEQ ID NO: 09 may further comprise either or both of the VP2 variant having the amino acid sequence of SEQ ID NO: 40 and the VP3 variant having the amino acid sequence of SEQ ID NO: 71.

In some embodiments, the AAV capsid variant (for example, AAV capsid variant 9) comprising the VP1 variant having the amino acid sequence of SEQ ID NO: 10 may further comprise either or both of the VP2 variant having the amino acid sequence of SEQ ID NO: 41 and the VP3 variant having the amino acid sequence of SEQ ID NO: 72.

In some embodiments, the AAV capsid variant (for example, AAV capsid variant 10) comprising the VP1 variant having the amino acid sequence of SEQ ID NO: 11 may further comprise either or both of the VP2 variant having the amino acid sequence of SEQ ID NO: 42 and the VP3 variant having the amino acid sequence of SEQ ID NO: 73.

In some embodiments, the AAV capsid variant (for example, AAV capsid variant 11) comprising the VP1 variant having the amino acid sequence of SEQ ID NO: 12 may further comprise either or both of the VP2 variant having the amino acid sequence of SEQ ID NO: 43 and the VP3 variant having the amino acid sequence of SEQ ID NO: 74.

In some embodiments, the AAV capsid variant (for example, AAV capsid variant 12) comprising the VP1 variant having the amino acid sequence of SEQ ID NO: 13 may further comprise either or both of the VP2 variant having the amino acid sequence of SEQ ID NO: 44 and the VP3 variant having the amino acid sequence of SEQ ID NO: 75.

In some embodiments, the AAV capsid variant (for example, AAV capsid variant 13) comprising the VP1 variant having the amino acid sequence of SEQ ID NO: 14 may further comprise either or both of the VP2 variant having the amino acid sequence of SEQ ID NO: 45 and the VP3 variant having the amino acid sequence of SEQ ID NO: 76.

In some embodiments, the AAV capsid variant (for example, AAV capsid variant 14) comprising the VP1 variant having the amino acid sequence of SEQ ID NO: 15 may further comprise either or both of the VP2 variant having the amino acid sequence of SEQ ID NO: 46 and the VP3 variant having the amino acid sequence of SEQ ID NO: 77.

In some embodiments, the AAV capsid variant (for example, AAV capsid variant 15) comprising the VP1 variant having the amino acid sequence of SEQ ID NO: 16 may further comprise either or both of the VP2 variant having the amino acid sequence of SEQ ID NO: 47 and the VP3 variant having the amino acid sequence of SEQ ID NO: 78.

In some embodiments, the AAV capsid variant (for example, AAV capsid variant 16) comprising the VP1 variant having the amino acid sequence of SEQ ID NO: 17 may further comprise either or both of the VP2 variant having the amino acid sequence of SEQ ID NO: 48 and the VP3 variant having the amino acid sequence of SEQ ID NO: 79.

In some embodiments, the AAV capsid variant (for example, AAV capsid variant 17) comprising the VP1 variant having the amino acid sequence of SEQ ID NO: 18 may further comprise either or both of the VP2 variant having the amino acid sequence of SEQ ID NO: 49 and the VP3 variant having the amino acid sequence of SEQ ID NO: 80.

In some embodiments, the AAV capsid variant (for example, AAV capsid variant 18) comprising the VP1 variant having the amino acid sequence of SEQ ID NO: 19 may further comprise either or both of the VP2 variant having the amino acid sequence of SEQ ID NO: 50 and the VP3 variant having the amino acid sequence of SEQ ID NO: 81.

In some embodiments, the AAV capsid variant (for example, AAV capsid variant 19) comprising the VP1 variant having the amino acid sequence of SEQ ID NO: 20 may further comprise either or both of the VP2 variant having the amino acid sequence of SEQ ID NO: 51 and the VP3 variant having the amino acid sequence of SEQ ID NO: 82.

In some embodiments, the AAV capsid variant (for example, AAV capsid variant 20) comprising the VP1 variant having the amino acid sequence of SEQ ID NO: 21 may further comprise either or both of the VP2 variant having the amino acid sequence of SEQ ID NO: 52 and the VP3 variant having the amino acid sequence of SEQ ID NO: 83.

In some embodiments, the AAV capsid variant (for example, AAV capsid variant 21) comprising the VP1 variant having the amino acid sequence of SEQ ID NO: 22 may further comprise either or both of the VP2 variant having the amino acid sequence of SEQ ID NO: 53 and the VP3 variant having the amino acid sequence of SEQ ID NO: 84.

In some embodiments, the AAV capsid variant (for example, AAV capsid variant 22) comprising the VP1 variant having the amino acid sequence of SEQ ID NO: 23 may further comprise either or both of the VP2 variant having the amino acid sequence of SEQ ID NO: 54 and the VP3 variant having the amino acid sequence of SEQ ID NO: 85.

In some embodiments, the AAV capsid variant (for example, AAV capsid variant 23) comprising the VP1 variant having the amino acid sequence of SEQ ID NO: 24 may further comprise either or both of the VP2 variant having the amino acid sequence of SEQ ID NO: 55 and the VP3 variant having the amino acid sequence of SEQ ID NO: 86.

In some embodiments, the AAV capsid variant (for example, AAV capsid variant 24) comprising the VP1 variant having the amino acid sequence of SEQ ID NO: 25 may further comprise either or both of the VP2 variant having the amino acid sequence of SEQ ID NO: 56 and the VP3 variant having the amino acid sequence of SEQ ID NO: 87.

In some embodiments, the AAV capsid variant (for example, AAV capsid variant 25) comprising the VP1 variant having the amino acid sequence of SEQ ID NO: 26 may further comprise either or both of the VP2 variant having the amino acid sequence of SEQ ID NO: 57 and the VP3 variant having the amino acid sequence of SEQ ID NO: 88.

In some embodiments, the AAV capsid variant (for example, AAV capsid variant 26) comprising the VP1 variant having the amino acid sequence of SEQ ID NO: 27 may further comprise either or both of the VP2 variant having the amino acid sequence of SEQ ID NO: 58 and the VP3 variant having the amino acid sequence of SEQ ID NO: 89.

In some embodiments, the AAV capsid variant (for example, AAV capsid variant 27) comprising the VP1 variant having the amino acid sequence of SEQ ID NO: 28 may further comprise either or both of the VP2 variant having the amino acid sequence of SEQ ID NO: 59 and the VP3 variant having the amino acid sequence of SEQ ID NO: 90.

In some embodiments, the AAV capsid variant (for example, AAV capsid variant 28) comprising the VP1 variant having the amino acid sequence of SEQ ID NO: 29 may further comprise either or both of the VP2 variant having the amino acid sequence of SEQ ID NO: 60 and the VP3 variant having the amino acid sequence of SEQ ID NO: 91.

In some embodiments, the AAV capsid variant (for example, AAV capsid variant 29) comprising the VP1 variant having the amino acid sequence of SEQ ID NO: 30 may further comprise either or both of the VP2 variant having the amino acid sequence of SEQ ID NO: 61 and the VP3 variant having the amino acid sequence of SEQ ID NO: 92.

In some embodiments, the AAV capsid variant (for example, AAV capsid variant 30) comprising the VP1 variant having the amino acid sequence of SEQ ID NO: 31 may further comprise either or both of the VP2 variant having the amino acid sequence of SEQ ID NO: 62 and the VP3 variant having the amino acid sequence of SEQ ID NO: 93.

In some embodiments, the AAV capsid variant may be any one selected from the following:
  the AAV capsid variant (for example, AAV capsid variant 1) comprising the VP1 (for example, VP1 variant) having the amino acid sequence of SEQ ID NO: 02, the VP2 (for example, VP2 variant) having the amino acid sequence of SEQ ID NO: 33, and the VP3 (for example, VP3 variant) having the amino acid sequence of SEQ ID NO: 64;
  the AAV capsid variant (for example, AAV capsid variant 2) comprising the VP1 (for example, VP1 variant) having the amino acid sequence of SEQ ID NO: 03, the VP2 (for example, VP2 variant) having the amino acid sequence of SEQ ID NO: 34, and the VP3 (for example, VP3 variant) having the amino acid sequence of SEQ ID NO: 65;
  the AAV capsid variant (for example, AAV capsid variant 3) comprising the VP1 (for example, VP1 variant) having the amino acid sequence of SEQ ID NO: 04, the VP2 (for example, VP2 variant) having the amino acid sequence of SEQ ID NO: 35, and the VP3 (for example, VP3 variant) having the amino acid sequence of SEQ ID NO: 66;
  the AAV capsid variant (for example, AAV capsid variant 4) comprising the VP1 (for example, VP1 variant) having the amino acid sequence of SEQ ID NO: 05, the VP2 (for example, VP2 variant) having the amino acid sequence of SEQ ID NO: 36, and the VP3 (for example, VP3 variant) having the amino acid sequence of SEQ ID NO: 67;
  the AAV capsid variant (for example, AAV capsid variant 5) comprising the VP1 (for example, VP1 variant) having the amino acid sequence of SEQ ID NO: 06, the VP2 (for example, VP2 variant) having the amino acid sequence of SEQ ID NO: 37, and the VP3 (for example, VP3 variant) having the amino acid sequence of SEQ ID NO: 68;
  the AAV capsid variant (for example, AAV capsid variant 6) comprising the VP1 (for example, VP1 variant) having the amino acid sequence of SEQ ID NO: 07, the VP2 (for example, VP2 variant) having the amino acid sequence of SEQ ID NO: 38, and the VP3 (for example, VP3 variant) having the amino acid sequence of SEQ ID NO: 69;
  the AAV capsid variant (for example, AAV capsid variant 7) comprising the VP1 (for example, VP1 variant) having the amino acid sequence of SEQ ID NO: 08, the VP2 (for example, VP2 variant) having the amino acid sequence of SEQ ID NO: 39, and the VP3 (for example, VP3 variant) having the amino acid sequence of SEQ ID NO: 70;
  the AAV capsid variant (for example, AAV capsid variant 8) comprising the VP1 (for example, VP1 variant) having the amino acid sequence of SEQ ID NO: 09, the VP2 (for example, VP2 variant) having the amino acid sequence of SEQ ID NO: 40, and the VP3 (for example, VP3 variant) having the amino acid sequence of SEQ ID NO: 71;
  the AAV capsid variant (for example, AAV capsid variant 9) comprising the VP1 (for example, VP1 variant) having the amino acid sequence of SEQ ID NO: 10, the VP2 (for example, VP2 variant) having the amino acid sequence of SEQ ID NO: 41, and the VP3 (for example, VP3 variant) having the amino acid sequence of SEQ ID NO: 72;
  the AAV capsid variant (for example, AAV capsid variant 10) comprising the VP1 (for example, VP1 variant) having the amino acid sequence of SEQ ID NO: 11, the VP2 (for example, VP2 variant) having the amino acid sequence of SEQ ID NO: 42, and the VP3 (for example, VP3 variant) having the amino acid sequence of SEQ ID NO: 73;
  the AAV capsid variant (for example, AAV capsid variant 11) comprising the VP1 (for example, VP1 variant) having the amino acid sequence of SEQ ID NO: 12, the VP2 (for example, VP2 variant) having the amino acid sequence of SEQ ID NO: 43, and the VP3 (for example, VP3 variant) having the amino acid sequence of SEQ ID NO: 74;

the AAV capsid variant (for example, AAV capsid variant 12) comprising the VP1 (for example, VP1 variant) having the amino acid sequence of SEQ ID NO: 13, the VP2 (for example, VP2 variant) having the amino acid sequence of SEQ ID NO: 44, and the VP3 (for example, VP3 variant) having the amino acid sequence of SEQ ID NO: 75;

the AAV capsid variant (for example, AAV capsid variant 13) comprising the VP1 (for example, VP1 variant) having the amino acid sequence of SEQ ID NO: 14, the VP2 (for example, VP2 variant) having the amino acid sequence of SEQ ID NO: 45, and the VP3 (for example, VP3 variant) having the amino acid sequence of SEQ ID NO: 76;

the AAV capsid variant (for example, AAV capsid variant 14) comprising the VP1 (for example, VP1 variant) having the amino acid sequence of SEQ ID NO: 15, the VP2 (for example, VP2 variant) having the amino acid sequence of SEQ ID NO: 46, and the VP3 (for example, VP3 variant) having the amino acid sequence of SEQ ID NO: 77;

the AAV capsid variant (for example, AAV capsid variant 15) comprising the VP1 (for example, VP1 variant) having the amino acid sequence of SEQ ID NO: 16, the VP2 (for example, VP2 variant) having the amino acid sequence of SEQ ID NO: 47, and the VP3 (for example, VP3 variant) having the amino acid sequence of SEQ ID NO: 78;

the AAV capsid variant (for example, AAV capsid variant 16) comprising the VP1 (for example, VP1 variant) having the amino acid sequence of SEQ ID NO: 17, the VP2 (for example, VP2 variant) having the amino acid sequence of SEQ ID NO: 48, and the VP3 (for example, VP3 variant) having the amino acid sequence of SEQ ID NO: 79;

the AAV capsid variant (for example, AAV capsid variant 17) comprising the VP1 (for example, VP1 variant) having the amino acid sequence of SEQ ID NO: 18, the VP2 (for example, VP2 variant) having the amino acid sequence of SEQ ID NO: 49, and the VP3 (for example, VP3 variant) having the amino acid sequence of SEQ ID NO: 80;

the AAV capsid variant (for example, AAV capsid variant 18) comprising the VP1 (for example, VP1 variant) having the amino acid sequence of SEQ ID NO: 19, the VP2 (for example, VP2 variant) having the amino acid sequence of SEQ ID NO: 50, and the VP3 (for example, VP3 variant) having the amino acid sequence of SEQ ID NO: 81;

the AAV capsid variant (for example, AAV capsid variant 19) comprising the VP1 (for example, VP1 variant) having the amino acid sequence of SEQ ID NO: 20, the VP2 (for example, VP2 variant) having the amino acid sequence of SEQ ID NO: 51, and the VP3 (for example, VP3 variant) having the amino acid sequence of SEQ ID NO: 82;

the AAV capsid variant (for example, AAV capsid variant 20) comprising the VP1 (for example, VP1 variant) having the amino acid sequence of SEQ ID NO: 21, the VP2 (for example, VP2 variant) having the amino acid sequence of SEQ ID NO: 52, and the VP3 (for example, VP3 variant) having the amino acid sequence of SEQ ID NO: 83;

the AAV capsid variant (for example, AAV capsid variant 21) comprising the VP1 (for example, VP1 variant) having the amino acid sequence of SEQ ID NO: 22, the VP2 (for example, VP2 variant) having the amino acid sequence of SEQ ID NO: 53, and the VP3 (for example, VP3 variant) having the amino acid sequence of SEQ ID NO: 84;

the AAV capsid variant (for example, AAV capsid variant 22) comprising the VP1 (for example, VP1 variant) having the amino acid sequence of SEQ ID NO: 23, the VP2 (for example, VP2 variant) having the amino acid sequence of SEQ ID NO: 54, and the VP3 (for example, VP3 variant) having the amino acid sequence of SEQ ID NO: 85;

the AAV capsid variant (for example, AAV capsid variant 23) comprising the VP1 (for example, VP1 variant) having the amino acid sequence of SEQ ID NO: 24, the VP2 (for example, VP2 variant) having the amino acid sequence of SEQ ID NO: 55, and the VP3 (for example, VP3 variant) having the amino acid sequence of SEQ ID NO: 86; the AAV capsid variant (for example, AAV capsid variant 24) comprising the VP1 (for example, VP1 variant) having the amino acid sequence of SEQ ID NO: 25, the VP2 (for example, VP2 variant) having the amino acid sequence of SEQ ID NO: 56, and the VP3 (for example, VP3 variant) having the amino acid sequence of SEQ ID NO: 87;

the AAV capsid variant (for example, AAV capsid variant 25) comprising the VP1 (for example, VP1 variant) having the amino acid sequence of SEQ ID NO: 26, the VP2 (for example, VP2 variant) having the amino acid sequence of SEQ ID NO: 57, and the VP3 (for example, VP3 variant) having the amino acid sequence of SEQ ID NO: 88;

the AAV capsid variant (for example, AAV capsid variant 26) comprising the VP1 (for example, VP1 variant) having the amino acid sequence of SEQ ID NO: 27, the VP2 (for example, VP2 variant) having the amino acid sequence of SEQ ID NO: 58, and the VP3 (for example, VP3 variant) having the amino acid sequence of SEQ ID NO: 89;

the AAV capsid variant (for example, AAV capsid variant 27) comprising the VP1 (for example, VP1 variant) having the amino acid sequence of SEQ ID NO: 28, the VP2 (for example, VP2 variant) having the amino acid sequence of SEQ ID NO: 59, and the VP3 (for example, VP3 variant) having the amino acid sequence of SEQ ID NO: 90;

the AAV capsid variant (for example, AAV capsid variant 28) comprising the VP1 (for example, VP1 variant) having the amino acid sequence of SEQ ID NO: 29, the VP2 (for example, VP2 variant) having the amino acid sequence of SEQ ID NO: 60, and the VP3 (for example, VP3 variant) having the amino acid sequence of SEQ ID NO: 91;

the AAV capsid variant (for example, AAV capsid variant 29) comprising the VP1 (for example, VP1 variant) having the amino acid sequence of SEQ ID NO: 30, the VP2 (for example, VP2 variant) having the amino acid sequence of SEQ ID NO: 61, and the VP3 (for example, VP3 variant) having the amino acid sequence of SEQ ID NO: 92; and the AAV capsid variant (for example, AAV capsid variant 30) comprising the VP1 (for example, VP1 variant) having the amino acid sequence of SEQ ID NO: 31, the VP2 (for example, VP2 variant) having the amino acid sequence of SEQ ID NO: 62, and the VP3 (for example, VP3 variant) having the amino acid sequence of SEQ ID NO: 93.

Capsid Surface Modification

In some embodiments, a capsid surface modification may be added to the AAV capsid variant. For example, the AAV capsid variant may be modified to comprise a chemical functional group, a peptide, and a probe such as an aptamer on the surface thereof, and is not limited thereto. Such a capsid surface modification may be performed to further enhance the delivery activity of the AAV variant to a target and/or to increase the stability of the AAV variant, but is not limited thereto.

Elements that AAV Variant May Further Comprise

Overview of Elements that AAV Variant May Further Comprise

In some embodiments, the AAV variant of the present disclosure (for example, AAV2 variant) may further comprise one or more additional elements in addition to the above-described AAV capsid variant.

In some embodiments, the AAV variant may further comprise a nucleic acid molecule. The nucleic acid molecule may be referred to as a recombinant nucleic acid molecule, a nucleic acid construct, a recombinant nucleic acid construct, an expression cassette, a gene expression cassette, a gene of interest expression cassette, an AAV genome, a recombinant AAV genome, an engineered AAV genome, or the like, and is not limited thereto, and may be referred to by any term used in the art. In this case, the nucleic acid molecule is surrounded by an AAV capsid variant in the AAV variant, and thus may be located inside the AAV capsid variant.

In some embodiments, the nucleic acid molecule of such an AAV variant may comprise a gene or nucleic acid (for example, a gene of interest) that encodes a product of interest (for example, a protein of interest). Depending on the design of the AAV variant and nucleic acid molecule, the product of interest may be produced or expressed at a desired location (for example, a target cell) in a subject to which the AAV variant is delivered.

In some embodiments, the AAV variant may further comprise one or more selected from a nucleic acid encoding a product of interest, a promoter, and an ITR. For example, the nucleic acid encoding the product of interest, the promoter, and the ITR may be located in a packaged nucleic acid molecule of the AAV variant.

Nucleic Acid Encoding Product of Interest

In some embodiments, the AAV variant may comprise one or more nucleic acids encoding a product of interest. The nucleic acid encoding a product of interest may comprise, for example, a gene of interest. A nucleic acid encoding a product of interest may comprise, for example, a nucleic acid encoding a protein of interest.

In some embodiments, a nucleic acid encoding a product of interest may comprise an open reading frame (ORF) sequence of the product of interest (for example, a protein of interest) or a gene encoding the same, or a sequence complementary thereto. In some embodiments, a nucleic acid encoding a product of interest may comprise a coding sequence (CDS) of the product of interest or a gene encoding the product of interest, or a sequence complementary thereto. In some embodiments, a nucleic acid encoding a product of interest may comprise a cDNA sequence of the product of interest or a gene encoding the product of interest, or a sequence complementary thereto.

In some embodiments, a nucleic acid encoding a product of interest may be a therapeutic gene.

In some embodiments, the product of interest may be a substance for treating a disease or disorder of interest.

In some embodiments, the product of interest may be a protein of interest. For example, the protein of interest may be a protein to be expressed in a subject for therapeutic purposes. In some embodiments, the protein of interest may be a protein for treating a disease or disorder of interest (for example, a therapeutic protein).

In some embodiments, the disease or disorder of interest may be, for example, achromatopsia, Usher syndrome, diabetic retinopathy (proliferative diabetic retinopathy), diabetic macular edema, geographic atrophy, retinopathy of premature, Leber's hereditary optic neuropathy, central retinal vein occlusion, proliferative vitreoretinopathy, retinal cone dystrophy, Behcet's disease, Bietti's crystalline dystrophy, Best vitelliform macular dystrophy, Best disease, choroideremia, retinal detachment, uveitis, glaucoma, retinitis pigmentosa (RP), macular degeneration [for example, age-related macular degeneration (AMD)], RPE65-associated retinal dystrophy, Stargardt disease (SD), retinoschisis, or Leber congenital amaurosis (LCA).

The disease or disorder of interest may be, for example, an ocular disease or disorder, a retinal disease or disorder, or an RPE-associated disease or disorder.

In some embodiments, the protein of interest may be a protein for treating an ocular disease or disorder. In some embodiments, the ocular disease or disorder may be a disease or disorder caused by a problem with ocular tissue. For example, the ocular disease or disorder may be caused by a functional abnormality in ocular tissue, a structural abnormality in ocular tissue, or an abnormality in at least some of the cells that make up ocular tissue.

In some embodiments, the protein of interest may be a protein for treating a retinal disease or disorder. In some embodiments, the retinal disease or disorder may be a disease or disorder caused by a problem with retinal tissue or retinal cells. For example, the retinal disease or disorder may be caused by a functional abnormality in retinal tissue, a structural abnormality in retinal tissue, or an abnormality in at least some of the cells that make up retinal tissue. In some embodiments, the protein of interest may be a protein for treating a retinal cell [for example, a retinal neuron, photoreceptor, bipolar cell, horizontal cell, amacrine cell, ganglion cell, and the like]-related disease or disorder or a retinal pigment epithelium (RPE) cell-related disease or disorder.

In some embodiments, the protein of interest may be a protein for treating a retinal pigment epithelium-related disease or disorder. In some embodiments, the retinal pigment epithelium-related disorder or disease may be a disease or disorder caused by a problem with retinal pigment epithelium tissue or retinal pigment epithelium cells. For example, a retinal pigment epithelium-related disease or disorder may be caused by a functional abnormality in retinal pigment epithelium tissue, a structural abnormality in retinal pigment epithelium tissue, or an abnormality in at least some of the cells that make up retinal pigment epithelium tissue. In some embodiments, the retinal pigment epithelium-related disease may be a disease caused by RPE dysfunction. In some embodiments, the retinal pigment epithelium-related disease may be retinitis pigmentosa (RP), macular degeneration [for example, age-related macular degeneration (AMD)], RPE65-associated retinal dystrophy, Stargardt disease (SD), retinoschisis, or Leber congenital amaurosis type 2 (LCA2).

In some embodiments, the disease or disorder may be Leber congenital amaurosis (LCA). To date, 18 genes associated with LCA have been identified, and mutations in these genes are generally known to cause LCA. In some embodiments, the LCA may be LCA1, LCA2, LCA3, LCA4, LCA5, LCA6, LCA7, LCA8, LCA9, LCA10, LCA11, LCA12, LCA13, LCA14, LCA15, LCA16, LCA17, or LCA18. Among them, LCA2 is known to be caused by a functional defect of RPE 65.

In some embodiments, the retinal pigment epithelium-related disease may be an inherited retinal disease (IRD).

In some embodiments, the disease or disorder may be a mammalian disease or disorder. In some embodiments, the disease or disorder may be a human disease or disorder. In some embodiments, the disease or disorder may be a mouse, dog, horse, cat, rat, pig, rabbit, sheep, monkey, chimpanzee, or cow disease or disorder.

In some embodiments, the protein of interest may be ABCA4 (for example, a protein encoded by the ABCA4 gene), PDE6B (for example, a protein encoded by the PDE6B gene), RPGR (for example, a protein encoded by the RPGR gene), ACHM3A (for example, a protein encoded by the ACHM3A gene), ACHM3B (for example, a protein encoded by the ACHM3B gene), RLBP1 (for example, a protein encoded by the RLBP1 gene), CEP290 (for example, a protein encoded by the CEP290 gene), CLN3 (for example, a protein encoded by the CLN3 gene), CRX (for example, a protein encoded by the CRX gene), GUCA1A (for example, a protein encoded by the GUCA1A gene), GUCY2D (for example, a protein encoded by the GUCY2D gene), NMNAT1 (for example, a protein encoded by the NMNAT1 gene), TULP1 (for example, a protein encoded by the TULP1 gene), LRAT (for example, a protein encoded by the LRAT gene), MERTK (for example, a protein encoded by the MERTK gene), RDH12 (for example, a protein encoded by the RDH12 gene), AIPL1 (for example, a protein encoded by the AIPL1 gene), IMPDH1 (for example, a protein encoded by the IMPDH1 gene), RPGRIP1 (for example, a protein encoded by the RPGRIP1 gene), CRB1 (for example, a protein encoded by the CRB1 gene), NR2E3 (for example, a protein encoded by the NR2E3 gene), RPGR (for example, a protein encoded by the RPGR gene), EYS (for example, a protein encoded by the EYS gene), ADIPOR1 (for example, a protein encoded by the ADIPOR1 gene), ARL3 (for example, a protein encoded by the ARL3 gene), CA4 (for example, a protein encoded by the CA4 gene), HK1 (for example, a protein encoded by the HK1 gene), KLHL7 (for example, a protein encoded by the KLHL7 gene), NRL (for example, a protein encoded by the NRL gene), PRPF3 (for example, a protein encoded by the PRPF3 gene), PRPF4 (for example, a protein encoded by the PRPF4 gene), PRPF6 (for example, a protein encoded by the PRPF6 gene), PRPF8 (for example, a protein encoded by the PRPF8 gene), PRPF31 (for example, a protein encoded by the PRPF31 gene), ROM1 (for example, a protein encoded by the ROM1 gene), RP1 (for example, a protein encoded by the RP1 gene), RP9 (for example, a protein encoded by the RP9 gene), SAG (for example, a protein encoded by the SAG gene), SNRNP200 (for example, a protein encoded by the SNRNP200 gene), SPP2 (for example, a protein encoded by the SPP2 gene), TOPORS (for example, a protein encoded by the TOPORS gene), PRPH2 (for example, a protein encoded by the PRPH2 gene), SEMA4A (for example, a protein encoded by the SEMA4A gene), RIMS1 (for example, a protein encoded by the RIMS1 gene), PIPNM3 (for example, a protein encoded by the PIPNM3 gene), UNC119 (for example, a protein encoded by the UNC119 gene), PROM1 (for example, a protein encoded by the PROM1 gene), FSCN2 (for example, a protein encoded by the FSCN2 gene), GUCA1B (for example, a protein encoded by the GUCA1B gene), C1QTNF5 (for example, a protein encoded by the C1QTNF5 gene), CTNNA (for example, a protein encoded by the CTNNA gene), EFEMP1 (for example, a protein encoded by the EFEMP1 gene), ELOVL4 (for example, a protein encoded by the ELOVL4 gene), HMCN1 (for example, a protein encoded by the HMCN1 gene), IMPG1 (for example, a protein encoded by the IMPG1 gene), OTX2 (for example, a protein encoded by the OTX2 gene), PRDM13 (for example, a protein encoded by the PRDM13 gene), RP1L1 (for example, a protein encoded by the RP1L1 gene), TIMP3 (for example, a protein encoded by the TIMP3 gene), RPE 65 (for example, a protein encoded by the RPE 65 gene), bestrophin, rhodopsin, lebercilin, usherin, retinoschisin, Norrin, complement factor H, complement factor I, complement factor P, CD59, an anti-VEGF antibody (for example, sevacizumab, ranibizumab, bebacizumab, and brolucizumab), an anti-C5 antibody (for example, tesidolumab, ravulizumab, and eculizumab), an anti-C3 antibody, an anti-TNF antibody (for example, adalimumab, infliximab, and golimumab), or an anti-ANGPTL3 antibody (for example, evinacumab).

For example, the protein of interest may be a protein for genetic engineering of genetic engineering system. The protein for genetic engineering may comprise a Cas protein of the CRISPR/Cas system. The Cas protein may be, for example, Cas9 or a variant thereof, such as spCas9 or cjCas9, Cas12 or a variant thereof, such as Cpf1 (Cas12a), C2c1 (Cas12b), or C2c3 (Cas12c), or Cas13 or a variant thereof, such as C2c2 (Cas13a), C2c4 (Cas13b), C2c7 (Cas13c), or Cas13d, but is not limited thereto. In some embodiments, the protein for genetic engineering may comprise a base editor of a base editing system, or a prime editor of a prime editing system, or a transcription factor regulator, but is not limited thereto. The gene engineering system and gene editing protein are described in detail in the literature [Xu, Y., & Li, Z. (2020). CRISPR-Cas systems: Overview, innovations and applications in human disease research and gene therapy. *Computational and Structural Biotechnology Journal*, 18, 2401-2415.], the contents of which are hereby incorporated by reference in its entirety.

For example, the protein of interest may be a fluorescent protein such as green fluorescent protein (GFP) or luciferase. Such a fluorescent protein may be used for selection, but is not limited thereto.

In some embodiments, one or more nuclear localization sequences (NLSs) may be added to the product or protein of interest. For example, the protein for genetic engineering may be a protein for genetic engineering to which one or more nuclear localization sequences have been added, but is not limited thereto.

In some embodiments, the product of interest may be an RNA of interest. For example, the product of interest may be a guide RNA or pegRNA of a genetic engineering system (see the literature [Xu, Y., & Li, Z. (2020). CRISPR-Cas systems: Overview, innovations and applications in human disease research and gene therapy. *Computational and Structural Biotechnology Journal*, 18, 2401-2415.]). In some embodiments, the product of interest may be siRNA or miRNA.

In some embodiments, the product of interest may be the rep protein of AAV. In some embodiments, the gene of interest may comprise a nucleic acid encoding the replication protein of AAV. The replication protein is involved in replication of AAV genome, packaging, viral assembly, and the like, and is well known in the art (see the literature [Li, C., & Samulski, R. J. (2020). Engineering adeno-associated virus vectors for gene therapy. *Nature Reviews Genetics*, 21 (4), 255-272.]; and [Matsuzaka, Y., & Yashiro, R. (2024). Therapeutic Application and Structural Features of Adeno-Associated Virus Vector. *Current Issues in Molecular Biology*, 46 (8), 8464-8498.]). The nucleic acid encoding a Rep protein may encode any one or more of a rep78 protein, a rep68 protein, a rep52 protein, and a rep40, but is not limited thereto. For example, the nucleic acid encoding a replication protein may encode a rep78 protein, a rep68 protein, a rep52 protein, and rep40. The replication protein may comprise any one or more of a rep78 protein, a rep68 protein, a rep52 protein, and a rep40 protein, but is not limited thereto.

In some embodiments, the product of interest may be a cap of an AAV (for example, the cap of an AAV variant of the present disclosure). In some embodiments, the gene of interest may comprise a nucleic acid encoding the cap. In some embodiments, the nucleic acid encoding the cap may comprise a nucleic acid encoding any one or more of the VP1 variant, VP2 variant, and VP3 variant of the AAV variant of the present disclosure, but is not limited thereto. In some embodiments, the nucleic acid encoding the cap may comprise a nucleic acid encoding the VP1 variant of the present disclosure.

In some embodiments, the product of interest, protein of interest, or gene of interest may be derived from a human, a non-human mammal such as a mouse, dog, horse, cat, rat, pig, rabbit, sheep, monkey, chimpanzee, or cow, an archaeon, a bacterium, or a virus, but is not limited thereto.

Additional Elements for Regulating Expression of the Product of Interest, and the Like In some embodiments, the AAV variant may further comprise one or more additional elements for regulating the expression of the product of interest, and the like, in addition to the nucleic acid encoding the product of interest (for example, a gene of interest). In some embodiments, the one or more additional elements may each be independently selected from a promoter, an enhancer, a polyadenylation signal, a Kozak consensus sequence, an inverted terminal repeat (ITR), a long terminal repeat (LTR), a terminator, an origin of replication, a multicloning site (MCS), an internal ribosome entry site (IRES), poly A, and 2A self-cleaving peptides. In some embodiments, the AAV variant may further comprise any one or more selected from a promoter, an enhancer, a polyadenylation signal, a Kozak consensus sequence, an ITR, an LTR, a terminator, an origin of replication, a multicloning site, an internal ribosome entry site, poly A, and 2A self-cleaving peptides, in addition to the nucleic acid encoding the product of interest.

In some embodiments, the additional element may be a control element (or regulatory element). In the present disclosure, the control element may be used as a term to refer to an element, region, or DNA sequence that is operably linked to a nucleic acid element (for example, a nucleic acid encoding a product of interest) to enable or aid in the transcription and/or expression of the nucleic acid element in a particular location (for example, inside a cell). Examples of a control element of a prokaryotic cell may comprise a promoter, an operator sequence, a ribosome binding site, and the like. Examples of a control element of a eukaryotic cell may comprise a promoter, a polyadenylation sequence or signal [for example, a bovine growth hormone polyadenylation signal (bGh poly A signal)], an enhancer, and the like. The control element of the present disclosure may comprise a promoter, an enhancer, an intron splicing signal, a polyadenylation sequence, an ITR, and the like, but is not limited thereto. The promoter is a DNA sequence located adjacent to a nucleic acid encoding a product of interest (for example, a gene of interest), and is known to initiate or promote the transcription and/or expression of the nucleic acid encoding the product of interest. The promoter is generally operably linked to a nucleic acid encoding a product of interest. For example, the promoter may be linked upstream or 5' to a nucleic acid encoding a product of interest. The enhancer is known as an element that enhances the activity of a promoter or increases the possibility of transcription or expression of a particular gene, and is known to be located independently of the location of the promoter.

In some embodiments, the AAV variant may further comprise a promoter capable of initiating the expression of a nucleic acid encoding a product of interest. The promoter may be present inside the above-described nucleic acid molecule.

In some embodiments, the promoter may be an SV40 early promoter, a mouse mammary tumor virus long terminal repeat (LTR) promoter, an adenovirus major late (Ad MLP) promoter, a herpes simplex virus (HSV) promoter, a cytomegalovirus (CMV) promoter, a Rous sarcoma virus (RSV) promoter, a Ubc promoter, an EF1a promoter, an MNDU3 promoter, a U6 promoter, an H1 promoter, a 7SK promoter, a CBA promoter, a PGK promoter, an NES promoter, a GFAP promoter, a CaMKII promoter, an NSE promoter, a SYN1 promoter or CAG promoter, an RPE 65 gene promoter, a human retinal binding protein (CRALBP) gene promoter, a murine 11-cis-retinol dehydrogenase (RDH) gene promoter, a rhodopsin promoter, a rhodopsin kinase promoter, a tissue inhibitor of a metalloproteinase 3 (Timp3) promoter, a photoreceptor retinol binding protein promoter and a vitelliform macular dystrophy 2 promoter, an interphotoreceptor retinoid-binding protein (IRBP) promoter, an opsin promoter, a retinitis pigmentosa gene promoter, a human cone arrestin promoter, a cellular retinaldehyde-binding protein promoter, a vitelliform macular dystrophy promoter, a neural retina-specific leucine zipper protein promoter, a glial fibrillary acidic protein promoter, a retinoschisin promoter, or a homeodomain protein promoter.

In some embodiments, the promoter may be a subject target site, tissue, or cell specific promoter. For example, the promoter may be an ocular tissue-specific promoter. In some embodiments, the ocular tissue-specific promoter may be an RPE 65 gene promoter, a human retinal binding protein (CRALBP) gene promoter, a murine 11-cis-retinol dehydrogenase (RDH) gene promoter, a rhodopsin promoter, a rhodopsin kinase promoter, a tissue inhibitor of a metalloproteinase 3 (Timp3) promoter, a photoreceptor retinol binding protein promoter and a vitelliform macular dystrophy 2 promoter, an interphotoreceptor retinoid-binding protein (IRBP) promoter, an opsin promoter, a retinitis pigmentosa gene promoter, a human cone arrestin promoter, a cellular retinaldehyde-binding protein promoter, a vitelliform macular dystrophy promoter, a neural retina-specific leucine zipper protein promoter, a glial fibrillary acidic protein promoter, a retinoschisin promoter, a homeodomain protein promoter, but is not limited thereto. In some embodiments, the promoter may be an RPE-specific promoter.

In some embodiments, the promoter may be derived from a human, a mouse, a dog, a horse, a cat, a rat, a pig, a rabbit, a sheep, a monkey, a chimpanzee, a cow, a horse, a bacterium, or a virus, but is not limited thereto. The promoter may be artificially synthesized or engineered for use.

In some embodiments, one or more additional elements may be operably linked to a coding region. For example, the promoter and/or enhancer may be operably linked to a nucleic acid encoding a product of interest (for example, a gene of interest). The operably linked element or nucleic acid may be linked to the nucleic acid encoding the product of interest either contiguously or through a linker (for example, an oligonucleotide linker, and the like). The promoter and/or enhancer may be operably linked to a nucleic acid encoding a product of interest to affect the transcription of the nucleic acid encoding the product of interest. In some embodiments, the promoter may be linked to the 5'- or 3'-end of a nucleic acid encoding a product of interest. Preferably, the promoter may be linked to the 5'-end of the nucleic acid encoding the product of interest, and in this case, the promoter may be operably linked to the nucleic acid encoding the product of interest. The term "operably linked" means that the constituent elements described are in a relationship enabling them to function in their intended manner. For example, a promoter is operably linked to a coding sequence if the promoter promotes the transcription of the coding sequence.

In some embodiments, the AAV variant may further comprise one or more inverted terminal repeat (ITR) sequences. One or more ITRs may be located inside the above-described nucleic acid molecule. In some embodiments, the AAV variant may comprise one or two ITR(s). For example, the nucleic acid molecule may comprise two ITRs. In the nucleic acid molecule of a recombinant AAV, two ITRs are located at both ends of the nucleic acid molecule, and a region comprising a promoter and a nucleic acid encoding a product of interest may be located between two ITRs. One or more ITRs may each be independently selected. For example, when two ITRs are present, the two ITRs may be the same or different. In some embodiments, when two ITRs are present, the two ITRs may be symmetrical to each other. In some embodiments, the length of the ITR may each be independently 50 nt to 300 nt, but is not limited thereto. For example, the length of the ITR may be 145 nt. In some embodiments, the ITR may be derived from wild-type AAV or a variant thereof. In some embodiments, the ITR may be an ITR derived from AAV1, AAV2, AAV3, AAV4, AAV5, AAV6, AAV7, AAV8, AAV9, AAV10, AAV11, AAV12, AAV13, AAV-Rh10, AAV-Rh74, or a known AAV, or a variant thereof, but is not limited thereto.

Form of Nucleic Acid Molecule

As described above, the AAV variant may further comprise a nucleic acid molecule (for example, a recombinant nucleic acid molecule). In this case, the nucleic acid molecule may be packaged in an AAV capsid variant. For example, the nucleic acid molecule may be located inside the AAV capsid variant. In some embodiments, the nucleic acid molecule may be in the form of single-stranded DNA, single-stranded RNA, or a single-stranded DNA-RNA hybrid. Preferably, the nucleic acid molecule may be single-stranded DNA.

In some embodiments, the nucleic acid molecule may comprise a nucleic acid encoding a product of interest. In some embodiments, the nucleic acid molecule may comprise a nucleic acid encoding a product of interest, and a promoter operably linked to the nucleic acid encoding the product of interest. In some embodiments, the nucleic acid molecule may comprise a nucleic acid encoding a product of interest, a promoter operably linked to the nucleic acid encoding the product of interest, and one or more ITRs (for example, one or two ITR(s)). For example, a nucleic acid molecule may comprise two ITRs, and a nucleic acid encoding a product of interest and/or a promoter may be located between the two ITRs in the nucleic acid molecule. For example, in the nucleic acid molecule, an ITR (for example, the 5' ITR), a promoter, a nucleic acid encoding a product of interest, and an ITR (for example, the 3' ITR) may be located in the 5' to 3' direction in the order described. In some embodiments, the nucleic acid molecule may further comprise a poly A tail, but is not limited thereto. For example, in the nucleic acid molecule, an ITR (for example, the 5' ITR), a promoter, a nucleic acid encoding a product of interest, poly A, and an ITR (for example, the 3' ITR) may be located in the order described. For example, the nucleic acid molecule may be represented as any one of the following structures:

5' end-[ITR]-[promoter]-[nucleic acid encoding the product of interest]-[ITR]-3' end; and 5' end-[ITR]-[promoter]-[nucleic acid encoding the product of interest]-[poly A]-[ITR]-3' end.

In some embodiments, the nucleic acid molecule may comprise one or more nucleic acids encoding a product of interest. For example, the nucleic acid molecule may comprise a nucleic acid encoding product of interest. For example, the nucleic acid molecule may comprise two or three nucleic acids encoding a product of interest. For example, the nucleic acid molecule may comprise a nucleic acid encoding a first product of interest and a nucleic acid encoding a second product of interest. In this case, the expression of the nucleic acid encoding the first product of interest and the nucleic acid encoding the second product of interest may be regulated by one promoter, or by two promoters. For example, the nucleic acid encoding the first product of interest may be linked to a first promoter, and the nucleic acid encoding the second product of interest may be linked to a second promoter. For example, the nucleic acid molecule may further comprise two ITRs, and the nucleic acid encoding the first product of interest, the first promoter, the nucleic acid encoding the second product of interest, and the second promoter may be located between the two ITRs inside the nucleic acid molecule.

In some embodiments, the length of the nucleic acid molecule may be 3.0 kilobases (kb) to 6.0 kb. For example, the length of the nucleic acid may be 4.0 kb to 5.3 kb. For example, the length of the nucleic acid may be 4.5 kb to 5.2 kb. In particular embodiments, the length of the nucleic acid may be about 4.5 kb, 4.6 kb, 4.7 kb, 4.8 kb, 4.9 kb, 5.0 kb, 5.1 kb, or 5.2 kb, but is not limited thereto.

In some embodiments, the nucleic acid molecule may be codon optimized. In some embodiments, any one or more of the nucleic acid elements comprised in the AAV variant may be codon optimized. For example, the nucleic acid encoding the product of interest may be codon optimized. Codon optimization refers to changing the codons that make up a nucleic acid sequence so that they are most suitable for expression in a particular system (for example, a particular species or group of species). For example, codon optimization of a nucleic acid sequence does not change the amino acid sequence of an encoded protein. For example, the nucleic acid sequence may be optimized for more efficient expression in mammalian cells. A variety of codon optimization methods are known in the art. For example, the methods disclosed in U.S. Pat. Nos. 5,786,464 and 6,114,148 for codon optimization may be referenced, and are not limited thereto.

Advantages of AAV Variant

In some embodiments, the AAV variant of the present disclosure may have an ability to deliver to a desired target site. For example, the AAV variant of the present disclosure may have an enhanced or excellent ability to deliver to a desired target site. Such an enhanced or excellent ability to deliver to a desired target site may be caused by an AAV capsid variant, or a capsid protein variant, such as a VP1 variant, a VP2 variant, or a VP3 variant. Accordingly, it is to be understood by those skilled in the art that the contents described in the Advantages of AAV variants section are applicable not only to the AAV variant of the present disclosure, but also to the AAV capsid variant, or a capsid protein variant such as the VP1 variant, the VP2 variant, or the VP3 variant.

In some embodiments, the AAV variant of the disclosure may have a target site delivery ability. In some embodiments, the AAV variants of the present disclosure may be accumulated at a target site. In some embodiments, the AAV variant of the disclosure may have target site tropism. In some embodiments, the AAV variant of the present disclosure may have a target site-specific delivery ability.

In some embodiments, the AAV variant of the present disclosure may have an enhanced (or excellent) ability to deliver to a target site compared to wild-type AAV (for example, wild-type AAV2). In some embodiments, the AAV variant of the present disclosure may have an enhanced (or excellent) target site transport ability. In some embodiments, the AAV variant of the present disclosure may have enhanced (or excellent) target site tropism. In some embodiments, the target site may be ocular tissue (or an ocular cell), retinal tissue (or a retinal cell), or RPE tissue (or an RPE cell).

In some embodiments, the AAV variant of the present disclosure may have an enhanced ability to deliver to ocular tissue. In some embodiments, the AAV variant of the present disclosure may have an enhanced ability to deliver to retinal tissue (or a retinal cell). In some embodiments, the AAV variant of the present disclosure may have an enhanced ability to deliver to RPE tissue (or an RPE cell). For example, the AAV variant may have an enhanced or excellent ability to deliver to ocular, retinal or RPE tissue compared to wild-type AAV2.

In some embodiments, the AAV variants of the disclosure may have an enhanced ability to deliver to ocular, retinal, or RPE tissue when administered to a subject (for example, a human, mouse, rat, or the like). For example, the AAV variant may be accumulated in ocular tissue, retinal tissue, or RPE tissue when administered to a subject. For example, the extent to which the AAV variant is accumulated in ocular tissue, retinal tissue, or RPE tissue may be superior compared to wild-type AAV2.

In some embodiments, the AAV variant of the present disclosure may have an enhanced ability to deliver to retinal tissue or retinal cells when administered via intravitreal injection to a subject. For example, when the AAV variant is administered via intravitreal injection to a subject, a nucleic acid encoding a product of interest in the AAV variant may be better delivered to retinal tissue or retinal cells. For example, when the AAV variant is administered via intravitreal injection to a subject, a nucleic acid encoding a product of interest in the AAV variant may be delivered to retinal tissue or retinal cells better or to a greater extent than when administered via wild-type AAV2.

In some embodiments, the AAV variant of the present disclosure may have an enhanced ability to deliver to RPE tissue or RPE cells when administered via intravitreal injection to a subject. For example, when the AAV variant of the present disclosure is administered via intravitreal injection to a subject, a nucleic acid encoding a product of interest in the AAV variant may be better delivered to RPE tissue or RPE cells. For example, when the AAV variant is administered via intravitreal injection to a subject, a nucleic acid encoding a product of interest in the AAV variant may be delivered to RPE tissue or RPE cells better or to a greater extent than when administered via wild-type AAV2. In some embodiments, the AAV variant having an enhanced ability to deliver to RPE tissue or RPE cells when administered via intravitreal injection to a subject may comprise an AAV capsid variant comprising a VP1 variant having any one amino acid sequence of SEQ ID NO: 10, SEQ ID NO: 11, SEQ ID NO: 15, SEQ ID NO: 30, and SEQ ID NO: 31. For example, the AAV capsid variant of an AAV variant having an enhanced ability to deliver to RPE tissue or RPE cells when administered via intravitreal injection to a subject may be any one of AAV capsid variant 9, AAV capsid variant 10, AAV capsid variant 14, AAV capsid variant 29, and AAV capsid variant 30.

In some embodiments, the AAV variant of the present disclosure may have an enhanced ability to deliver to retinal tissue or retinal cells when administered via subretinal injection to a subject. For example, when the AAV variant of the present disclosure is administered via subretinal injection to a subject, a nucleic acid encoding a product of interest in the AAV variant may be better delivered to retinal tissue or retinal cells. For example, when the AAV variant is administered via subretinal injection to a subject, a nucleic acid encoding a product of interest in the AAV variant may be delivered to retinal tissue or retinal cells better or to a greater extent than when administered via wild-type AAV2.

In some embodiments, the AAV variant of the present disclosure may have an enhanced ability to deliver to RPE tissue or RPE cells when administered via subretinal injection to a subject. For example, when the AAV variant of the present disclosure is administered via subretinal injection to a subject, a nucleic acid encoding a product of interest in the AAV variant may be better delivered to RPE tissue or RPE cells. For example, when the AAV variant is administered via subretinal injection to a subject, a nucleic acid encoding a product of interest in the AAV variant may be delivered to RPE tissue or RPE cells better or to a greater extent than when administered via wild-type AAV2. In some embodiments, the AAV variant having an enhanced ability to deliver to RPE tissue or RPE cells when administered via subretinal injection to a subject may comprise an AAV capsid variant comprising a VP1 variant having any one amino acid sequence of SEQ ID NOs: 02 to 29. For example, the AAV capsid variant of an AAV variant having an enhanced ability to deliver to RPE tissue or RPE cells when administered via subretinal injection to a subject may be any one of AAV capsid variant 01 to AAV capsid variant 28.

In some embodiments, the AAV variant may have enhanced ocular tissue tropism. In some embodiments, the AAV variant may have enhanced retinal tissue tropism. In some embodiments, the AAV variant may have enhanced retinal tissue tropism upon subretinal or intravitreal administration. In some embodiments, the AAV variant may have enhanced RPE tissue tropism. In some embodiments, the AAV variant may have enhanced RPE tissue tropism upon subretinal or intravitreal administration.

An AAV variant with excellent delivery ability may be used for the delivery of a therapeutic gene for a target site (for example, RPE)-related disease or disorder, but is not limited thereto.

Production of AAV Variant

For a method or protocol for preparing the AAV variant or recombinant AAV variant of the present disclosure, a method for producing AAV widely known in the art can be referred.

For example, a popular method for producing recombinant AAV comprises triple transformation of HeLa (HeK293) cells. The cells harbor persistently expressed adenovirus (adv) E1a and E1b genes. Hek293 cells are triple transformed with a trans-plasmid expressing the rep and cap genes, a cis-plasmid encoding a gene to be packaged into the AAV capsid, and a helper plasmid comprising other adv genes that perform helper functions such as the E2A, E4, and Va rNa genes essential for replication, mRNA processing, and translation, respectively. Furthermore, HeK293 cells may be regulated to grow in a suspended state for expansion of culture and increase of production yield. (refer the literature [Wang, D., Tai, P. W., & Gao, G. (2019). Adeno-associated virus vector as a platform for gene therapy delivery. Nature Reviews Drug Discovery, 18 (5), 358-378.])

For a method or protocol for preparing a recombinant AAV, the literature [Wang, D., Tai, P. W., & Gao, G. (2019). Adeno-associated virus vector as a platform for gene therapy delivery. Nature Reviews Drug Discovery, 18 (5), 358-378.]; [Green, M. R., & Sambrook, J. (2012). Molecular Cloning. A Laboratory Manual 4th, 448.] and [Clément, N., & Grieger, J. C. Rozain, E. Mayousse, N. Guillet, P. Millet, Appl. Catal., B 182 (2016) 153-160. (2016). Manufacturing of recombinant adeno-associated viral vectors for clinical trials. Molecular Therapy Methods & Clinical Development, 3.] may be referenced, and all of which are hereby incorporated by reference in their entireties.

Hereinafter, examples of a method for preparing an AAV variant will be described.

As an example, the method for preparing an AAV vector may comprise:
introducing, into a host cell,
a first plasmid (for example, which may be referred to as a transfer plasmid or trans-plasmid) comprising a nucleic acid encoding a product of interest (for example, a sequence to be transferred or expressed), wherein the transfer plasmid may further comprise an ITR and a promoter in addition to the nucleic acid portion encoding the product of interest;
a second plasmid (for example, which may be referred to as a Rep-Cap plasmid or cis-plasmid) comprising a rep gene (for example, a nucleic acid encoding a rep protein) and/or a cap gene (for example, a nucleic acid encoding a cap protein); and
optionally, a third plasmid comprising a helper gene (for example, which may be referred to as a helper plasmid); and
obtaining (or extracting) an AAV vector (for example, an AAV variant vector) from the host cell.

Here, the cap gene may comprise a nucleic acid encoding an AAV capsid protein variant according to some embodiments of the present disclosure. For example, the cap gene may comprise a nucleic acid encoding a VP1 variant. For example, the cap gene may comprise a nucleic acid encoding any one amino acid sequence selected from SEQ ID NOs: 02 to 31. For example, the cap gene may comprise a nucleic acid encoding a VP1 variant, a VP2 variant, and a VP3 variant.

Here, the host cell into which the above three types of plasmids or two types of plasmids (for example, the first plasmid and the second plasmid) are introduced may be a prokaryotic cell (for example, E. coli) or a eukaryotic cell. In some embodiments, the host cell may be a cell derived from a mammalian. In some embodiments, the host cell may be, for example, HEK293, HEK293T, Huh-7, HeLa, HepG2, Hep1A, SV40, CHO, COS, MeWo, NIH3T3, A549, PERC6, HT1180, 293 AAV cell, a monocyte, a dendritic cell, or the like.

After introducing the three or two plasmids described above into the host cell, researchers may culture the host cell in an appropriate manner (for example, according to protocols provided by the host cell manufacturer or known protocols) to obtain an AAV vector from the host cell. After the culture, an AAV vector comprising a desired sequence may be obtained from the host cell.

The introduction of the plasmid into the host cell may be performed by appropriately selecting a method known in the art. For example, electroporation, a gene gun, sonoporation, magnetofection, microinjection, temporary cell compression or squeezing, a cationic liposome method, lithium acetate-DMSO, lipid-mediated transfection, calcium phosphate precipitation, lipofection, polyethyleneimine (PEI)-mediated transfection, DEAE-dextran-mediated transfection, and the like may be used, but are not limited thereto.

In this case, the order in which the plasmids are introduced into the host cell is not particularly limited.

The AAV vector may be prepared in the form of exosomes or microparticles, but is not limited thereto. The method for extracting an AAV vector may be performed by the method known in the art.

For example, as the method for extracting an AAV vector, it is possible to use centrifugation, precipitation, immunoprecipitation, affinity chromatography, filtration, a method using magnetic beads coated with a specific antibody or an aptamer, a method using a freeze/thaw method, sonication, a commercial kit, and the like.

The AAV vector may optionally be concentrated by a method known in the art. For example, for the concentration, immunomagnetic capture, organic flocculation, polyethylene glycol (PEG) precipitation, and the like may be used, but are not limited thereto.

Further, optionally, a quality test may be further performed. For example, the quality test may be titer determination, a sterility test for bacteria and fungi, a mycoplasma detection test, and the like, but is not limited thereto.

Furthermore, a mammalian cell-free platform for preparing a recombinant AAV or AAV vector may also be applied for preparing a recombinant AAV. The most commonly used mammalian cell-free platform is based on recombinant baculoviruses known as baculovirus expression vectors (Bevs). Such Bevs are infected with Spodoptera frugiperda (sf9) insect cells for vector production. (refer the literature [Kondratov, O., Marsic, D., Crosson, S. M., Mendez-Gomez, H. R., Moskalenko, O., Mietzsch, M., . . . & Zolotukhin, S. (2017). Direct head-to-head evaluation of recombinant adeno-associated viral vectors manufactured in human versus insect cells. Molecular Therapy, 25 (12), 2661-2675.])

The method for preparing an AAV variant is not limited to the contents disclosed in the present disclosure, and the AAV variant may be prepared through methods known in the art or newly developed methods/platforms.

Production of AAV Variant-Recombinant Nucleic Acid Molecule Comprising Nucleic Acid Encoding Capsid Protein Variant Some embodiments of the present disclosure provide a nucleic acid encoding a capsid protein variant and a nucleic acid molecule (for example, a recombinant nucleic acid molecule) comprising the same. The nucleic acid encoding the capsid protein variant and the recombinant nucleic acid molecule comprising the same may be used for the production of the above-described AAV variant. An example of a recombinant nucleic acid molecule comprising a nucleic acid encoding a capsid protein variant is the above-described second plasmid used in the method for preparing an AAV vector. The nucleic acid encoding the capsid protein variant may be referred to as a cap gene.

In some embodiments, the capsid protein variant may be a VP1 variant according to some embodiments of the present disclosure. In some embodiments, the cap gene may comprise a nucleic acid sequence encoding any one amino acid sequence selected from SEQ ID NOs: 02 to 31.

Some embodiments of the present disclosure provide a recombinant nucleic acid molecule comprising a cap gene comprising a nucleic acid sequence encoding any one amino acid sequence selected from SEQ ID NOs: 02 to 31.

In some embodiments, the recombinant nucleic acid molecule may further comprise a nucleic acid encoding a rep protein (that is, a rep gene) in addition to the cap gene. The rep protein may be, for example, any one or more of rep78, rep68, rep52, and rep40. In some embodiments, four rep proteins may be produced from one rep gene. In this case, the four rep proteins may be rep78, rep68, rep52, and rep40.

In some embodiments, the recombinant nucleic acid molecule may further comprise one or more promoters. For example, the recombinant nucleic acid molecule may further comprise a promoter operably linked to the cap gene and/or a promoter operably linked to the rep gene. In some embodiments, the promoter may be independently selected, and specific examples of the promoter are described in detail in previous paragraphs comprising the section of the present disclosure "Adeno-associated virus (AAV) variant" and its subsection "Additional elements for regulating expression of product of interest, and the like."

In some embodiments, the recombinant nucleic acid molecule may be a DNA molecule. For example, the recombinant nucleic acid molecule may be a plasmid, but is not limited thereto. The recombinant nucleic acid molecule may be referred to as a cap plasmid or a Rep-Cap plasmid.

Production of AAV Variant—Engineered Host Cell for Producing AAV Variant

Some embodiments of the present disclosure provide an engineered host cell for producing an AAV variant. The engineered host cell of the present disclosure is a host cell that has been transfected with a recombinant nucleic acid molecule (for example, a Rep-Cap plasmid) comprising a nucleic acid encoding at least a capsid protein variant, and may be used for producing an AAV variant.

In some embodiments, the engineered host cell may comprise a recombinant nucleic acid molecule comprising a nucleic acid encoding a capsid protein variant according to some embodiments of the present disclosure. For example, the engineered host cell may comprise a recombinant nucleic acid molecule comprising a cap gene comprising a nucleic acid sequence encoding any one amino acid sequence selected from SEQ ID NOs: 02 to 31. The engineered host cell may be produced by a method comprising introducing a recombinant nucleic acid molecule into a host cell. The method for introducing a nucleic acid molecule is described in detail in the previous paragraph.

In some embodiments, the engineered host cell may further comprise a first plasmid comprising a nucleic acid encoding a product of interest and/or a third plasmid comprising a helper gene, in addition to a recombinant nucleic acid molecule (for example, a second plasmid) comprising a nucleic acid encoding a capsid protein variant.

Composition or Kit Comprising AAV Variant

Some embodiments of the present disclosure provide a composition comprising the above-described AAV variant. Some embodiments of the present disclosure provide a kit comprising the AAV variant. In some embodiments, the composition or kit comprising an AAV variant may comprise an AAV variant according to some embodiments of the present disclosure. The composition or kit comprising an AAV variant may be used to deliver the AAV variant or a nucleic acid encoding a product of interest to a desired site in a subject and/or may be used to treat a disease of interest in a subject. The use of the AAV variant or AAV variant vector will be specifically described below.

Use of AAV Variant Vector

Overview of Use of AAV Variant Vector

In some embodiments, the AAV variant or AAV variant vector of the present disclosure may be used to deliver a nucleic acid encoding a product of interest to a desired site. In some embodiments, the AAV variant vector of the present disclosure may be used to express a nucleic acid encoding a product of interest at a desired site. The desired site may be referred to as, for example, a target site. The aspects of the use of the recombinant AAV or AAV vector are well known in the art, and are not limited to the contents described in the present section.

In some embodiments, the AAV variant vector of the present disclosure has an excellent ability to deliver to ocular tissue, and thus may be used to deliver a nucleic acid encoding a product of interest to the ocular tissue and express the nucleic acid in the ocular tissue. Furthermore, the AAV variant vector of the present disclosure is capable of delivering a nucleic acid encoding a product for treating an ocular disease (for example, a nucleic acid encoding an ocular disease therapeutic protein) to ocular tissue and enabling the nucleic acid to be expressed in the ocular tissue. The AAV variant vector of the present disclosure may be used to treat an ocular disease.

In some embodiments, the AAV variant vector of the present disclosure has an excellent ability to deliver to RPE tissue, and thus may be used to deliver a nucleic acid encoding a product of interest to the RPE tissue and express the nucleic acid in the RPE tissue. Furthermore, the AAV variant vector of the present disclosure is capable of delivering a nucleic acid encoding a product for treating an RPE-associated disease (for example, a nucleic acid encoding an RPE-associated disease therapeutic protein) to RPE tissue and enabling the nucleic acid to be expressed in the RPE tissue. The AAV variant vector of the present disclosure may be used to treat an RPE-associated disease.

In the present disclosure, the AAV variant vector is used to refer to an AAV variant that essentially comprises a nucleic acid encoding a product of interest (for example, a gene of interest). For example, the AAV variant vector comprises an AAV capsid variant and a nucleic acid molecule, and in this case, the nucleic acid molecule may comprise a nucleic acid encoding a product of interest. The AAV variant, AAV capsid variant, nucleic acid molecule, and nucleic acid encoding the product of interest are described in detail in the present disclosure, comprising the section of the present disclosure "AAV Variant."

Method for Delivering Nucleic Acid Encoding Product of Interest Using AAV Variant Vector Some embodiments of the present disclosure provide a method for delivering a nucleic acid encoding a product of interest using an AAV variant vector. The method for delivering a nucleic acid encoding a product of interest of the present disclosure may be expressed as a method for delivering a gene of interest, a method for delivering a recombinant nucleic acid molecule, a method for delivering a heterologous nucleic acid, a method for delivering an AAV variant or AAV variant vector, a method for delivering an expression cassette, and the like, depending on the purpose of the method and the elements comprised in the AAV variant vector.

Some embodiments of the present disclosure provide a method for delivering a nucleic acid encoding a product of interest. In some embodiments, the method of delivering a nucleic acid encoding a product of interest may comprise administering the AAV variant vector of the present disclosure to a subject. Here, the AAV variant vector may be comprised in a composition (for example, in the form of a composition) or comprised in a pharmaceutical composition (for example, in the form of a pharmaceutical composition), and administered to a subject, but is not limited thereto. In some embodiments, the method for delivering a nucleic acid encoding a product of interest may be a method for delivering a nucleic acid encoding a product of interest to a target site in a subject.

In some embodiments, the subject may be a vertebrate comprising a mammal. In some embodiments, the subject may be a human. In some embodiments, the subject may be a non-human mammal. The non-human mammal may be, for example, a mouse, dog, horse, cat, rat, pig, rabbit, sheep, monkey, chimpanzee, or cow, but is not limited thereto. In some embodiments, the subject may be a non-human primate, but is not limited thereto.

In some embodiments, the target site may be ocular tissue. In some embodiments, the target site may be retinal tissue. In some embodiments, the target site may be RPE tissue.

In some embodiments, the target site may be specified as a target cell. In some embodiments, the target site may be a cell of ocular tissue. In some embodiments, the target site may be a retinal cell. In some embodiments, the target site may be an RPE cell.

The AAV variant vector of the present disclosure may be injected via a variety of routes. In some embodiments, the AAV variant vectors of the present disclosure can be administered to a subject subretinally, suprachoroidally, or intravitreally. In some embodiments, the AAV variant vector of the present disclosure may be administered via subretinal, suprachoroidal, or intravitreal injection. In certain embodiments, the AAV variant vector of the present disclosure may be administered via subretinal injection to a subject. In specific embodiments, the AAV variant vector of the present disclosure may be administered via intravitreal injection to a subject.

In some embodiments, provided is a method for delivering a nucleic acid encoding a product of interest to an RPE tissue of a subject, the method comprising: administering the AAV variant vector of the present disclosure via subretinal or intravitreal injection to the subject.

In some embodiments, provided is a method for delivering a nucleic acid encoding a product of interest to an RPE tissue of a subject, the method comprising: administering the AAV variant vector of the present disclosure via subretinal injection to the subject, wherein the AAV variant vector comprises an AAV capsid variant comprising a VP1 variant having any one amino acid sequence selected from SEQ ID NOs: 02 to 29.

In some embodiments, provided is a method for delivering a nucleic acid encoding a product of interest to an RPE tissue of a subject, the method comprising: administering the AAV variant vector of the present disclosure via intravitreal injection to the subject, wherein the AAV variant vector comprises an AAV capsid variant comprising a VP1 variant having any one amino acid sequence selected from SEQ ID NO: 10, SEQ ID NO: 11, SEQ ID NO: 15, SEQ ID NO: 30, and SEQ ID NO: 31.

Method for Treating Disease (or Disorder) of Interest Using AAV Variant Vector

Some embodiments of the present disclosure provide a method for treating a disease (or disorder) of interest using an AAV variant vector. The product of interest of the nucleic acid encoding the product of interest of the AAV variant vector used in the present section may be preferably any one or more of a protein (for example, a therapeutic protein) for treating a disease (or disorder) of interest, a protein for genetic engineering, and a guide RNA, but is not limited thereto.

Some embodiments of the present disclosure provide a method for treating a disease of interest. In some embodiments, the method for treating a disease of interest may comprise administering an AAV variant vector to a subject. Here, the AAV variant vector may be comprised in a composition (for example, in the form of a composition) or comprised in a pharmaceutical composition (for example, in the form of a pharmaceutical composition), and administered to a subject, but is not limited thereto. To prepare a composition or pharmaceutical composition comprising an AAV variant vector, a suitable buffer such as phosphate-buffered saline (PBS) may be used, but is not limited thereto. In some embodiments, the composition or pharmaceutical composition comprising the AAV variant vector may further comprise a stabilizer and/or an excipient that may be used with and/or is suitable for the AAV vector, but is not limited thereto. In some embodiments, the excipient may be one or more selected from an ionic salt excipient, sucrose, and a surfactant. The ionic salt excipient may be, for example, potassium phosphate monobasic, potassium phosphate, sodium chloride, sodium phosphate dibasic anhydrous, sodium phosphate hexahydrate, sodium phosphate monobasic monohydrate, tromethamine, tris(hydroxymethyl)aminomethane hydrochloride (Tris-HCl), an amino acid, histidine, histidine hydrochloride (histidine-HCl), sodium succinate, sodium citrate, sodium acetate, and (4-(2-hydroxyethyl)-1-piperazineethanesulfonic acid) (HEPES), sodium sulfate, magnesium sulfate, magnesium chloride hexahydrate, calcium sulfate, potassium chloride, calcium chloride, and calcium citrate, but is not limited thereto. The surfactant may be, for example, one or more selected from a poloxamer (for example, Poloxamer 188) and a polysorbate (for example, Polysorbate 20, Polysorbate 80), but is not limited thereto.

The disease or disorder of interest may be, for example, an ocular-related disease or disorder, a retinal tissue related disease or disorder, or an RPE tissue-related disease or disorder, but is not limited thereto. The disease of interest may be, for example, a retinal cell [for example, a retinal neuron, photoreceptor, bipolar cell, horizontal cell, amacrine cell, ganglion cell, and the like]-related disease or disorder or a retinal pigment epithelium cell-related disease or disorder. In some embodiments, the retinal pigment epithelium-related disease may be a disease caused by RPE dysfunction. In some embodiments, the disease or disorder of interest may be achromatopsia, Usher syndrome, diabetic retinopathy (proliferative diabetic retinopathy), diabetic macular edema, geographic atrophy, retinopathy of premature, Leber's hereditary optic neuropathy, central retinal vein occlusion, proliferative vitreoretinopathy, retinal cone dystrophy, Behcet's disease, Bietti's crystallin dystrophy, Best vitelliform macular dystrophy, Best disease, choroideremia, retinal detachment, uveitis, glaucoma, retinitis pigmentosa (RP), macular degeneration [for example, age-related macular degeneration (AMD)], RPE65-associated retinal dystrophy, Stargardt disease (SD), retinoschisis, or Leber congenital amaurosis (LCA).

In some embodiments, the AAV variant vector or a composition comprising the same may be administered to a subject at an appropriate dose. For example, the administration dose of the AAV variant vector or the composition comprising the same may be determined in consideration of one or more of the type of disease, administration site, body weight, age, and progression of the disease, but is not limited thereto. Furthermore, the administration dose may be appropriately determined within the scope of medical judgment commensurate with a reasonable benefit/risk ratio and without problems such as undue toxicity, irritation, and allergic reactions. In some embodiments, the AAV variant vector or a composition comprising the same may be administered together with other elements or substances, and is not otherwise limited. The substance administered together with the AAV variant vector or the composition comprising the same may be an element or substance useful for treating a disease of interest.

EXEMPLARY EMBODIMENTS

Hereinafter, exemplary embodiments of the invention provided according to some embodiments of the present disclosure will be provided. The invention provided by the present disclosure is not limited to the following examples.

Exemplary Embodiments for AAV Variant

A01. an AAV variant comprising:
an AAV capsid variant,
wherein the AAV capsid variant comprises a VP1 variant having an amino acid sequence selected from SEQ ID NOs: 02 to 31.
A02. The AAV variant according to A01,
wherein the AAV capsid variant is selected from any one of following:
(for example, AAV capsid variant 1) the AAV capsid variant comprising the VP1 (for example, VP1 variant) having amino acid sequence of SEQ ID NO: 02, a VP2 (for example, VP2 variant) having amino acid sequence of SEQ ID NO: 33, a VP3 (for example, VP3 variant) having amino acid sequence of SEQ ID NO: 64;
(for example, AAV capsid variant 2) the AAV capsid variant comprising the VP1 (for example, VP1 variant) having amino acid sequence of SEQ ID NO: 03, a VP2 (for example, VP2 variant) having amino acid sequence of SEQ ID NO: 34, a VP3 (for example, VP3 variant) having amino acid sequence of SEQ ID NO: 65;
(for example, AAV capsid variant 3) the AAV capsid variant comprising the VP1 (for example, VP1 variant) having amino acid sequence of SEQ ID NO: 04, a VP2 (for example, VP2 variant) having amino acid sequence of SEQ ID NO: 35, a VP3 (for example, VP3 variant) having amino acid sequence of SEQ ID NO: 66;
(for example, AAV capsid variant 4) the AAV capsid variant comprising the VP1 (for example, VP1 variant) having amino acid sequence of SEQ ID NO: 05, a VP2 (for example, VP2 variant) having amino acid sequence of SEQ ID NO: 36, a VP3 (for example, VP3 variant) having amino acid sequence of SEQ ID NO: 67;
(for example, AAV capsid variant 5) the AAV capsid variant comprising the VP1 (for example, VP1 variant) having amino acid sequence of SEQ ID NO: 06, a VP2 (for example, VP2 variant) having amino acid sequence of SEQ ID NO: 37, a VP3 (for example, VP3 variant) having amino acid sequence of SEQ ID NO: 68;
(for example, AAV capsid variant 6) the AAV capsid variant comprising the VP1 (for example, VP1 variant) having amino acid sequence of SEQ ID NO: 07, a VP2 (for example, VP2 variant) having amino acid sequence of SEQ ID NO: 38, a VP3 (for example, VP3 variant) having amino acid sequence of SEQ ID NO: 69;
(for example, AAV capsid variant 7) the AAV capsid variant comprising the VP1 (for example, VP1 variant) having amino acid sequence of SEQ ID NO: 08, a VP2 (for example, VP2 variant) having amino acid sequence of SEQ ID NO: 39, a VP3 (for example, VP3 variant) having amino acid sequence of SEQ ID NO: 70;
(for example, AAV capsid variant 8) the AAV capsid variant comprising the VP1 (for example, VP1 variant) having amino acid sequence of SEQ ID NO: 09, a VP2 (for example, VP2 variant) having amino acid sequence of SEQ ID NO: 40, a VP3 (for example, VP3 variant) having amino acid sequence of SEQ ID NO: 71;
(for example, AAV capsid variant 9) the AAV capsid variant comprising the VP1 (for example, VP1 variant) having amino acid sequence of SEQ ID NO: 10, a VP2 (for example, VP2 variant) having amino acid sequence of SEQ ID NO: 41, a VP3 (for example, VP3 variant) having amino acid sequence of SEQ ID NO: 72;
(for example, AAV capsid variant 10) the AAV capsid variant comprising the VP1 (for example, VP1 variant) having amino acid sequence of SEQ ID NO: 11, a VP2 (for example, VP2 variant) having amino acid sequence of SEQ ID NO: 42, a VP3 (for example, VP3 variant) having amino acid sequence of SEQ ID NO: 73;
(for example, AAV capsid variant 11) the AAV capsid variant comprising the VP1 (for example, VP1 variant) having amino acid sequence of SEQ ID NO: 12, a VP2 (for example, VP2 variant) having amino acid sequence of SEQ ID NO: 43, a VP3 (for example, VP3 variant) having amino acid sequence of SEQ ID NO: 74;
(for example, AAV capsid variant 12) the AAV capsid variant comprising the VP1 (for example, VP1 variant) having amino acid sequence of SEQ ID NO: 13, a VP2 (for example, VP2 variant) having amino acid sequence of SEQ ID NO: 44, a VP3 (for example, VP3 variant) having amino acid sequence of SEQ ID NO: 75;
(for example, AAV capsid variant 13) the AAV capsid variant comprising the VP1 (for example, VP1 variant) having amino acid sequence of SEQ ID NO: 14, a VP2 (for example, VP2 variant) having amino acid sequence of SEQ ID NO: 45, a VP3 (for example, VP3 variant) having amino acid sequence of SEQ ID NO: 76;
(for example, AAV capsid variant 14) the AAV capsid variant comprising the VP1 (for example, VP1 variant) having amino acid sequence of SEQ ID NO: 15, a VP2 (for example, VP2 variant) having amino acid sequence of SEQ ID NO: 46, a VP3 (for example, VP3 variant) having amino acid sequence of SEQ ID NO: 77;
(for example, AAV capsid variant 15) the AAV capsid variant comprising the VP1 (for example, VP1 variant) having amino acid sequence of SEQ ID NO: 16, a VP2 (for example, VP2 variant) having amino acid sequence of SEQ ID NO: 47, a VP3 (for example, VP3 variant) having amino acid sequence of SEQ ID NO: 78;
(for example, AAV capsid variant 16) the AAV capsid variant comprising the VP1 (for example, VP1 variant) having amino acid sequence of SEQ ID NO: 17, a VP2 (for example, VP2 variant) having amino acid sequence of SEQ ID NO: 48, a VP3 (for example, VP3 variant) having amino acid sequence of SEQ ID NO: 79;
(for example, AAV capsid variant 17) the AAV capsid variant comprising the VP1 (for example, VP1 variant) having amino acid sequence of SEQ ID NO: 18, a VP2 (for example, VP2 variant) having amino acid sequence of SEQ ID NO: 49, a VP3 (for example, VP3 variant) having amino acid sequence of SEQ ID NO: 80;
(for example, AAV capsid variant 18) the AAV capsid variant comprising the VP1 (for example, VP1 variant) having amino acid sequence of SEQ ID NO: 19, a VP2 (for example, VP2 variant) having amino acid sequence of SEQ ID NO: 50, a VP3 (for example, VP3 variant) having amino acid sequence of SEQ ID NO: 81;
(for example, AAV capsid variant 19) the AAV capsid variant comprising the VP1 (for example, VP1 variant) having amino acid sequence of SEQ ID NO: 20, a VP2 (for example, VP2 variant) having amino acid sequence of SEQ ID NO: 51, a VP3 (for example, VP3 variant) having amino acid sequence of SEQ ID NO: 82;
(for example, AAV capsid variant 20) the AAV capsid variant comprising the VP1 (for example, VP1 variant) having amino acid sequence of SEQ ID NO: 21, a VP2 (for example, VP2 variant) having amino acid sequence of SEQ ID NO: 52, a VP3 (for example, VP3 variant) having amino acid sequence of SEQ ID NO: 83;
(for example, AAV capsid variant 21) the AAV capsid variant comprising the VP1 (for example, VP1 variant) having amino acid sequence of SEQ ID NO: 22, a VP2 (for example, VP2 variant) having amino acid sequence of SEQ ID NO: 53, a VP3 (for example, VP3 variant) having amino acid sequence of SEQ ID NO: 84;
(for example, AAV capsid variant 22) the AAV capsid variant comprising the VP1 (for example, VP1 variant) having amino acid sequence of SEQ ID NO: 23, a VP2 (for example, VP2 variant) having amino acid sequence of SEQ ID NO: 54, a VP3 (for example, VP3 variant) having amino acid sequence of SEQ ID NO: 85;
(for example, AAV capsid variant 23) the AAV capsid variant comprising the VP1 (for example, VP1 variant) having amino acid sequence of SEQ ID NO: 24, a VP2 (for example, VP2 variant) having amino acid sequence of SEQ ID NO: 55, a VP3 (for example, VP3 variant) having amino acid sequence of SEQ ID NO: 86;
(for example, AAV capsid variant 24) the AAV capsid variant comprising the VP1 (for example, VP1 variant) having amino acid sequence of SEQ ID NO: 25, a VP2 (for example, VP2 variant) having amino acid sequence of SEQ ID NO: 56, a VP3 (for example, VP3 variant) having amino acid sequence of SEQ ID NO: 87;
(for example, AAV capsid variant 25) the AAV capsid variant comprising the VP1 (for example, VP1 variant) having amino acid sequence of SEQ ID NO: 26, a VP2 (for example, VP2 variant) having amino acid sequence of SEQ ID NO: 57, a VP3 (for example, VP3 variant) having amino acid sequence of SEQ ID NO: 88;
(for example, AAV capsid variant 26) the AAV capsid variant comprising the VP1 (for example, VP1 variant) having amino acid sequence of SEQ ID NO: 27, a VP2 (for example, VP2 variant) having amino acid sequence of SEQ ID NO: 58, a VP3 (for example, VP3 variant) having amino acid sequence of SEQ ID NO: 89;
(for example, AAV capsid variant 27) the AAV capsid variant comprising the VP1 (for example, VP1 variant) having amino acid sequence of SEQ ID NO: 28, a VP2 (for example, VP2 variant) having amino acid sequence of SEQ ID NO: 59, a VP3 (for example, VP3 variant) having amino acid sequence of SEQ ID NO: 90;
(for example, AAV capsid variant 28) the AAV capsid variant comprising the VP1 (for example, VP1 variant) having amino acid sequence of SEQ ID NO: 29, a VP2 (for example, VP2 variant) having amino acid sequence of SEQ ID NO: 60, a VP3 (for example, VP3 variant) having amino acid sequence of SEQ ID NO: 91;
(for example, AAV capsid variant 29) the AAV capsid variant comprising the VP1 (for example, VP1 variant) having amino acid sequence of SEQ ID NO: 30, a VP2 (for example, VP2 variant) having amino acid sequence of SEQ ID NO: 61, a VP3 (for example, VP3 variant) having amino acid sequence of SEQ ID NO: 92; and
(for example, AAV capsid variant 30) the AAV capsid variant comprising the VP1 (for example, VP1 variant) having amino acid sequence of SEQ ID NO: 31, a VP2 (for example, VP2 variant) having amino acid sequence of SEQ ID NO: 62, a VP3 (for example, VP3 variant) having amino acid sequence of SEQ ID NO: 93.

A03. An AAV variant comprising:
an AAV capsid variant,
wherein the AAV capsid variant comprises a VP1 variant,
wherein the VP1 variant comprises an amino acid sequence selected from SEQ ID NOs: 95 to 124,
wherein the amino acid sequence selected from SEQ ID NOs: 95 to 124 is located at positions 561-588 in the VP1 amino acid sequence of wild-type AAV2.

A04. The AAV variant according to any one of A01 to A03, wherein the AAV variant further comprises a nucleic acid molecule (for example, recombinant nucleic acid molecule), wherein the nucleic acid molecule comprises a nucleic acid encoding a product of interest.

A05. The AAV variant according to A04, wherein the nucleic acid molecule further comprises a promoter, wherein the promoter is operably linked to the nucleic acid encoding the product of interest.

A06. The AAV variant according to A05, wherein the nucleic acid molecule further comprises two ITRs, wherein the promoter and the nucleic acid encoding the product of interest is located between two ITRs.

A07. The AAV variant according to any one of A04 to A06, wherein the nucleic acid molecule is single-stranded DNA.

A08. The AAV variant according to any one of A04 to A07, wherein the product of interest is a product for treating a disease of interest.

A09. The AAV variant according to A08, wherein the product of interest is a protein for treating the disease of interest.

A10. The AAV variant according to any one of A01 to A09, wherein the AAV variant is characterized in that the AAV variant is delivered to retinal tissue or retinal cell.

A11. The AAV variant according to any one of A01 to A10, wherein the AAV variant has a superior retinal tissue or retinal cell delivery ability (or targeting ability).

A12. The AAV variant according to any one of A01 to A11, wherein the AAV variant has an enhanced delivery ability (or targeting ability) to retinal tissue or retinal cell compared to a wild-type AAV2.

A13. The AAV variant according to any one of A01 to A12, wherein the AAV variant has a trophism for retinal tissue or retinal cell.

A14. The AAV variant according to any one of A01 to A09, wherein the AAV variant is characterized in that the AAV variant is delivered to RPE tissue or RPE cell.

A15. The AAV variant according to any one of A01 to A09 and A14, wherein the AAV variant has superior RPE tissue or RPE cell delivery ability (or targeting ability).

A16. The AAV variant according to any one of A01 to A09 and A14 to A15, wherein the AAV variant has an enhanced delivery ability (or targeting ability) to RPE tissue or RPE cell compared to a wild-type AAV2.

A17. The AAV variant according to any one of A01 to A09 and A14 to A16, wherein the AAV variant has a trophism for RPE tissue or RPE cell.

A18. The AAV variant according to any one of A01 to A09 and A14 to A17, wherein the AAV variant has a superior delivery ability (or targeting ability) to RPE tissue or RPE cell when administered to a subject via intravitreal injection.

A19. The AAV variant according to A18, wherein the AAV variant is characterized by comprising the AAV capsid variant comprising the VP1 variant having an amino acid sequence selected from SEQ ID NOs: 10, 11, 15, 30, and 31.

A20. The AAV variant according to any one of A01 to A09 and A14 to A17, wherein the AAV variant has a superior delivery ability (or targeting ability) to RPE tissue or RPE cell when administered to a subject via subretinal injection.

A21. The AAV variant according to A20, wherein the AAV variant is characterized by comprising the AAV capsid variant comprising the VP1 variant having an amino acid sequence selected from SEQ ID NOs: 02 to 29.

Exemplary Embodiments for Methods for Delivering an AAV Variant or a Nucleic Acid Encoding a Product of Interest B01. A method for delivering an AAV variant to a target site of a subject, comprising:
administering to the subject an AAV variant according to any one of A01 to A09.

B02. The method according to B01, wherein the AAV variant is administered to the subject via a subretinal injection, a suprachoroidal injection, or intravitreal injection.

B03. The method according to any one of B01 to B02, wherein the target site is retinal tissue or retinal cell.

B04. The method according to any one of B01 to B02, wherein the target site is RPE tissue or RPE cell.

B05. The method according to any one of B01 to B04, wherein the subject is human or non-human mammal.

B06. The method according to any one of B01 to B05, wherein the AAV variant is administered to the subject via the subretinal injection, wherein an AAV capsid variant of the AAV variant comprises a VP1 variant having an amino acid sequence selected from SEQ ID NOs: 02 to 29.

B07. The method according to any one of B01 to B05, wherein the AAV variant is administered to the subject via the intravitreal injection, wherein an AAV capsid variant of the AAV variant comprises a VP1 variant having an amino acid sequence selected from SEQ ID NOs: 10, 11, 15, 30, and 31.

B08. A method for delivering a nucleic acid encoding a product of interest to a target site of a subject, comprising:
administering an AAV variant according to any one of A04 to A09.

B09. The method according to B08, wherein the AAV variant is administered to the subject via a subretinal injection, suprachoroidal injection, or intravitreal injection.

B10. The method according to any one of B08 to B09, wherein the target site is retinal tissue or retinal cells.

B11. The method according to any one of B08 to B09, wherein the target site is RPE tissue or RPE cells.

B12. The method according to any one of B08 to B11, wherein the subject is human or non-human mammal.

B13. The method according to any one of B08 to B12, wherein the AAV variant is administered to the subject via a subretinal injection, wherein an AAV capsid variant of the AAV variant comprises a VP1 variant having an amino acid sequence selected from SEQ ID NOs: 02 to 29.

B14. The method according to any one of B08 to B12, wherein the AAV variant is administered to the subject via an intravitreal injection, wherein an AAV capsid variant of the AAV variant comprises a VP1 variant having an amino acid sequence selected from SEQ ID NOs: 10, 11, 15, 30, and 31.

Methods for Treating a Disease of Interest by Using an AAV Variant

C01. A method for treating a disorder or disease of interest in a subject, comprising:
administering to the subject an AAV variant according to any one of A08 to A09.

C02. The method according to C01, wherein the disease of interest is a retinal disorder or disease.

C03. The method according to any one of C01 to C02, wherein the disease of interest is a RPE-related disorder or disease.

C04. The method according to any one of C01 to C03, wherein the subject is human or non-human mammal.

C05. The method according to any one of C01 to C04, wherein the AAV variant is administered to the subject via a subretinal injection, suprachoroidal injection, or an intravitreal injection.

Exemplary Embodiments for AAV Capsid Variants

D01. An AAV capsid variant comprising a VP1 (for example, VP1 variant) having an amino acid sequence selected from SEQ ID NOs: 02 to 31.

D02. The AAV capsid variant according to D01, wherein the AAV capsid variant further comprises a VP2 (for example, VP2 variant) having an amino acid sequence selected from SEQ ID NOs: 33 to 62.

D03. The AAV capsid variant according to any one of D01 to D02, wherein the AAV capsid variant further comprises a VP3 (for example, VP3 variant) having an amino acid sequence selected from SEQ ID NOs: 64 to 93.

D04. An AAV capsid variant selected from any one of the following:
(for example, AAV capsid variant 1) the AAV capsid variant comprising a VP1 (for example, VP1 variant) having amino acid sequence of SEQ ID NO: 02, a VP2 (for example, VP2 variant) having amino acid sequence of SEQ ID NO: 33, a VP3 (for example, VP3 variant) having amino acid sequence of SEQ ID NO: 64;
(for example, AAV capsid variant 2) the AAV capsid variant comprising a VP1 (for example, VP1 variant) having amino acid sequence of SEQ ID NO: 03, a VP2 (for example, VP2 variant) having amino acid sequence of SEQ ID NO: 34, a VP3 (for example, VP3 variant) having amino acid sequence of SEQ ID NO: 65;
(for example, AAV capsid variant 3) the AAV capsid variant comprising a VP1 (for example, VP1 variant) having amino acid sequence of SEQ ID NO: 04, a VP2 (for example, VP2 variant) having amino acid sequence of SEQ ID NO: 35, a VP3 (for example, VP3 variant) having amino acid sequence of SEQ ID NO: 66;
(for example, AAV capsid variant 4) the AAV capsid variant comprising a VP1 (for example, VP1 variant) having amino acid sequence of SEQ ID NO: 05, a VP2

(for example, VP2 variant) having amino acid sequence of SEQ ID NO: 36, a VP3 (for example, VP3 variant) having amino acid sequence of SEQ ID NO: 67;

(for example, AAV capsid variant 5) the AAV capsid variant comprising a VP1 (for example, VP1 variant) having amino acid sequence of SEQ ID NO: 06, a VP2 (for example, VP2 variant) having amino acid sequence of SEQ ID NO: 37, a VP3 (for example, VP3 variant) having amino acid sequence of SEQ ID NO: 68;

(for example, AAV capsid variant 6) the AAV capsid variant comprising a VP1 (for example, VP1 variant) having amino acid sequence of SEQ ID NO: 07, a VP2 (for example, VP2 variant) having amino acid sequence of SEQ ID NO: 38, a VP3 (for example, VP3 variant) having amino acid sequence of SEQ ID NO: 69;

(for example, AAV capsid variant 7) the AAV capsid variant comprising a VP1 (for example, VP1 variant) having amino acid sequence of SEQ ID NO: 08, a VP2 (for example, VP2 variant) having amino acid sequence of SEQ ID NO: 39, a VP3 (for example, VP3 variant) having amino acid sequence of SEQ ID NO: 70;

(for example, AAV capsid variant 8) the AAV capsid variant comprising a VP1 (for example, VP1 variant) having amino acid sequence of SEQ ID NO: 09, a VP2 (for example, VP2 variant) having amino acid sequence of SEQ ID NO: 40, a VP3 (for example, VP3 variant) having amino acid sequence of SEQ ID NO: 71;

(for example, AAV capsid variant 9) the AAV capsid variant comprising a VP1 (for example, VP1 variant) having amino acid sequence of SEQ ID NO: 10, a VP2 (for example, VP2 variant) having amino acid sequence of SEQ ID NO: 41, a VP3 (for example, VP3 variant) having amino acid sequence of SEQ ID NO: 72;

(for example, AAV capsid variant 10) the AAV capsid variant comprising a VP1 (for example, VP1 variant) having amino acid sequence of SEQ ID NO: 11, a VP2 (for example, VP2 variant) having amino acid sequence of SEQ ID NO: 42, a VP3 (for example, VP3 variant) having amino acid sequence of SEQ ID NO: 73;

(for example, AAV capsid variant 11) the AAV capsid variant comprising a VP1 (for example, VP1 variant) having amino acid sequence of SEQ ID NO: 12, a VP2 (for example, VP2 variant) having amino acid sequence of SEQ ID NO: 43, a VP3 (for example, VP3 variant) having amino acid sequence of SEQ ID NO: 74;

(for example, AAV capsid variant 12) the AAV capsid variant comprising a VP1 (for example, VP1 variant) having amino acid sequence of SEQ ID NO: 13, a VP2 (for example, VP2 variant) having amino acid sequence of SEQ ID NO: 44, a VP3 (for example, VP3 variant) having amino acid sequence of SEQ ID NO: 75;

(for example, AAV capsid variant 13) the AAV capsid variant comprising a VP1 (for example, VP1 variant) having amino acid sequence of SEQ ID NO: 14, a VP2 (for example, VP2 variant) having amino acid sequence of SEQ ID NO: 45, a VP3 (for example, VP3 variant) having amino acid sequence of SEQ ID NO: 76;

(for example, AAV capsid variant 14) the AAV capsid variant comprising a
VP1 (for example, VP1 variant) having amino acid sequence of SEQ ID NO: 15, a VP2 (for example, VP2 variant) having amino acid sequence of SEQ ID NO: 46, a VP3 (for example, VP3 variant) having amino acid sequence of SEQ ID NO: 77;

(for example, AAV capsid variant 15) the AAV capsid variant comprising a VP1 (for example, VP1 variant) having amino acid sequence of SEQ ID NO: 16, a VP2 (for example, VP2 variant) having amino acid sequence of SEQ ID NO: 47, a VP3 (for example, VP3 variant) having amino acid sequence of SEQ ID NO: 78;

(for example, AAV capsid variant 16) the AAV capsid variant comprising a VP1 (for example, VP1 variant) having amino acid sequence of SEQ ID NO: 17, a VP2 (for example, VP2 variant) having amino acid sequence of SEQ ID NO: 48, a VP3 (for example, VP3 variant) having amino acid sequence of SEQ ID NO: 79;

(for example, AAV capsid variant 17) the AAV capsid variant comprising a VP1 (for example, VP1 variant) having amino acid sequence of SEQ ID NO: 18, a VP2 (for example, VP2 variant) having amino acid sequence of SEQ ID NO: 49, a VP3 (for example, VP3 variant) having amino acid sequence of SEQ ID NO: 80;

(for example, AAV capsid variant 18) the AAV capsid variant comprising a VP1 (for example, VP1 variant) having amino acid sequence of SEQ ID NO: 19, a VP2 (for example, VP2 variant) having amino acid sequence of SEQ ID NO: 50, a VP3 (for example, VP3 variant) having amino acid sequence of SEQ ID NO: 81;

(for example, AAV capsid variant 19) the AAV capsid variant comprising a VP1 (for example, VP1 variant) having amino acid sequence of SEQ ID NO: 20, a VP2 (for example, VP2 variant) having amino acid sequence of SEQ ID NO: 51, a VP3 (for example, VP3 variant) having amino acid sequence of SEQ ID NO: 82;

(for example, AAV capsid variant 20) the AAV capsid variant comprising a VP1 (for example, VP1 variant) having amino acid sequence of SEQ ID NO: 21, a VP2 (for example, VP2 variant) having amino acid sequence of SEQ ID NO: 52, a VP3 (for example, VP3 variant) having amino acid sequence of SEQ ID NO: 83;

(for example, AAV capsid variant 21) the AAV capsid variant comprising a VP1 (for example, VP1 variant) having amino acid sequence of SEQ ID NO: 22, a VP2 (for example, VP2 variant) having amino acid sequence of SEQ ID NO: 53, a VP3 (for example, VP3 variant) having amino acid sequence of SEQ ID NO: 84;

(for example, AAV capsid variant 22) the AAV capsid variant comprising a VP1 (for example, VP1 variant) having amino acid sequence of SEQ ID NO: 23, a VP2 (for example, VP2 variant) having amino acid sequence of SEQ ID NO: 54, a VP3 (for example, VP3 variant) having amino acid sequence of SEQ ID NO: 85;

(for example, AAV capsid variant 23) the AAV capsid variant comprising a VP1 (for example, VP1 variant) having amino acid sequence of SEQ ID NO: 24, a VP2 (for example, VP2 variant) having amino acid sequence of SEQ ID NO: 55, a VP3 (for example, VP3 variant) having amino acid sequence of SEQ ID NO: 86;

(for example, AAV capsid variant 24) the AAV capsid variant comprising a VP1 (for example, VP1 variant) having amino acid sequence of SEQ ID NO: 25, a VP2 (for example, VP2 variant) having amino acid sequence of SEQ ID NO: 56, a VP3 (for example, VP3 variant) having amino acid sequence of SEQ ID NO: 87;

(for example, AAV capsid variant 25) the AAV capsid variant comprising a VP1 (for example, VP1 variant) having amino acid sequence of SEQ ID NO: 26, a VP2 (for example, VP2 variant) having amino acid sequence of SEQ ID NO: 57, a VP3 (for example, VP3 variant) having amino acid sequence of SEQ ID NO: 88;

(for example, AAV capsid variant 26) the AAV capsid variant comprising a VP1 (for example, VP1 variant) having amino acid sequence of SEQ ID NO: 27, a VP2 (for example, VP2 variant) having amino acid sequence of SEQ ID NO: 58, a VP3 (for example, VP3 variant) having amino acid sequence of SEQ ID NO: 89;

(for example, AAV capsid variant 27) the AAV capsid variant comprising a VP1 (for example, VP1 variant) having amino acid sequence of SEQ ID NO: 28, a VP2 (for example, VP2 variant) having amino acid sequence of SEQ ID NO: 59, a VP3 (for example, VP3 variant) having amino acid sequence of SEQ ID NO: 90;

(for example, AAV capsid variant 28) the AAV capsid variant comprising a VP1 (for example, VP1 variant) having amino acid sequence of SEQ ID NO: 29, a VP2 (for example, VP2 variant) having amino acid sequence of SEQ ID NO: 60, a VP3 (for example, VP3 variant) having amino acid sequence of SEQ ID NO: 91;

(for example, AAV capsid variant 29) the AAV capsid variant comprising a VP1 (for example, VP1 variant) having amino acid sequence of SEQ ID NO: 30, a VP2 (for example, VP2 variant) having amino acid sequence of SEQ ID NO: 61, a VP3 (for example, VP3 variant) having amino acid sequence of SEQ ID NO: 92; and (for example, AAV capsid variant 30) the AAV capsid variant comprising a VP1 (for example, VP1 variant) having amino acid sequence of SEQ ID NO: 31, a VP2 (for example, VP2 variant) having amino acid sequence of SEQ ID NO: 62, a VP3 (for example, VP3 variant) having amino acid sequence of SEQ ID NO: 93.

Exemplary Embodiments for VP1, VP2 and VP3 Capsid Proteins

E01. A capsid protein variant having an amino acid sequence selected from SEQ ID NOs: 02 to 31.

E02. The capsid protein variant according to E01, wherein the capsid protein variant having the amino acid sequence selected from SEQ ID NOs 02 to 31 is an AAV2 VP1 capsid protein variant.

E03. A capsid protein variant having an amino acid sequence selected from SEQ ID NOs: 33 to 62.

E04. The capsid protein variant according to E03, wherein the capsid protein variant having the amino acid sequence selected from SEQ ID NOs 33 to 62 is an AAV2 VP2 capsid protein variant.

E05. A capsid protein variant having an amino acid sequence selected from SEQ ID NOs: 64 to 93.

E06. The capsid protein variant according to E05, wherein the capsid protein variant having the amino acid sequence selected from SEQ ID NOs: 64 to 93 is an AAV2 VP3 capsid protein variant.

Exemplary Embodiments for Recombinant Nucleic Acid Molecules Comprising a Nucleic Acid Encoding Capsid Protein Variant (for Example, Cap Gene)

F01. A recombinant nucleic acid molecule comprising a cap gene having a nucleic acid sequence encoding an amino acid sequence selected from SEQ ID NOs: 02 to 31.

F02. The recombinant nucleic acid molecule according to F01, wherein the recombinant nucleic acid molecule further comprises a rep gene.

F03. The recombinant nucleic acid molecule according to any one of F01 to F02, wherein the recombinant nucleic acid molecule is plasmid.

F04. The recombinant nucleic acid molecule according to any one of F01 to F03, wherein the recombinant nucleic acid molecule further comprises a promoter operably linked to the cap gene.

Exemplary Embodiments for Engineered Host Cells for Production of AAV Variant

G01. An engineered host cell comprising a recombinant nucleic acid molecule according to any one of F01 to F04.

G02. The engineered host cell according to G01, wherein the engineered host cell further comprises a transfer plasmid comprising a nucleic acid encoding a product of interest.

G03. The engineered host cell according to G02, wherein the engineered host cell further comprises a helper plasmid comprising a helper gene.

G04. The engineered host cell according to any one of G01 to G03, wherein the host cell is derived from a mammalian.

G05. The engineered host cell according to any one of G01 to G04, wherein the host cell is HEK293, HEK293T, Huh-7, HeLa, HepG2, Hep1A, SV40, CHO, COS, MeWo, NIH3T3, A549, PERC6, HT1180, 293 AAV cell, monocyte, or dendritic cell.

Exemplary Embodiments for Methods for Producing AAV Variant

H01. A method for producing an AAV variant, comprising:
introducing, into a host cell,
a rep-cap plasmid comprising a cap gene having a nucleic acid sequence encoding an amino acid sequence selected from SEQ ID NOs: 02 to 31, and a rep gene,
a transfer plasmid comprising a nucleic acid encoding a product of interest, and
a helper plasmid comprising a helper gene; and
obtaining the AAV variant from the host cell into which the plasmids were introduced.

Hereinafter, the invention provided by the present disclosure will be described in more detail through experimental examples and examples. These examples are provided for illustrating the content disclosed by the present disclosure, and the scope of the content disclosed by the present disclosure is not limited by these examples.

EXAMPLES

In order to develop a superior AAV2 variant, the inventors of the present disclosure developed a machine learning model, secured a plasmid library capable of preparing an AAV2 variant through the machine learning model and an AAV library derived from the plasmid library, and finally developed an AAV2 variant with excellent performance from the AAV library. Hereinafter, examples of the present disclosure will be disclosed in detail.

Example 1. Development of Engineered AAV Library with Improved Diversity Performance Through Machine Learning Model 1-1. Method The region that the inventors of the present disclosure designed to be mutated to develop an AAV2 variant is positions 561 to 588 (28 amino acids) of AAV2 VP1. Since there are 20$^{28}$ mutations which may be present in the amino acid sequence consisting of the aforementioned 28 amino acids, the inventors of the present disclosure first constructed an appropriate machine learning model, and used the same to select candidate sequences. The inventors of the present disclosure constructed an AAV plasmid library from the selected candidate sequences and constructed an AAV library.

1-1-1. Construction of Machine Learning Model and Obtaining of Candidate Sequence A functional prediction model was constructed using viability (packaging function) data from a random mutation library prepared by targeting positions 561 to 588 (28 amino acids) of AAV2 VP1. The data was divided into learning, verification, and test sets at a ratio of 8:1:1 and used for model construction and evaluation. One-hot embedding and transformer-based ESM-2 were used as protein sequence featurization methods. After one-hot encoding embedding, training was performed through a 1D-CNN model, and after ESM-2-based embedding, training was performed through linear regression, kNN, SVM, random forest, and ANN models. The structure of each model was optimized using verification data. In this case, RMSE and $R^2$ were used as model performance evaluation indices.

Based on a model constructed to derive candidate sequences, a genetic algorithm (GA) was applied. To reduce false positive predictions, an ensemble strategy using an ESM-2-based ANN model and a one-hot encoding-based 1D-CNN model was utilized for prediction in the genetic algorithm process. Further, it is intended to secure a diverse set of candidate sequences while limiting the generation of impossible sequences using a position-specific scoring matrix (PSSM). The PSSM was calculated from the training data. In the process of performing the genetic algorithm, diversity was secured while maintaining the sequence distribution and similarity of the training data by applying limitation conditions (scores of 60 or more, 90 or more) on the PSSM score. The genetic algorithm was run for 100 generations, and various mutation rates (0.1 to 0.3) and crossover rates (0.2 to 0.7) were combined to generate sequences under various conditions. As a strategy for filtering the sequences generated by the genetic algorithm, the following two filtering strategies were used to finally select 70,000 sequences of 28aa (561 to 588 positions of AAV2 VP1) (that is, 70,000 machine learning model-based sequences): 1) the top sequences that received high scores from both the 1D-CNN model and the ESM-based ANN model, and 2) the top sequences with high 1D-CNN scores by PSSM score interval.

1-1-2. Plasmid Library Construction

Pooled DNA oligos were synthesized for 100 wild type (WT) sequences, 100 stop codon sequences, 27,000 random mutation sequences, and 70,000 machine learning model-based sequences (total of 97,200 sequences) corresponding to the VP1 561 to 588 positions of AAV2. As a screening vector, a vector capable of expressing the C-terminal partial region of AAV2 REP and the entire VP1 sequence of AAV2 CAP under a CAG promoter between inverted terminal repeats (ITRs) was used. The corresponding VP1 561 to 588 portion of the screening vector was cloned by the Gibson assembly method using the synthesized pooled DNA oligo to prepare each plasmid of a plasmid library.

That is, the plasmid library consisted of 100 plasmids for wild-type sequences designed to be able to produce wild-type AAV2 capsids, 100 plasmids for stop codon sequences, 27,000 random mutation-based variant sequence plasmids (random library) designed to be able to produce AAV2 capsid variants comprising VP1 variants in which the VP1 561 to 588 positions of the amino acid sequence positions of VP1 are modified, and 70,000 machine learning-based variant sequence plasmids (machine learning library) designed to be able to produce AAV2 capsid variants comprising VP1 variants in which the VP1 561 to 588 positions of the amino acid sequence positions of VP1 are modified.

The main elements of each plasmid in the plasmid library and the structure of each plasmid based on them are illustrated as follows:

- a plasmid for wild-type sequence: ITR-CAG promoter-wild-type AAV2 cap gene-bGH poly A-ITR
- a random mutation-based variant sequence plasmid: ITR-CAG promoter-AAV2 variant cap gene-bGH poly A-ITR
- a machine learning-based variant sequence plasmid: ITR-CAG promoter-AAV2 variant cap gene-bGH poly A-ITR 1-1-3. Next Generation Sequencing (NGS) for Plasmid Libraries After a region comprising VP1 561 to 588 of the constructed plasmid library was amplified using 10 ng of the plasmid library, Phusion High-Fidelity DNA Polymerase (NEB), and primers (Table 01), samples were purified using a fragment DNA purification kit (Intronbio). The purified samples were prepared in a sample state capable of undergoing NGS through Truseq Nano DNA library construction, and sequencing reads were produced through paired end sequencing on the illumina Novaseq platform 150PE. For the NGS of the plasmid library, two technical replicates were performed, and the average reads of 100 from two technical replicates for each variant were set as the criterion. Among a total of 99,000 sequences, 96,400 sequences that passed the read >100 criterion (100 WTs, 100 Stops, 27,000 random mutations, and 69,200 machine learning-based sequences) were selected. The selected 96,400 sequences were used for subsequent experiments, such as frequency analysis and diversity analysis through AAV library packaging. Therefore, the coverage of the constructed plasmid library was confirmed to be approximately 99% (100×96,400/97,200). Frequency was defined as the relative read count in the same NGS and was calculated using the equation "frequency=read count of the corresponding variant/total read count of 96,400." In addition, it was confirmed that the correlation of the frequency of each variant between the two technical replicates was at a high level (Pearson R=0.99).

TABLE 01

| Information on primers used | |
|---|---|
| Primer Name | Sequence (5'-3') |
| AAV2-lib-F2 | GAGCGGGGTTCTCATCTTTGG (SEQ ID NO. 155) |
| AAV2-lib-R1 | TGCCTGGAAGAACGCCTTGT (SEQ ID NO. 156) |

1-1-4. AAV Library Preparation (AAV Capsid Library Packaging)

Expi293F™ suspension cells (A14527, Gibco) were maintained by putting 0.5× penicillin/streptomycin (Thermo) into Expi293™ Expression medium (Thermo) and performing subculture twice/week.

Transfection was performed on a total scale of 500 ml and N=3 (3 biological replicates) by treating Expi293F cells (2.5E+6 cells/ml) with the constructed plasmid library (pAAV2-Library), pREP (rep plasmid), and pHelper (helper plasmid) at a mass ratio of 1:10:15 and with PEI at a ratio of 2:1 (PEI μl: DNA μg). About 18 hours after transfection, the cells were treated with 0.1 M (final concentration) sucrose, and about 4 days after transfection, the cells were treated with 0.5 M (final concentration) NaCl, followed by incubation at 37° C. for 3 hours. Thereafter, a culture medium was put into a 250 ml tube, the tube was centrifuged at 3,300 g for 30 min at 4° C., and the cell supernatant was filtered through a 0.45 μm PES filter. After a 40% PEG8000 solution was added in an amount equivalent to ¼ of the cell supernatant volume, the resulting mixture was incubated at 125 rpm for 1 hr at 4° C. in a stirrer and then was incubated at 0 rpm for 16 hrs at 4° C. Thereafter, the same amount was put into a 250 ml tube, and the tube was centrifuged at 3300 g for 30 min at 4° C. Thereafter, after pellets were dissolved in a resuspension buffer and collected in a 50 ml conical tube, 2 mM $MgCl_2$ and 50 units/ml benzonase were added and incubated in a water bath at 37° C. for 1 hr, centrifugation was performed at 2000 g for 30 min at 4° C., and the supernatant was subjected to iodixanol gradient purification. AAV was extracted from a 40% iodixanol fraction, only high-purity AAV was collected through silver staining, and the buffer was replaced with a formulation buffer (PBS-0.001% PF-68) using a spin concentrator (Sartorius, Cat no. VS2042) to create a finally purified AAV library. The structure of the genome (viral genome) of each AAV in the constructed AAV library is illustrated based on its main elements as follows: ITR-CAG promoter-wild type AAV2 or AAV2 variant cap gene-bGH poly A-ITR 1-1-5. NGS for AAV Libraries The constructed AAV library was treated with Dnase1 and Proteinase K, and then the viral genomes were extracted using a DNA purification kit. Thereafter, the capsid regions of the viral genomes were amplified using about 10 ng of viral DNA, Phusion High-Fidelity DNA Polymerase (NEB), and primers (Table 01), and then the sample was purified using a fragment DNA purification kit (Intronbio). The purified sample was prepared in a sample state capable of undergoing NGS through Truseq Nano DNA library construction, and sequencing reads were produced through paired end sequencing on the illumina Novaseq platform 150PE. For NGS of the AAV library, two technical replicates per biological replicate were performed on three biological replicates, and it was confirmed that the correlations of frequencies for each variant between these technical replicates are all at a high level (Pearson R >0.98).

1-1-6. AAV Library Correlation and Diversity Performance Analysis

The frequencies of the 96,400 sequences selected for each biological replicate of the three AAV libraries were calculated, and the Pearson R correlation between the biological replicates was analyzed using these values.

The diversity performance of the AAV library was analyzed by determining the viability by the number of mutations. Specifically, the frequency ratio (Frequency_V/Frequency_P) for each sequence was first calculated by normalizing the frequency of the packaged AAV library to the frequency value of the plasmid library used for virus production. Hereafter, the viability cutoff was set at 1.4, which is 5% of the average frequency ratio (Frequency_V/Frequency_P) value (27.9) of WT, and sequences with values of 1.4 or higher were classified as viable sequences. Considering that the proportion of viable sequences decreases as the number of mutations increases, the proportion of viable sequences by the number of mutations for the random mutation library and the machine learning-based library was calculated to compare the diversity performances of these two libraries.

1-2. Results

The machine learning model was developed by performing training on the viability (packaging function) data of the random mutation library constructed by targeting VP1 561 to 588 positions (28 amino acids) in the amino acid sequence of AAV2 VP1. The developed machine learning model was used to secure variant sequences that were predicted to have viable functions. Thereafter, for comparison under the same conditions, plasmid libraries for random mutation sequences (random mutation library or random library) and machine learning-based variant sequences (machine learning library) were constructed in the same pool, and AAV libraries corresponding to three biological replicates were produced.

After illumina Nova-seq NGS (amplicon sequencing) was performed on these three AAV libraries, the frequency (relative read count) of each variant was calculated to analyze a correlation between the AAV libraries. As a result of the analysis, a high positive correlation could be confirmed between each library (Pearson R=0.94 between Library 1 and Library 2; Pearson R=0.91 between Library 1 and Library 3; Pearson R=0.95 between Library 2 and Library 3) (FIG. 01). Specifically, FIG. 01 discloses the results of a correlation analysis of three biological replicates of the AAV library. Two NGS technical replicates were produced for each biological replicate, and the average frequency value of the two technical replicates was used for correlation analysis.

Through correlation analysis of biological replicates of the AAV library, it was possible to confirm the high reliability of the overall AAV library production and NGS data.

Figure 2:
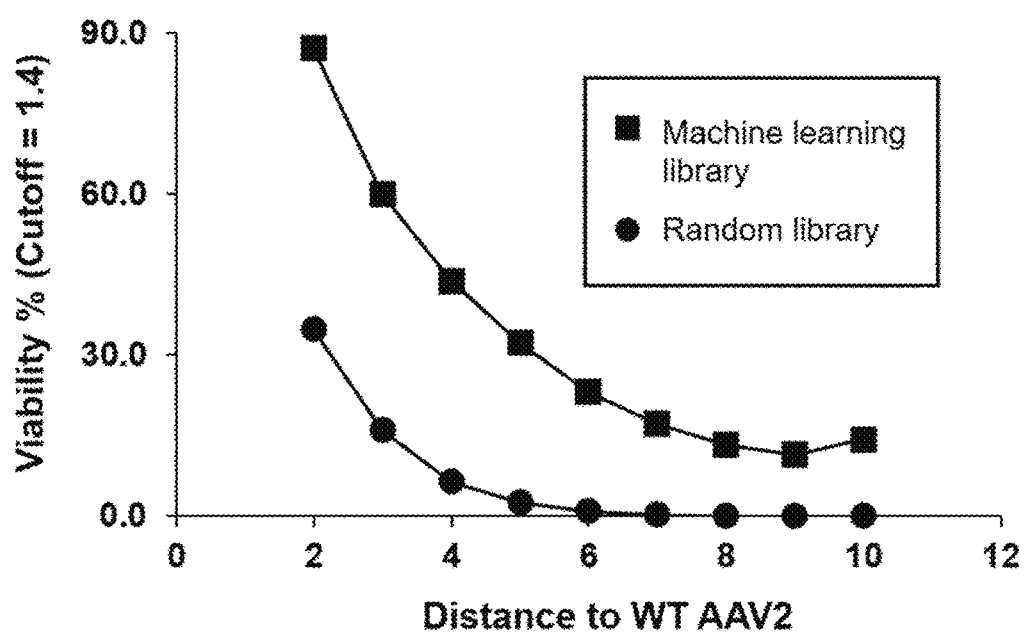
FIG. 2 illustrates the results of a diversity performance analysis between a random library and a machine learning-based library.

Thereafter, as described above, the viability of each variant by the number of mutations was analyzed to compare the diversity functions of the random library and the machine learning library. For viability analysis, the value obtained by normalizing the frequency in the AAV library (Frequency_V) to the frequency in the plasmid library used for AAV production (Frequency_P) for each variant was calculated, 5% of the average frequency ratio (Frequency_V/Frequency_P) value of the 100 WT sequences was set as a viability cutoff (1.4), and variant sequences (or AAV variants) with a value equal to or more than the viability cutoff were classified as viable sequences for analysis. The diversity performance analysis results between the random library and the machine learning library are disclosed in FIG. 02. The x-axis of the graph in FIG. 02 shows the number of mutations (number of mutations compared to WT AAV2), which is shown on the graph as Distance to WT AAV2. For example, when the amino acid sequence of the region corresponding to 561 to 588 of wild-type AAV2 VP1 of an AAV2 variant has a difference (mutation) of two amino acids compared to the 28 amino acid sequence of 561 to 588 of wild-type AAV2 VP1, the AAV2 variant belongs to a group in which the Distance to WT AAV2 is 2. As another example, an AAV2 variant with a Distance to WT AAV2 of 4 has four amino acid differences (that is, mutations) compared to the amino acid sequence of 561 to 588 of wild-type AAV2 VP1. The viability % in FIG. 02 shows the proportion of AAV variants that have values equal to or more than the above-described viability cutoff. For example, among the AAV variants with a Distance to WT AAV2 of 2, the AAV variants having a Frequency_V/Frequency_P value of 1.4 or more were confirmed to be about 90%. The average frequency value of the AAV library (an average of a total of six AAV library replicates: three AAV library biological replicates, two technical replicates per biological replicate) was used for Frequency_V, and the average frequency value of the plasmid library (average of two technical replicates) was used for Frequency_P. Diversity performance analysis results show that the viability function of the machine learning library is much higher than that of the random library under all mutation number conditions. In the case of the random library, viable sequences were partially present under conditions involving a small number in approximately 2 to 3 amino acid mutations, but almost no viable sequences were confirmed under conditions involving 5 or more mutations. In contrast, the machine learning library showed a viability of 30% or more under five mutation conditions (Distance to WT AAV2=5), and showed a viability of 10% or more even under ten mutation conditions. Accordingly, for example, it is confirmed that 30% or more of AAV variants under five mutational conditions have a packaging function, and that 10% or more of AAV variants under ten mutation conditions have a packaging function. The function of the sequences predicted to have packaging functions based on the machine learning model could be experimentally verified, and in particular, the utility of machine learning could be clearly confirmed under a number of mutation conditions required to enhance the delivery function of WT.

Example 2. Acquisition of AAV Variants (Capsid Variant Sequences) with Excellent RPE Delivery Function 2-1. Method The inventors of the present disclosure injected the AAV library into mouse eyes and analyzed the RPE delivery function of each variant in the AAV library to finally select AAV variants with an excellent delivery function from the AAV library. Hereinafter, the process of selecting excellent AAV variants will be described in detail.

2-1-1. In Vivo Mouse Injection and RPE Tissue Isolation

Adult C57BL/6J mice (8 weeks old, 22 to 30 g, N=6) were subretinally injected with the AAV library (1E+12 vg/ml) at a volume of 1 μL/eye to deliver a total of 1E+9 virus genome (vg), and the injection was performed via unilateral injection to the left eye (OS) only. To determine whether the subretinal injection was successful, retinal bleb formation was confirmed by FP/OCT photography, and only mice with confirmed blebs were used for subsequent analysis. In addition, the same dose of the AAV library was injected intravitreally into adult C57BL/6J mice (8 weeks old, 22 to 30 g, N=6) at a volume of 1 μL/eye.

On day 28 after administration, electroretinogram (ERG) tests were performed on the injected animals to confirm that there were no abnormalities in overall retinal function, and on day 29 after administration, the eyes of all injected mice were removed to isolate the neural retina and RPE tissue.

2-1-2. NGS for Mouse RPE

The isolated RPE tissue was used for extraction of genomic DNA and RNA using a homogenization and Quick DNA/RNA Miniprep Plus kit (Zymo Research). The extracted RNA was synthesized using a cDNA Reverse-transcription kit (Thermo Fisher), the capsid library region was amplified using Phusion High-Fidelity DNA Polymerase (NEB) and primers (Table 01), and then a sample was purified using a fragment DNA purification kit (Intronbio). The purified sample was prepared in a sample state capable of undergoing NGS through Truseq Nano DNA library construction, and sequencing reads were produced through paired end sequencing on the illumina Novaseq platform 150PE.

2-1-3. Analysis of RPE Delivery Function of AAV Library

A delivery efficiency analysis was performed by a method of calculating the frequency (Frequency_RPE) of each sequence (i.e., each AAV variant) from the NGS data for RPE tissue cDNA and comparing the frequency ratio (Frequency_RPE/Frequency_V) values obtained by normalizing this value to the frequency (Frequency_V) of each sequence (i.e., each AAV variant) in the AAV library used for injection. The frequency ratio (Frequency_RPE/Frequency_V) values for each variant analyzed for each of six individuals by injection route (subretinal, intravitreal) were compared with the frequency ratio (Frequency_RPE/Frequency_V) value of the reference WT AAV2, and statistical significance was analyzed using the Student's t-test. In this case, the frequency ratio (Frequency_RPE/Frequency_V) of each individual WT AAV2 was calculated using the average frequency ratio (Frequency_RPE/Frequency_V) value of 100 injected sequences.

Statistical analysis was performed using the Student's t-test method, with $p<0.05$ used as the significance criterion.

2-2. Results

The AAV library was injected into mouse eyes via subretinal injection and intravitreal injection, the two most commonly used routes of administration (ROAs) in gene therapy clinical trials, and the sequences with an excellent delivery function for each ROA compared to WT AAV2 were analyzed. For the delivery function analysis, after delivery to retinal pigment epithelium cells (RPE), the frequency values (Frequency_RPE) of NGS for RNA samples expressed on a CAG promoter were analyzed, and the frequency ratios (Frequency_RPE/Frequency_V) obtained by normalizing the value to the frequency of the AAV library (Frequency_V) used for injection were calculated and compared for each capsid sequence. For the six individuals used for each ROA, the capsid sequences (AAV variants) with an excellent delivery function were compared to WT AAV2 for each ROA in comparison with the frequency ratio (Frequency_RPE/Frequency_V) value of WT AAV2 used as a benchmark.

Figure 3:
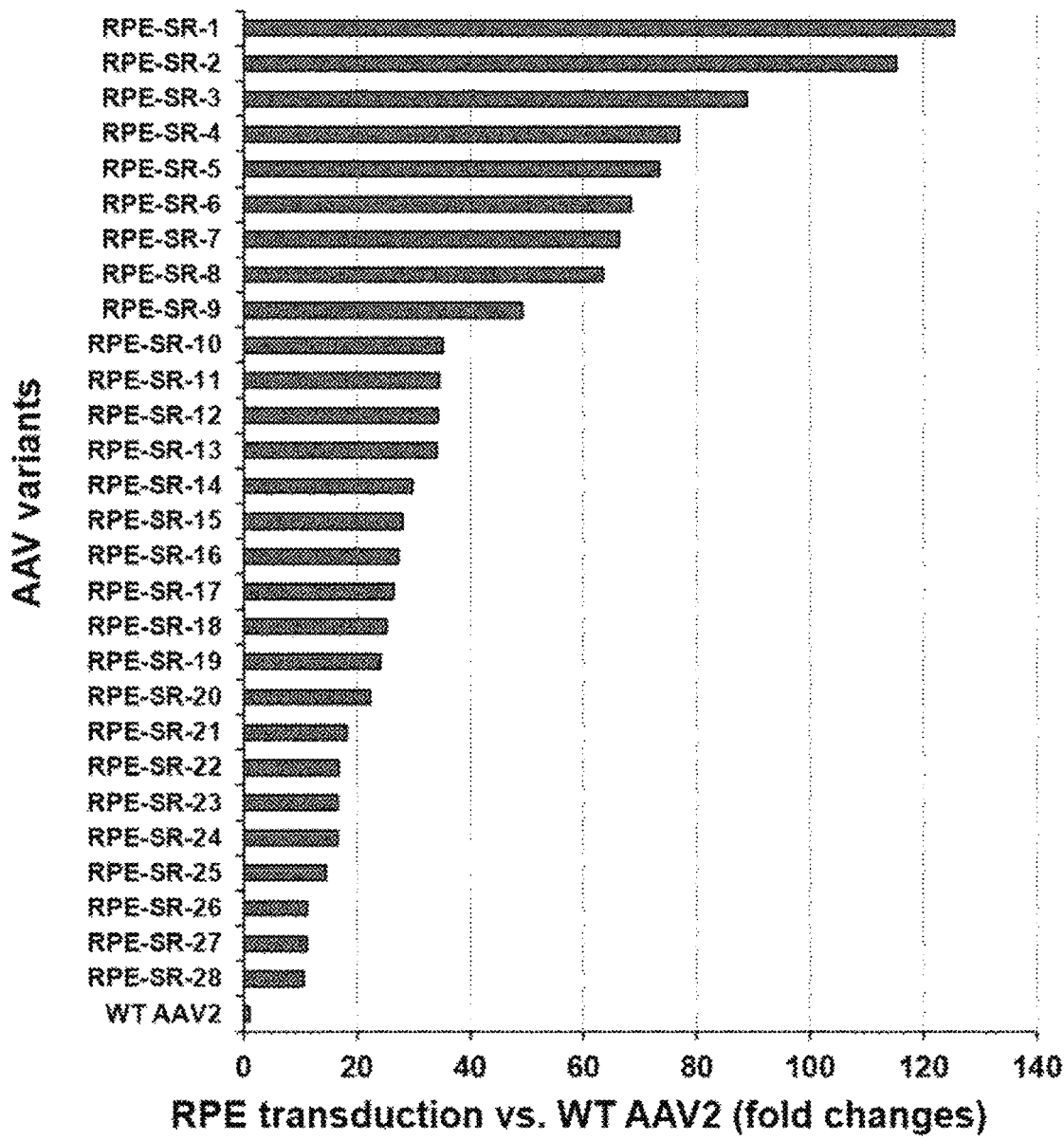
FIG. 3 illustrates the results of an analysis of the RPE transduction function of 28 excellent AAV variants selected through mouse subretinal injection experiments and wild-type AAV2.

In the case of subretinal injection, among a total of 96,400 AAVs in the AAV library, 85,164 AAV variants were confirmed to show lower delivery efficiency than wild-type AAV2, and 11,236 AAV variants (about 11%) [AAVs with a 2-2. Results (Frequency_RPE/Frequency_V) value of 1-fold or more compared to wild-type AAV] were confirmed to show higher delivery efficiency than wild-type AAV2. Furthermore, 28 AAV variants were confirmed to have a statistically significantly excellent RPE delivery function in subretinal injection, and the comparison results of these 28 AAV variants with WT AAV2 are shown in FIG. 03. Specifically, FIG. 03 shows a fold change (AAV frequency ratio/WT AAV2 frequency ratio) value calculated through the frequency ratio of 28 AAV variants and the WT AAV2 frequency ratio. All 28 AAV variants showed 10-fold or more RPE delivery ability compared to WT AAV2, and 8 of these AAV variants showed a 50-fold or more delivery function. The three AAV variants with the highest delivery functions showed 125-, 115-, and 89-fold delivery superiority, respectively, compared to WT AAV2. Statistical analysis was performed using the Student's t-test, and sequences corresponding to $p<0.05$ were classified as significant sequences. In FIG. 03, SR refers to subretinal injection, and RPE-SR-1 to RPE-SR-28 represent each of the 28 AAV variants.

The VP1 561 to 588 amino acid sequences (amino acid sequences of the mutated region) of the capsids of these 28 AAV variants (RPE-SR1 to RPE-SR28) and the DNA sequences encoding the same are shown in Table 02, and the frequency ratio (Frequency_RPE/Frequency_V) for each individual, the t-test results for comparing the delivery functions of WT AAV2, and the results of fold-change comparison with WT AAV2 are shown in Table 03.

TABLE 02

WT AAV2 and VP1 561 to 588 amino acid sequences of 28 AAV
variant capsids and DNA sequences encoding the same

| Name | Amino Acid Sequence of VP1 561-588 | DNA sequence encoding the AA sequence |
|---|---|---|
| WT AAV2 | DEEEIRTTNPVATEQYGSVSTNLQRGNR (SEQ ID NO: 94) | — |
| RPE-SR-28 (variant 1) | DEEEIAATNPVATESYGEVATNLQRGNV (SEQ ID NO: 95) | GACGAGGAGGAGATCGCCGCCACCAACCCCGTGGCCACCGAGAGCTACGGCGAGGTGGCCACCAACCTGCAGAGAGGCAACGTG (SEQ ID NO: 125) |
| RPE-SR-27 (variant 2) | DEQEVAATNPVATESWGSVSTNLQRGNT (SEQ ID NO: 96) | GACGAGCAGGAGGTGGCCGCCACCAACCCCGTGGCCACCGAGAGCTGGGGCAGCGTGAGCACCAACCTGCAGAGAGGCAACACC (SEQ ID NO: 126) |
| RPE-SR-26 (variant 3) | DESEIRTTNPIATEQWGSVSTNLQNGNR (SEQ ID NO: 97) | GACGAGAGCGAGATCAGAACCACCAACCCCATCGCCACCGAGCAGTGGGGCAGCGTGAGCACCAACCTGCAGAACGGCAACAGA (SEQ ID NO: 127) |
| RPE-SR-25 (variant 4) | DEEEIATTNPVATEQWGSVSTNLQRGAT (SEQ ID NO: 98) | GACGAGGAGGAGATCGCCACCACCAACCCCGTGGCCACCGAGCAGTGGGGCAGCGTGAGCACCAACCTGCAGAGAGGCGCCACC (SEQ ID NO: 128) |
| RPE-SR-24 (variant 5) | DESEIATTNPVATESYGEVSTNLQRNPV (SEQ ID NO: 99) | GACGAGAGCGAGATCGCCACCACCAACCCCGTGGCCACCGAGAGCTACGGCGAGGTGAGCACCAACCTGCAGAGAAACCCCGTG (SEQ ID NO: 129) |
| RPE-SR-23 (variant 6) | DEEEIRTTNPVAYEQYGVVATNLQNSNA (SEQ ID NO: 100) | GACGAGGAGGAGATCAGAACCACCAACCCCGTGGCCTACGAGCAGTACGGCGTGGTGGCCACCAACCTGCAGAACAGCAACGCC (SEQ ID NO: 130) |
| RPE-SR-22 (variant 7) | DEAEIATTNPVAAEQYGEVSTNLQNGNR (SEQ ID NO: 101) | GACGAGGCCGAGATCGCCACCACCAACCCCGTGGCCGCCGAGCAGTACGGCGAGGTGAGCACCAACCTGCAGAACGGCAACAGA (SEQ ID NO: 131) |
| RPE-SR-21 (variant 8) | DEQEVAATNPVATEHYGQVATNLQTGNR (SEQ ID NO: 102) | GACGAGCAGGAGGTGGCCGCCACCAACCCCGTGGCCACCGAGCACTACGGCCAGGTGGCCACCAACCTGCAGACCGGCAACAGA (SEQ ID NO: 132) |
| RPE-SR-20 (variant 9) | DEEEINTTNPVYTEQYGSVSTNLQRGNI (SEQ ID NO: 103) | GACGAAGAGGAAATCAACACAACCAATCCCGTGTACACGGAGCAGTATGGTTCTGTATCTACCAACCTCCAGAGAGGCAACATC (SEQ ID NO: 133) |
| RPE-SR-19 (variant 10) | DEQEVAATNPVADEQYGVVATNLQRGNV (SEQ ID NO: 104) | GACGAGCAGGAGGTGGCCGCCACCAACCCCGTGGCCGACGAGCAGTACGGCGTGGTGGCCACCAACCTGCAGAGAGGCAACGTG (SEQ ID NO: 134) |
| RPE-SR-18 (variant 11) | DESEIAATNPVATEQWGSVATNRQRGET (SEQ ID NO: 105) | GACGAGAGCGAGATCGCCGCCACCAACCCCGTGGCCACCGAGCAGTGGGGCAGCGTGGCCACCAACAGACAGAGAGGCGAGACC (SEQ ID NO: 135) |
| RPE-SR-17 (variant 12) | DEQEVAATNPVATEQWGEVSTNLQRSTT (SEQ ID NO: 106) | GACGAGCAGGAGGTGGCCGCCACCAACCCCGTGGCCACCGAGCAGTGGGGCGAGGTGAGCACCAACCTGCAGAGAAGCACCACC (SEQ ID NO: 136) |
| RPE-SR-16 (variant 13) | QESEIAATNPVATEQWGVVATNLQNGTR (SEQ ID NO: 107) | CAGGAGAGCGAGATCGCCGCCACCAACCCCGTGGCCACCGAGCAGTGGGGCGTGGTGGCCACCAACCTGCAGAACGGCACCAGA (SEQ ID NO: 137) |
| RPE-SR-15 (variant 14) | DESEVAATNPVATEQWGEVSTNNQRGTT (SEQ ID NO: 108) | GACGAGAGCGAGGTGGCCGCCACCAACCCCGTGGCCACCGAGCAGTGGGGCGAGGTGAGCACCAACAACCAGAGAGGCACCACC (SEQ ID NO: 138) |

TABLE 02-continued

WT AAV2 and VP1 561 to 588 amino acid sequences of 28 AAV variant capsids and DNA sequences encoding the same

| Name | Amino Acid Sequence of VP1 561-588 | DNA sequence encoding the AA sequence |
|---|---|---|
| RPE-SR-14 (variant 15) | DEEEIRTTNPVATEQYGSVSTNIQHGNR (SEQ ID NO: 109) | GACGAAGAGGAAATCAGGACAACCAATCCCGTGGCTACGGAGCAGTATGGTTCTGTATCTACCAACATCCAGCACGGCAACAGA (SEQ ID NO: 139) |
| RPE-SR-13 (variant 16) | DEEEIRTTNPVATEQYGSVSTWLQRGNR (SEQ ID NO: 110) | GACGAAGAGGAAATCAGGACAACCAATCCCGTGGCTACGGAGCAGTATGGTTCTGTATCTACCTGGCTCCAGAGAGGCAACAGA (SEQ ID NO: 140) |
| RPE-SR-12 (variant 17) | DEQEIAATNPVATEQYGEVSTNLQNQNR (SEQ ID NO: 111) | GACGAGCAGGAGATCGCCGCCACCAACCCCGTGGCCACCGAGCAGTACGGCGAGGTGAGCACCAACCTGCAGAACCAGAACAGA (SEQ ID NO: 141) |
| RPE-SR-11 (variant 18) | QESEIAATNPVATEQWGEVATNLQRGTT (SEQ ID NO: 112) | CAGGAGAGCGAGATCGCCGCCACCAACCCCGTGGCCACCGAGCAGTGGGGCGAGGTGGCCACCAACCTGCAGAGAGGCACCACC (SEQ ID NO: 142) |
| RPE-SR-10 (variant 19) | DEWEIRTTNPVATEQYGSVSTNLQRLNR (SEQ ID NO: 113) | GACGAATGGGAAATCAGGACAACCAATCCCGTGGCTACGGAGCAGTATGGTTCTGTATCTACCAACCTCCAGAGACTGAACAGA (SEQ ID NO: 143) |
| RPE-SR-9 (variant 20) | DEAEIAATNPVATEQWGEVSTNTQNGAR (SEQ ID NO: 114) | GACGAGGCCGAGATCGCCGCCACCAACCCCGTGGCCACCGAGCAGTGGGGCGAGGTGAGCACCAACACCCAGAACGGCGCCAGA (SEQ ID NO: 144) |
| RPE-SR-8 (variant 21) | DEQEVAATNPVATEAYGTVSTNLQRQNT (SEQ ID NO: 115) | GACGAGCAGGAGGTGGCCGCCACCAACCCCGTGGCCACCGAGGCCTACGGCACCGTGAGCACCAACCTGCAGAGACAGAACACC (SEQ ID NO: 145) |
| RPE-SR-7 (variant 22) | DEAEIAATNPVATEQYGTVSTNLQTGNQ (SEQ ID NO: 116) | GACGAGGCCGAGATCGCCGCCACCAACCCCGTGGCCACCGAGCAGTACGGCACCGTGAGCACCAACCTGCAGACCGGCAACCAG (SEQ ID NO: 146) |
| RPE-SR-6 (variant 23) | DESEIRTTNPVATESYGEVATNLQTGTT (SEQ ID NO: 117) | GACGAGAGCGAGATCAGAACCACCAACCCCGTGGCCACCGAGAGCTACGGCGAGGTGGCCACCAACCTGCAGACCGGCACCACC (SEQ ID NO: 147) |
| RPE-SR-5 (variant 24) | DEAEIATTNPVATEQWGSVSTNLQGGNL (SEQ ID NO: 118) | GACGAGGCCGAGATCGCCACCACCAACCCCGTGGCCACCGAGCAGTGGGGCAGCGTGAGCACCAACCTGCAGGGCGGCAACCTG (SEQ ID NO: 148) |
| RPE-SR-4 (variant 25) | NESEIAATNPVATEQYGVVATNLQNGTV (SEQ ID NO: 119) | AACGAGAGCGAGATCGCCGCCACCAACCCCGTGGCCACCGAGCAGTACGGCGTGGTGGCCACCAACCTGCAGAACGGCACCGTG (SEQ ID NO: 149) |
| RPE-SR-3 (variant 26) | DESEIRTTNPVATEQWGEVATNLQNGNI (SEQ ID NO: 120) | GACGAGAGCGAGATCAGAACCACCAACCCCGTGGCCACCGAGCAGTGGGGCGAGGTGGCCACCAACCTGCAGAACGGCAACATC (SEQ ID NO: 150) |
| RPE-SR-2 (variant 27) | DEAEIAATNPVATEQYGCVASNIQNSNT (SEQ ID NO: 121) | GACGAGGCCGAGATCGCCGCCACCAACCCCGTGGCCACCGAGCAGTACGGCTGCGTGGCCAGCAACATCCAGAACAGCAACACC (SEQ ID NO: 151) |
| RPE-SR-1 (variant 28) | DESEIAATNPVAYEQYGSVTTNLQNGNN (SEQ ID NO: 122) | GACGAGAGCGAGATCGCCGCCACCAACCCCGTGGCCTACGAGCAGTACGGCAGCGTGACCACCAACCTGCAGAACGGCAACAAC (SEQ ID NO: 152) |

TABLE 03

Results of frequency ratio of 28 AAV variants in each mouse and comparison of delivery efficiency with WT AAV2

| Name | Mouse #1 | Mouse #2 | Mouse #3 | Mouse #4 | Mouse #5 | Mouse #6 | Mean | STDEV | p value | Fold change to WT AAV2 |
|---|---|---|---|---|---|---|---|---|---|---|
| WT AAV2 | 1.085 | 1.345 | 0.960 | 1.555 | 1.362 | 1.180 | 1.248 | 0.196 | | 1.00 |
| RPE-SR-28 (variant 1) | 0.021 | 14.967 | 18.766 | 2.510 | 27.925 | 14.986 | 13.196 | 9.505 | 0.038 | 10.57 |
| RPE-SR-27 (variant 2) | 20.743 | 12.814 | 6.125 | 13.577 | 10.345 | 19.740 | 13.891 | 5.088 | 0.003 | 11.13 |
| RPE-SR-26 (variant 3) | 13.311 | 11.100 | 30.619 | 12.069 | 5.731 | 10.677 | 13.918 | 7.833 | 0.015 | 11.15 |
| RPE-SR-25 (variant 4) | 5.768 | 38.771 | 15.476 | 23.366 | 9.457 | 14.921 | 17.960 | 10.791 | 0.018 | 14.39 |
| RPE-SR-24 (variant 5) | 21.687 | 27.278 | 10.655 | 31.945 | 18.923 | 14.024 | 20.752 | 7.295 | 0.002 | 16.63 |
| RPE-SR-23 (variant 6) | 32.211 | 14.501 | 9.034 | 13.552 | 10.225 | 45.107 | 20.772 | 13.314 | 0.022 | 16.64 |
| RPE-SR-22 (variant 7) | 8.597 | 24.187 | 20.589 | 31.161 | 24.444 | 15.786 | 20.794 | 7.144 | 0.002 | 16.66 |
| RPE-SR-21 (variant 8) | 10.771 | 28.019 | 31.225 | 26.354 | 27.217 | 12.270 | 22.643 | 8.019 | 0.002 | 18.14 |
| RPE-SR-20 (variant 9) | 30.270 | 29.345 | 10.544 | 24.783 | 15.481 | 56.053 | 27.746 | 14.522 | 0.010 | 22.23 |
| RPE-SR-19 (variant 10) | 28.054 | 41.133 | 22.925 | 50.989 | 22.581 | 15.468 | 30.192 | 12.140 | 0.003 | 24.19 |
| RPE-SR-18 (variant 11) | 25.523 | 26.518 | 8.478 | 50.684 | 66.344 | 11.672 | 31.537 | 20.679 | 0.022 | 25.27 |
| RPE-SR-17 (variant 12) | 16.126 | 36.810 | 27.693 | 62.708 | 36.339 | 19.085 | 33.127 | 15.355 | 0.006 | 26.54 |
| RPE-SR-16 (variant 13) | 17.480 | 51.145 | 23.977 | 73.963 | 21.914 | 15.627 | 34.018 | 21.401 | 0.019 | 27.26 |
| RPE-SR-15 (variant 14) | 34.765 | 51.956 | 9.635 | 55.140 | 28.258 | 30.896 | 35.108 | 15.269 | 0.004 | 28.13 |
| RPE-SR-14 (variant 15) | 20.555 | 42.102 | 29.401 | 56.605 | 40.049 | 34.144 | 37.143 | 11.224 | 0.001 | 29.76 |
| RPE-SR-13 (variant 16) | 17.944 | 63.054 | 27.656 | 86.426 | 22.735 | 37.678 | 42.582 | 24.458 | 0.013 | 34.12 |
| RPE-SR-12 (variant 17) | 16.401 | 71.951 | 17.071 | 93.376 | 31.819 | 26.717 | 42.889 | 29.285 | 0.025 | 34.37 |
| RPE-SR-11 (variant 18) | 13.400 | 63.874 | 35.733 | 59.534 | 39.653 | 45.539 | 42.955 | 16.612 | 0.002 | 34.42 |
| RPE-SR-10 (variant 19) | 42.906 | 48.025 | 19.770 | 59.717 | 76.126 | 17.121 | 43.944 | 20.841 | 0.006 | 35.21 |
| RPE-SR-9 (variant 20) | 52.708 | 80.973 | 39.549 | 89.852 | 54.834 | 50.254 | 61.362 | 17.856 | 0.001 | 49.17 |
| RPE-SR-8 (variant 21) | 97.895 | 51.259 | 130.939 | 76.319 | 84.981 | 33.772 | 79.194 | 31.391 | 0.003 | 63.46 |
| RPE-SR-7 (variant 22) | 84.246 | 126.077 | 87.326 | 34.076 | 107.464 | 57.137 | 82.721 | 30.377 | 0.002 | 66.28 |
| RPE-SR-6 (variant 23) | 35.274 | 106.095 | 106.298 | 131.016 | 70.726 | 62.804 | 85.369 | 32.105 | 0.002 | 68.40 |
| RPE-SR-5 (variant 24) | 63.423 | 193.928 | 29.161 | 148.610 | 53.797 | 59.618 | 91.423 | 58.971 | 0.019 | 73.26 |
| RPE-SR-4 (variant 25) | 30.271 | 139.329 | 28.669 | 166.651 | 105.889 | 104.923 | 95.956 | 51.478 | 0.009 | 76.89 |
| RPE-SR-3 (variant 26) | 57.823 | 147.673 | 164.987 | 121.881 | 131.914 | 40.047 | 110.721 | 45.965 | 0.003 | 88.72 |
| RPE-SR-2 (variant 27) | 87.801 | 94.283 | 231.815 | 108.994 | 195.518 | 143.550 | 143.660 | 53.573 | 0.002 | 115.11 |
| RPE-SR-1 (variant 28) | 91.546 | 122.732 | 363.306 | 81.205 | 193.157 | 86.243 | 156.365 | 100.064 | 0.018 | 125.29 |

Figure 4:
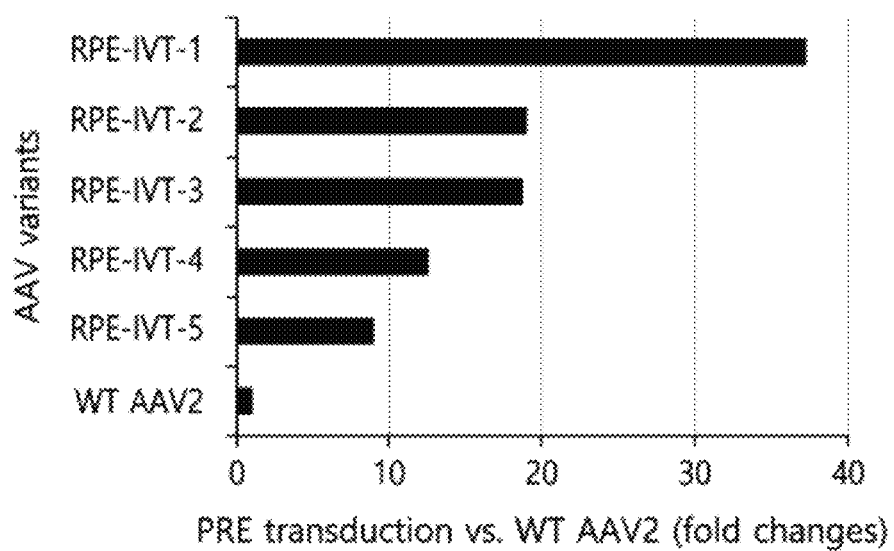
FIG. 4 illustrates the results of an analysis of the RPE transduction function of five excellent AAV variants selected through mouse intravitreal injection experiments and wild-type AAV2.

In the case of intravitreal injection, among a total of 96,400 AAVs in the library, 88,773 AAV variants were confirmed to show lower delivery efficiency than wild-type AAV2, and 7,627 AAV variants (about 7%) [AAVs with a (Frequency_RPE/Frequency_V) value of 1-fold or more compared to wild-type AAV] were confirmed to show higher delivery efficiency than wild-type AAV2. Furthermore, 5 AAV variants were confirmed to have a statistically significantly excellent RPE delivery function in intravitreal injection, and the comparison results of these 5 AAV variants with WT AAV2 are shown in FIG. 04. Specifically, FIG. 04 shows a fold change (AAV frequency ratio/WT AAV2 frequency ratio) value calculated through the frequency ratio of 5 AAV variants and the WT AAV2 frequency ratio. All five AAV variants had a delivery function that was 9-fold or more than of WT AAV2, and three of these AAV variants showed a delivery function that was 34-, 19-, and 19-fold that of WT AAV2, respectively. In FIG. 04, IVT refers to intravitreal injection, and RPE-IVT-1 to RPE-IVT-5 represent each of the 5 AAV variants.

The VP1 561 to 588 amino acid sequences (amino acid sequences of the varied region) of the capsids of these 5 AAV variants (RPE-IVT-1 to RPE-IVT-5)) and the DNA sequences encoding the same are shown in Table 04, and the frequency ratio (Frequency_RPE/Frequency_V) for each individual, the t-test results for comparing the delivery functions of WT AAV2, and the results of fold-change comparison with WT AAV2 are shown in Table 05.

Meanwhile, RPE-SR-20 (variant 9), RPE-SR-19 (variant 10), and RPE-SR-15 (variant 14) were confirmed to have an excellent delivery function even in intravitreal injection (RPE-SR-20 is identical to RPE-IVT-1, RPE-19 is identical to RPE-IVT-2, and RPE-SR-15 is identical to RE-IVT3).

TABLE 04

WT AAV2 and VP1 561 to 588 amino acid sequences of capsids of 5 AAV variants and DNA sequences encoding the same

| Name | Amino Acid Sequence of VP1 561-588 | DNA sequence encoding the AA sequence |
| --- | --- | --- |
| WT AAV2 | DEEEIRTTNPVATEQY GSVSTNLQRGNR (SEQ ID NO: 94) | — |
| RPE-IVT-5 (variant 29) | DESEIAATNPVATEQY GCVATNLQRGYV (SEQ ID NO: 123) | GACGAGAGCGAGATCGCCGCCACCAACCCCGT GGCCACCGAGCAGTACGGCTGCGTGGCCACCA ACCTGCAGAGAGGCTACGTG (SEQ ID NO: 153) |
| RPE-IVT-4 (variant 30) | DEQEVAATNPVATEQ WGEVSTNLORGNE (SEQ ID NO: 124) | GACGAGCAGGAGGTGGCCGCCACCAACCCCGT GGCCACCGAGCAGTGGGGCGAGGTGAGCACC AACCTGCAGAGAGGCAACGAG (SEQ ID NO: 154) |
| RPE-IVT-3 (variant 14) | DESEVAATNPVATEQ WGEVSTNNQRGTT (SEQ ID NO: 108) | GACGAGAGCGAGGTGGCCGCCACCAACCCCGT GGCCACCGAGCAGTGGGGCGAGGTGAGCACC AACAACCAGAGAGGCACCACC (SEQ ID NO: 138) |
| RPE-IVT-2 (variant 10) | DEQEVAATNPVADEQ YGVVATNLQRGNV (SEQ ID NO: 104) | GACGAGCAGGAGGTGGCCGCCACCAACCCCGT GGCCGACGAGCAGTACGGCGTGGTGGCCACCA ACCTGCAGAGAGGCAACGTG (SEQ ID NO: 134) |
| RPE-IVT-1 (variant 9) | DEEEINTTNPVYTEQY GSVSTNLQRGNI (SEQ ID NO: 103) | GACGAAGAGGAAATCAACACAACCAATCCCGTG TACACGGAGCAGTATGGTTCTGTATCTACCAAC CTCCAGAGAGGCAACATC (SEQ ID NO: 133) |

TABLE 05

Results of frequency ratio of 5 AAV variants and comparison of delivery efficiency with WT AAV2

| Name | Mouse #1 | Mouse #2 | Mouse #3 | Mouse #4 | Mouse #5 | Mouse #6 | Mean | STDEV | p value | Fold change to WT AAV2 |
| --- | --- | --- | --- | --- | --- | --- | --- | --- | --- | --- |
| WT AAV2 | 1.544 | 0.658 | 1.635 | 1.661 | 1.230 | 0.972 | 1.283 | 1.671 | | 1 |
| RPE-IVT-5 (variant 29) | 46.199 | 0.403 | 8.633 | 48.968 | 5.677 | 36.304 | 11.511 | 8.657 | 0.046 | 8.97 |
| RPE-IVT-4 (variant 30) | 5.578 | 27.257 | 9.439 | 8.172 | 0.903 | 17.716 | 16.098 | 11.988 | 0.040 | 12.55 |
| RPE-IVT-3 (variant 14) | 4.585 | 32.110 | 6.446 | 14.565 | 6.110 | 32.773 | 23.997 | 10.366 | 0.004 | 18.70 |
| RPE-IVT-2 (variant 10) | 83.081 | 100.527 | 21.197 | 0.030 | 27.487 | 54.868 | 24.364 | 19.981 | 0.049 | 18.99 |
| RPE-IVT-1 (variant 9) | 18.064 | 28.005 | 27.488 | 23.993 | 6.185 | 40.244 | 47.865 | 35.302 | 0.032 | 37.31 |

The entire amino acid sequences of VP1, VP2, and VP3 of the capsids of variants 1 to 30 are disclosed in Table 06.

TABLE 06

Entire amino acid sequences of VP1, VP2, and VP3 of variants 1 to 30

| | Name of variants in experiments | Whole amino acid sequence of VP1 | Whole amino acid sequence of VP2 | Whole amino acid sequence of VP3 |
|---|---|---|---|---|
| variant 1 | RPE-SR-28 | SEQ ID NO: 2 | SEQ ID NO: 33 | SEQ ID NO: 64 |
| variant 2 | RPE-SR-27 | SEQ ID NO: 3 | SEQ ID NO: 34 | SEQ ID NO: 65 |
| variant 3 | RPE-SR-26 | SEQ ID NO: 4 | SEQ ID NO: 35 | SEQ ID NO: 66 |
| variant 4 | RPE-SR-25 | SEQ ID NO: 5 | SEQ ID NO: 36 | SEQ ID NO: 67 |
| variant 5 | RPE-SR-24 | SEQ ID NO: 6 | SEQ ID NO: 37 | SEQ ID NO: 68 |
| variant 6 | RPE-SR-23 | SEQ ID NO: 7 | SEQ ID NO: 38 | SEQ ID NO: 69 |
| variant 7 | RPE-SR-22 | SEQ ID NO: 8 | SEQ ID NO: 39 | SEQ ID NO: 70 |
| variant 8 | RPE-SR-21 | SEQ ID NO: 9 | SEQ ID NO: 40 | SEQ ID NO: 71 |
| variant 9 | RPE-SR-20, RPE-IVT-1 | SEQ ID NO: 10 | SEQ ID NO: 41 | SEQ ID NO: 72 |
| variant 10 | RPE-SR-19, RPE-IVT-2 | SEQ ID NO: 11 | SEQ ID NO: 42 | SEQ ID NO: 73 |
| variant 11 | RPE-SR-18 | SEQ ID NO: 12 | SEQ ID NO: 43 | SEQ ID NO: 74 |
| variant 12 | RPE-SR-17 | SEQ ID NO: 13 | SEQ ID NO: 44 | SEQ ID NO: 75 |
| variant 13 | RPE-SR-16 | SEQ ID NO: 14 | SEQ ID NO: 45 | SEQ ID NO: 76 |
| variant 14 | RPE-SR-15, RPE-IVT-3 | SEQ ID NO: 15 | SEQ ID NO: 46 | SEQ ID NO: 77 |
| variant 15 | RPE-SR-14 | SEQ ID NO: 16 | SEQ ID NO: 47 | SEQ ID NO: 78 |
| variant 16 | RPE-SR-13 | SEQ ID NO: 17 | SEQ ID NO: 48 | SEQ ID NO: 79 |
| variant 17 | RPE-SR-12 | SEQ ID NO: 18 | SEQ ID NO: 49 | SEQ ID NO: 80 |
| variant 18 | RPE-SR-11 | SEQ ID NO: 19 | SEQ ID NO: 50 | SEQ ID NO: 81 |
| variant 19 | RPE-SR-10 | SEQ ID NO: 20 | SEQ ID NO: 51 | SEQ ID NO: 82 |
| variant 20 | RPE-SR-9 | SEQ ID NO: 21 | SEQ ID NO: 52 | SEQ ID NO: 83 |
| variant 21 | RPE-SR-8 | SEQ ID NO: 22 | SEQ ID NO: 53 | SEQ ID NO: 84 |
| variant 22 | RPE-SR-7 | SEQ ID NO: 23 | SEQ ID NO: 54 | SEQ ID NO: 85 |
| variant 23 | RPE-SR-6 | SEQ ID NO: 24 | SEQ ID NO: 55 | SEQ ID NO: 86 |
| variant 24 | RPE-SR-5 | SEQ ID NO: 25 | SEQ ID NO: 56 | SEQ ID NO: 87 |
| variant 25 | RPE-SR-4 | SEQ ID NO: 26 | SEQ ID NO: 57 | SEQ ID NO: 88 |
| variant 26 | RPE-SR-3 | SEQ ID NO: 27 | SEQ ID NO: 58 | SEQ ID NO: 89 |
| variant 27 | RPE-SR-2 | SEQ ID NO: 28 | SEQ ID NO: 59 | SEQ ID NO: 90 |
| variant 28 | RPE-SR-1 | SEQ ID NO: 29 | SEQ ID NO: 60 | SEQ ID NO: 91 |
| variant 29 | RPE-IVT-5 | SEQ ID NO: 30 | SEQ ID NO: 61 | SEQ ID NO: 92 |
| variant 30 | RPE-IVT-4 | SEQ ID NO: 31 | SEQ ID NO: 62 | SEQ ID NO: 93 |

Meanwhile, the AAV2 variants developed through these experimental examples have additional significances of providing an important foundation for developing excellent AAVs in humans or non-human primates, in addition to an excellent RPE delivery function in mice. The literature [Dalkara, D., Byrne, L. C., Klimczak, R. R., Visel, M., Yin, L., Merigan, W. H., . . . & Schaffer, D. V. (2013). In vivo-directed evolution of a new adeno-associated virus for therapeutic outer retinal gene delivery from the vitreous. *Science Translational Medicine,* 5 (189), 189ra76-189ra76.] discloses that an AAV2 variant library was constructed, the library was injected via intravitreal injection into mice, and then a 7m8 capsid was developed through screening. It was confirmed that this 7m8 has an excellent delivery function even in the primate retina. Furthermore, the stability and efficacy of the 7m8 have been verified, and a phase 2 clinical program is being currently conducted (see the literature [Khanani, A. M., Boyer, D. S., Wykoff, C. C., Regillo, C. D., Busbee, B. G., Pieramici, D., . . . & Kiss, S. (2024). Safety and efficacy of ixoberogene soroparvovec in neovascular age-related macular degeneration in the United States (OPTIC): a prospective, two-year, multicentre phase 1 study. *EClinicalMedicine,* 67.]). As described above, the AAV developed through mouse experiments may serve as an important foundation for the future development of excellent AAVs in primates.

What is claimed is:

1. An adeno-associated virus (AAV) variant comprising:
an AAV capsid variant,
wherein the AAV capsid variant comprises a VP1 variant having an amino acid sequence selected from SEQ ID NOs: 2 to 31.

2. The AAV variant according to claim 1, wherein the AAV capsid variant is any one selected from:

the AAV capsid variant comprising the VP1 variant having an amino acid sequence of SEQ ID NO: 2, a VP2 variant having an amino acid sequence of SEQ ID NO: 33, and a VP3 variant having an amino acid sequence of SEQ ID NO: 64;

the AAV capsid variant comprising the VP1 variant having an amino acid sequence of SEQ ID NO: 3, a VP2 variant having an amino acid sequence of SEQ ID NO: 34, and a VP3 variant having an amino acid sequence of SEQ ID NO: 65;

the AAV capsid variant comprising the VP1 variant having an amino acid sequence of SEQ ID NO: 4, a VP2 variant having an amino acid sequence of SEQ ID NO: 35, and a VP3 variant having an amino acid sequence of SEQ ID NO: 66;

the AAV capsid variant comprising the VP1 variant having an amino acid sequence of SEQ ID NO: 5, a VP2 variant having an amino acid sequence of SEQ ID NO: 36, and a VP3 variant having an amino acid sequence of SEQ ID NO: 67;

the AAV capsid variant comprising the VP1 variant having an amino acid sequence of SEQ ID NO: 6, a VP2 variant having an amino acid sequence of SEQ ID NO: 37, and a VP3 variant having an amino acid sequence of SEQ ID NO: 68;

the AAV capsid variant comprising the VP1 variant having an amino acid sequence of SEQ ID NO: 7, a VP2 variant having an amino acid sequence of SEQ ID NO: 38, and a VP3 variant having an amino acid sequence of SEQ ID NO: 69;

the AAV capsid variant comprising the VP1 variant having an amino acid sequence of SEQ ID NO: 8, a VP2 variant having an amino acid sequence of SEQ ID NO: 39, and a VP3 variant having an amino acid sequence of SEQ ID NO: 70;

the AAV capsid variant comprising the VP1 variant having an amino acid sequence of SEQ ID NO: 9, a VP2 variant having an amino acid sequence of SEQ ID NO: 40, and a VP3 variant having an amino acid sequence of SEQ ID NO: 71;

the AAV capsid variant comprising the VP1 variant having an amino acid sequence of SEQ ID NO: 10, a VP2 variant having an amino acid sequence of SEQ ID NO: 41, and a VP3 variant having an amino acid sequence of SEQ ID NO: 72;

the AAV capsid variant comprising the VP1 variant having an amino acid sequence of SEQ ID NO: 11, a VP2 variant having an amino acid sequence of SEQ ID NO: 42, and a VP3 variant having an amino acid sequence of SEQ ID NO: 73;

the AAV capsid variant comprising the VP1 variant having an amino acid sequence of SEQ ID NO: 12, a VP2 variant having an amino acid sequence of SEQ ID NO: 43, and a VP3 variant having an amino acid sequence of SEQ ID NO: 74;

the AAV capsid variant comprising the VP1 variant having an amino acid sequence of SEQ ID NO: 13, a VP2 variant having an amino acid sequence of SEQ ID NO: 44, and a VP3 variant having an amino acid sequence of SEQ ID NO: 75;

the AAV capsid variant comprising the VP1 variant having an amino acid sequence of SEQ ID NO: 14, a VP2 variant having an amino acid sequence of SEQ ID NO: 45, and a VP3 variant having an amino acid sequence of SEQ ID NO: 76;

the AAV capsid variant comprising the VP1 variant having an amino acid sequence of SEQ ID NO: 15, a VP2 variant having an amino acid sequence of SEQ ID NO: 46, and a VP3 variant having an amino acid sequence of SEQ ID NO: 77;

the AAV capsid variant comprising the VP1 variant having an amino acid sequence of SEQ ID NO: 16, a VP2 variant having an amino acid sequence of SEQ ID NO: 47, and a VP3 variant having an amino acid sequence of SEQ ID NO: 78;

the AAV capsid variant comprising the VP1 variant having an amino acid sequence of SEQ ID NO: 17, a VP2 variant having an amino acid sequence of SEQ ID NO: 48, and a VP3 variant having an amino acid sequence of SEQ ID NO: 79;

the AAV capsid variant comprising the VP1 variant having an amino acid sequence of SEQ ID NO: 18, a VP2 variant having an amino acid sequence of SEQ ID NO: 49, and a VP3 variant having an amino acid sequence of SEQ ID NO: 80;

the AAV capsid variant comprising the VP1 variant having an amino acid sequence of SEQ ID NO: 19, a VP2 variant having an amino acid sequence of SEQ ID NO: 50, and a VP3 variant having an amino acid sequence of SEQ ID NO: 81;

the AAV capsid variant comprising the VP1 variant having an amino acid sequence of SEQ ID NO: 20, a VP2 variant having an amino acid sequence of SEQ ID NO: 51, and a VP3 variant having an amino acid sequence of SEQ ID NO: 82;

the AAV capsid variant comprising the VP1 variant having an amino acid sequence of SEQ ID NO: 21, a VP2 variant having an amino acid sequence of SEQ ID NO: 52, and a VP3 variant having an amino acid sequence of SEQ ID NO: 83;

the AAV capsid variant comprising the VP1 variant having an amino acid sequence of SEQ ID NO: 22, a VP2 variant having an amino acid sequence of SEQ ID NO: 53, and a VP3 variant having an amino acid sequence of SEQ ID NO: 84;

the AAV capsid variant comprising the VP1 variant having an amino acid sequence of SEQ ID NO: 23, a VP2 variant having an amino acid sequence of SEQ ID NO: 54, and a VP3 variant having an amino acid sequence of SEQ ID NO: 85;

the AAV capsid variant comprising the VP1 variant having an amino acid sequence of SEQ ID NO: 24, a VP2 variant having an amino acid sequence of SEQ ID NO: 55, and a VP3 variant having an amino acid sequence of SEQ ID NO: 86;

the AAV capsid variant comprising the VP1 variant having an amino acid sequence of SEQ ID NO: 25, a VP2 variant having an amino acid sequence of SEQ ID NO: 56, and a VP3 variant having an amino acid sequence of SEQ ID NO: 87;

the AAV capsid variant comprising the VP1 variant having an amino acid sequence of SEQ ID NO: 26, a VP2 variant having an amino acid sequence of SEQ ID NO: 57, and a VP3 variant having an amino acid sequence of SEQ ID NO: 88;

the AAV capsid variant comprising the VP1 variant having an amino acid sequence of SEQ ID NO: 27, a VP2 variant having an amino acid sequence of SEQ ID NO: 58, and a VP3 variant having an amino acid sequence of SEQ ID NO: 89;

the AAV capsid variant comprising the VP1 variant having an amino acid sequence of SEQ ID NO: 28, a VP2 variant having an amino acid sequence of SEQ ID NO: 59, and a VP3 variant having an amino acid sequence of SEQ ID NO: 90;

the AAV capsid variant comprising the VP1 variant having an amino acid sequence of SEQ ID NO: 29, a VP2 variant having an amino acid sequence of SEQ ID NO: 60, and a VP3 variant having an amino acid sequence of SEQ ID NO: 91;

the AAV capsid variant comprising the VP1 variant having an amino acid sequence of SEQ ID NO: 30, a VP2 variant having an amino acid sequence of SEQ ID NO: 61, and a VP3 variant having an amino acid sequence of SEQ ID NO: 92; and the AAV capsid variant comprising the VP1 variant having an amino acid sequence of SEQ ID NO: 31, a VP2 variant having an amino acid sequence of SEQ ID NO: 62, and a VP3 variant having an amino acid sequence of SEQ ID NO: 93.

3. The AAV variant according to claim 1, wherein the AAV variant further comprises a nucleic acid molecule, wherein the nucleic acid molecule comprises a nucleic acid encoding a product of interest, and wherein the nucleic acid molecule is packaged in the AAV capsid variant.

4. The AAV variant according to claim 3, wherein the nucleic acid molecule further comprises a promoter, wherein the promoter is operably linked to the nucleic acid encoding the product of interest.

5. The AAV variant according to claim 4, wherein the nucleic acid molecule further comprises two ITRs, wherein the promoter and the nucleic acid encoding the product of interest are located between two ITRs.

6. The AAV variant according to claim 3, wherein the nucleic acid molecule is a single-stranded DNA.

7. The AAV variant according to claim 1, wherein the AAV capsid variant of the AAV variant comprises the VP1 variant having an amino acid sequence selected from SEQ ID NOs: 10, 11, 15, 30, and 31.

8. The AAV variant according to claim 1, wherein the AAV capsid variant of the AAV variant comprises VP1 variant having an amino acid sequence selected from SEQ ID NOs: 2 to 29.

9. An AAV capsid variant comprising a VP1 variant having an amino acid sequence selected from SEQ ID NOs: 2 to 31.

10. The AAV capsid variant according to claim 9, wherein the AAV capsid variant is any one selected from:

the AAV capsid variant comprising the VP1 variant having the amino acid sequence of SEQ ID NO: 2, a VP2 variant having an amino acid sequence of SEQ ID NO: 33, a VP3 variant having an amino acid sequence of SEQ ID NO: 64;

the AAV capsid variant comprising the VP1 variant having the amino acid sequence of SEQ ID NO: 3, a VP2 variant having an amino acid sequence of SEQ ID NO: 34, a VP3 variant having an amino acid sequence of SEQ ID NO: 65;

the AAV capsid variant comprising the VP1 variant having the amino acid sequence of SEQ ID NO: 4, a VP2 variant having an amino acid sequence of SEQ ID NO: 35, a VP3 variant having an amino acid sequence of SEQ ID NO: 66;

the AAV capsid variant comprising the VP1 variant having the amino acid sequence of SEQ ID NO: 5, a VP2 variant having an amino acid sequence of SEQ ID NO: 36, a VP3 variant having an amino acid sequence of SEQ ID NO: 67;

the AAV capsid variant comprising the VP1 variant having the amino acid sequence of SEQ ID NO: 6, a VP2 variant having an amino acid sequence of SEQ ID NO: 37, a VP3 variant having an amino acid sequence of SEQ ID NO: 68;

the AAV capsid variant comprising the VP1 variant having the amino acid sequence of SEQ ID NO: 7, a VP2 variant having an amino acid sequence of SEQ ID NO: 38, a VP3 variant having an amino acid sequence of SEQ ID NO: 69;

the AAV capsid variant comprising the VP1 variant having the amino acid sequence of SEQ ID NO: 8, a VP2 variant having an amino acid sequence of SEQ ID NO: 39, a VP3 variant having an amino acid sequence of SEQ ID NO: 70;

the AAV capsid variant comprising the VP1 variant having the amino acid sequence of SEQ ID NO: 9, a VP2 variant having an amino acid sequence of SEQ ID NO: 40, a VP3 variant having an amino acid sequence of SEQ ID NO: 71;

the AAV capsid variant comprising the VP1 variant having the amino acid sequence of SEQ ID NO: 10, a VP2 variant having an amino acid sequence of SEQ ID NO: 41, a VP3 variant having an amino acid sequence of SEQ ID NO: 72;

the AAV capsid variant comprising the VP1 variant having the amino acid sequence of SEQ ID NO: 11, a VP2 variant having an amino acid sequence of SEQ ID NO: 42, a VP3 variant having an amino acid sequence of SEQ ID NO: 73;

the AAV capsid variant comprising the VP1 variant having the amino acid sequence of SEQ ID NO: 12, a VP2 variant having an amino acid sequence of SEQ ID NO: 43, a VP3 variant having an amino acid sequence of SEQ ID NO: 74;

the AAV capsid variant comprising the VP1 variant having the amino acid sequence of SEQ ID NO: 13, a VP2 variant having an amino acid sequence of SEQ ID NO: 44, a VP3 variant having an amino acid sequence of SEQ ID NO: 75;

the AAV capsid variant comprising the VP1 variant having the amino acid sequence of SEQ ID NO: 14, a VP2 variant having an amino acid sequence of SEQ ID NO: 45, a VP3 variant having an amino acid sequence of SEQ ID NO: 76;

the AAV capsid variant comprising the VP1 variant having the amino acid sequence of SEQ ID NO: 15, a VP2 variant having an amino acid sequence of SEQ ID NO: 46, a VP3 variant having an amino acid sequence of SEQ ID NO: 77;

the AAV capsid variant comprising the VP1 variant having the amino acid sequence of SEQ ID NO: 16, a VP2 variant having an amino acid sequence of SEQ ID NO: 47, a VP3 variant having an amino acid sequence of SEQ ID NO: 78;

the AAV capsid variant comprising the VP1 variant having the amino acid sequence of SEQ ID NO: 17, a VP2 variant having an amino acid sequence of SEQ ID NO: 48, a VP3 variant having an amino acid sequence of SEQ ID NO: 79;

the AAV capsid variant comprising the VP1 variant having the amino acid sequence of SEQ ID NO: 18, a VP2 variant having an amino acid sequence of SEQ ID NO: 49, a VP3 variant having an amino acid sequence of SEQ ID NO: 80;

the AAV capsid variant comprising the VP1 variant having the amino acid sequence of SEQ ID NO: 19, a VP2 variant having an amino acid sequence of SEQ ID NO: 50, a VP3 variant having an amino acid sequence of SEQ ID NO: 81;

the AAV capsid variant comprising the VP1 variant having the amino acid sequence of SEQ ID NO: 20, a VP2 variant having an amino acid sequence of SEQ ID NO: 51, a VP3 variant having an amino acid sequence of SEQ ID NO: 82;

the AAV capsid variant comprising the VP1 variant having the amino acid sequence of SEQ ID NO: 21, a VP2 variant having an amino acid sequence of SEQ ID NO: 52, a VP3 variant having an amino acid sequence of SEQ ID NO: 83;

the AAV capsid variant comprising the VP1 variant having the amino acid sequence of SEQ ID NO: 22, a VP2 variant having an amino acid sequence of SEQ ID NO: 53, a VP3 variant having an amino acid sequence of SEQ ID NO: 84;

the AAV capsid variant comprising the VP1 variant having the amino acid sequence of SEQ ID NO: 23, a VP2 variant having an amino acid sequence of SEQ ID NO: 54, a VP3 variant having an amino acid sequence of SEQ ID NO: 85;

the AAV capsid variant comprising the VP1 variant having the amino acid sequence of SEQ ID NO: 24, a VP2 variant having an amino acid sequence of SEQ ID NO: 55, a VP3 variant having an amino acid sequence of SEQ ID NO: 86;

the AAV capsid variant comprising the VP1 variant having the amino acid sequence of SEQ ID NO: 25, a VP2 variant having an amino acid sequence of SEQ ID NO: 56, a VP3 variant having an amino acid sequence of SEQ ID NO: 87;

the AAV capsid variant comprising the VP1 variant having the amino acid sequence of SEQ ID NO: 26, a VP2 variant having an amino acid sequence of SEQ ID NO: 57, a VP3 variant having an amino acid sequence of SEQ ID NO: 88;

the AAV capsid variant comprising the VP1 variant having the amino acid sequence of SEQ ID NO: 27, a VP2 variant having an amino acid sequence of SEQ ID NO: 58, a VP3 variant having an amino acid sequence of SEQ ID NO: 89;

the AAV capsid variant comprising the VP1 variant having the amino acid sequence of SEQ ID NO: 28, a VP2 variant having an amino acid sequence of SEQ ID NO: 59, a VP3 variant having an amino acid sequence of SEQ ID NO: 90;

the AAV capsid variant comprising the VP1 variant having the amino acid sequence of SEQ ID NO: 29, a VP2 variant having an amino acid sequence of SEQ ID NO: 60, a VP3 variant having an amino acid sequence of SEQ ID NO: 91;

the AAV capsid variant comprising the VP1 variant having the amino acid sequence of SEQ ID NO: 30, a VP2 variant having an amino acid sequence of SEQ ID NO: 61, a VP3 variant having an amino acid sequence of SEQ ID NO: 92; and the AAV capsid variant comprising the VP1 variant having the amino acid sequence of SEQ ID NO: 31, a VP2 variant having an amino acid sequence of SEQ ID NO: 62, a VP3 variant having an amino acid sequence of SEQ ID NO: 93.

11. The AAV capsid variant according to claim 9, wherein the VP1 variant has the amino acid sequence selected from SEQ ID NOs: 10, 11, 15, 30, and 31.

12. The AAV capsid variant according to claim 9, wherein the VP1 variant has the amino acid sequence selected from SEQ ID NOs: 2 to 29.

13. A VP1 variant having an amino acid sequence selected from SEQ ID NOs: 2 to 31.

14. The VP1 variant according to claim 13, wherein the VP1 variant has the amino acid sequence selected from SEQ ID NOs: 10, 11, 15, 30, and 31.

15. The VP1 variant according to claim 13, wherein the VP1 variant has the amino acid sequence selected from SEQ ID NOs: 2 to 29.

16. The AAV variant according to claim 1, wherein the AAV capsid variant of the AAV variant comprises the VP1 variant having the amino acid sequence of SEQ ID NO: 29.

17. The AAV capsid variant according to claim 9, wherein the VP1 variant has the amino acid sequence of SEQ ID NO: 29.

18. The VP1 variant according to claim 13, wherein the VP1 variant has the amino acid sequence of SEQ ID NO: 29.

* * * * *

SEQUENCE LISTING

```
Sequence total quantity: 156
SEQ ID NO: 1            moltype = AA  length = 735
FEATURE                 Location/Qualifiers
source                  1..735
                        mol_type = protein
                        note = Amino acid sequence of VP1 of wild-type AAV2
                        organism = synthetic construct
SEQUENCE: 1
MAADGYLPDW LEDTLSEGIR QWWKLKPGPP PPKPAERHKD DSRGLVLPGY KYLGPFNGLD  60
KGEPVNEADA AALEHDKAYD RQLDSGDNPY LKYNHADAEF QERLKEDTSF GGNLGRAVFQ  120
AKKRVLEPLG LVEEPVKTAP GKKRPVEHSP VEPDSSSGTG KAGQQPARKR LNFGQTGDAD  180
SVPDPQPLGQ PPAAPSGLGT NTMATGSGAP MADNNEGADG VGNSSGNWHC DSTWMGDRVI  240
TTSTRTWALP TYNNHLYKQI SSQSGASNDN HYFGYSTPWG YFDFNRFHCH FSPRDWQRLI  300
NNNWGFRPKR LNFKLFNIQV KEVTQNDGTT TIANNLTSTV QVFTDSEYQL PYVLGSAHQG  360
CLPPFPADVF MVPQYGYLTL NNGSQAVGRS SFYCLEYFPS QMLRTGNNFT FSYTFEDVPF  420
HSSYAHSQSL DRLMNPLIDQ YLYYLSRTNT PSGTTTQSRL QFSQAGASDI RDQSRNWLPG  480
PCYRQQRVSK TSADNNNSEY SWTGATKYHL NGRDSLVNPG PAMASHKDDE EKFFPQSGVL  540
IFGKQGSEKT NVDIEKVMIT DEEEIRTTNP VATEQYGSVS TNLQRGNRQA ATADVNTQGV  600
```

```
LPGMVWQDRD VYLQGPIWAK IPHTDGHFHP SPLMGGFGLK HPPPQILIKN TPVPANPSTT    660
FSAAKFASFI TQYSTGQVSV EIEWELQKEN SKRWNPEIQY TSNYNKSVNV DFTVDTNGVY    720
SEPRPIGTRY LTRNL                                                    735

SEQ ID NO: 2              moltype = AA   length = 735
FEATURE                   Location/Qualifiers
source                    1..735
                          mol_type = protein
                          note = Amino acid sequence of VP1 variant
                          organism = synthetic construct
SEQUENCE:

```
NNNWGFRPKR LNFKLFNIQV KEVTQNDGTT TIANNLTSTV QVFTDSEYQL PYVLGSAHQG    360
CLPPFPADVF MVPQYGYLTL NNGSQAVGRS SFYCLEYFPS QMLRTGNNFT FSYTFEDVPF    420
HSSYAHSQSL DRLMNPLIDQ YLYYLSRTNT PSGTTTQSRL QFSQAGASDI RDQSRNWLPG    480
PCYRQRVSK  TSADNNNSEY SWTGATKYHL NGRDSLVNPG PAMASHKDDE EKFFPQSGVL    540
IFGKQGSEKT NVDIEKVMIT DEEEIATTNP VATEQWGSVS TNLQRGATQA ATADVNTQGV    600
LPGMVWQDRD VYLQGPIWAK IPHTDGHFHP SPLMGGFGLK HPPPQILIKN TPVPANPSTT    660
FSAAKFASFI TQYSTGQVSV EIEWELQKEN SKRWNPEIQY TSNYNKSVNV DFTVDTNGVY    720
SEPRPIGTRY LTRNL                                                    735

SEQ ID NO: 6              moltype = AA   length = 735
FEATURE                   Location/Qualifiers
source                    1..735
                          mol_type = protein
                          note = Amino acid sequence of VP1 variant
                          organism = synthetic construct
SEQUENCE: 6
MAADGYLPDW LEDTLSEGIR QWWKLKPGPP PKPAERHKD  DSRGLVLPGY KYLGPFNGLD     60
KGEPVNEADA AALEHDKAYD RQLDSGDNPY LKYNHADAEF QERLKEDTSF GGNLGRAVFQ    120
AKKRVLEPLG LVEEPVKTAP GKKRPVEHSP VEPDSSSGTG KAGQQPARKR LNFGQTGDAD    180
SVPDPQPLGQ PPAAPSGLGT NTMATGSGAP MADNNEGADG VGNSSGNWHC DSTWMGDRVI    240
TTSTRTWALP TYNNHLYKQI SSQSGASNDN HYFGYSTPWG YFDFNRFHCH FSPRDWQRLI    300
NNNWGFRPKR LNFKLFNIQV KEVTQNDGTT TIANNLTSTV QVFTDSEYQL PYVLGSAHQG    360
CLPPFPADVF MVPQYGYLTL NNGSQAVGRS SFYCLEYFPS QMLRTGNNFT FSYTFEDVPF    420
HSSYAHSQSL DRLMNPLIDQ YLYYLSRTNT PSGTTTQSRL QFSQAGASDI RDQSRNWLPG    480
PCYRQRVSK  TSADNNNSEY SWTGATKYHL NGRDSLVNPG PAMASHKDDE EKFFPQSGVL    540
IFGKQGSEKT NVDIEKVMIT DESEIATTNP VATESYGEVS TNLQRNPVQA ATADVNTQGV    600
LPGMVWQDRD VYLQGPIWAK IPHTDGHFHP SPLMGGFGLK HPPPQILIKN TPVPANPSTT    660
FSAAKFASFI TQYSTGQVSV EIEWELQKEN SKRWNPEIQY TSNYNKSVNV DFTVDTNGVY    720
SEPRPIGTRY LTRNL                                                    735

SEQ ID NO: 7              moltype = AA   length = 735
FEATURE                   Location/Qualifiers
source                    1..735
                          mol_type = protein
                          note = Amino acid sequence of VP1 variant
                          organism = synthetic construct
SEQUENCE -continued MAADGYLPDW LEDTLSEGIR QWWKLKPGPP PPKPAERHKD DSRGLVLPGY KYLGPFNGLD 60
KGEPVNEADA AALEHDKAYD RQLDSGDNPY LKYNHADAEF QERLKEDTSF GGNLGRAVFQ 120
AKKRVLEPLG LVEEPVKTAP GKKRPVEHSP VEPDSSSGTG KAGQQPARKR LNFGQTGDAD 180
SVPDPQPLGQ PPAAPSGLGT NTMATGSGAP MADNNEGADG VGNSSGNWHC DSTWMGDRVI 240
TTSTRTWALP TYNNHLYKQI SSQSGASNDN HYFGYSTPWG YFDFNRFHCH FSPRDWQRLI 300
NNNWGFRPKR LNFKLFNIQV KEVTQNDGTT TIANNLTSTV QVFTDSEYQL PYVLGSAHQG 360
CLPPFPADVF MVPQYGYLTL NNGSQAVGRS SFYCLEYFPS QMLRTGNNFT FSYTFEDVPF 420
HSSYAHSQSL DRLMNPLIDQ YLYYLSRTNT PSGTTTQSRL QFSQAGASDI RDQSRNWLPG 480
PCYRQQRVSK TSADNNNSEY SWTGATKYHL NGRDSLVNPG PAMASHKDDE EKFFPQSGVL 540
IFGKQGSEKT NVDIEKVMIT DEQEVAATNP VATEHYGQVA TNLQTGNRQA ATADVNTQGV 600
LPGMVWQDRD VYLQGPIWAK IPHTDGHFHP SPLMGGFGLK HPPPQILIKN TPVPANPSTT 660
FSAAKFASFI TQYSTGQVSV EIEWELQKEN SKRWNPEIQY TSNYNKSVNV DFTVDTNGVY 720
SEPRPIGTRY LTRNL 735

SEQ ID NO: 10 moltype = AA length = 735
FEATURE Location/Qualifiers
source 1..735
mol_type = protein
note = Amino acid sequence of VP1 variant
organism = synthetic construct
SEQUENCE: 10
MAADGYLPDW LEDTLSEGIR QWWKLKPGPP PPKPAERHKD DSRGLVLPGY KYLGPFNGLD 60
KGEPVNEADA AALEHDKAYD RQLDSGDNPY LKYNHADAEF QERLKEDTSF GGNLGRAVFQ 120
AKKRVLEPLG LVEEPVKTAP GKKRPVEHSP VEPDSSSGTG KAGQQPARKR LNFGQTGDAD 180
SVPDPQPLGQ PPAAPSGLGT NTMATGSGAP MADNNEGADG VGNSSGNWHC DSTWMGDRVI 240
TTSTRTWALP TYNNHLYKQI SSQSGASNDN HYFGYSTPWG YFDFNRFHCH FSPRDWQRLI 300
NNNWGFRPKR LNFKLFNIQV KEVTQNDGTT TIANNLTSTV QVFTDSEYQL PYVLGSAHQG 360
CLPPFPADVF MVPQYGYLTL NNGSQAVGRS SFYCLEYFPS QMLRTGNNFT FSYTFEDVPF 420
HSSYAHSQSL DRLMNPLIDQ YLYYLSRTNT PSGTTTQSRL QFSQAGASDI RDQSRNWLPG 480
PCYRQQRVSK TSADNNNSEY SWTGATKYHL NGRDSLVNPG PAMASHKDDE EKFFPQSGVL 540
IFGKQGSEKT NVDIEKVMIT DEEEINTTNP VYTEQYGSVS TNLQRGNIQA ATADVNTQGV 600
LPGMVWQDRD VYLQGPIWAK IPHTDGHFHP SPLMGGFGLK HPPPQILIKN TPVPANPSTT 660
FSAAKFASFI TQYSTGQVSV EIEWELQKEN SKRWNPEIQY TSNYNKSVNV DFTVDTNGVY 720
SEPRPIGTRY LTRNL 735

SEQ ID NO: 11 moltype = AA length = 735
FEATURE Location/Qualifiers
source 1..735
mol_type = protein
note = Amino acid sequence of VP1 variant
organism = synthetic construct
SEQUENCE: 11
MAADGYLPDW LEDTLSEGIR QWWKLKPGPP PPKPAERHKD DSRGLVLPGY KYLGPFNGLD 60
KGEPVNEADA AALEHDKAYD RQLDSGDNPY LKYNHADAEF QERLKEDTSF GGNLGRAVFQ 120
AKKRVLEPLG LVEEPVKTAP GKKRPVEHSP VEPDSSSGTG KAGQQPARKR LNFGQTGDAD 180
SVPDPQPLGQ PPAAPSGLGT NTMATGSGAP MADNNEGADG VGNSSGNWHC DSTWMGDRVI 240
TTSTRTWALP TYNNHLYKQI SSQSGASNDN HYFGYSTPWG YFDFNRFHCH FSPRDWQRLI 300
NNNWGFRPKR LNFKLFNIQV KEVTQNDGTT TIANNLTSTV QVFTDSEYQL PYVLGSAHQG 360
CLPPFPADVF MVPQYGYLTL NNGSQAVGRS SFYCLEYFPS QMLRTGNNFT FSYTFEDVPF 420
HSSYAHSQSL DRLMNPLIDQ YLYYLSRTNT PSGTTTQSRL QFSQAGASDI RDQSRNWLPG 480
PCYRQQRVSK TSADNNNSEY SWTGATKYHL NGRDSLVNPG PAMASHKDDE EKFFPQSGVL 540
IFGKQGSEKT NVDIEKVMIT DEQEVAATNP VADEQYGVVA TNLQRGNVQA ATADVNTQGV 600
LPGMVWQDRD VYLQGPIWAK IPHTDGHFHP SPLMGGFGLK HPPPQILIKN TPVPANPSTT 660
FSAAKFASFI TQYSTGQVSV EIEWELQKEN SKRWNPEIQY TSNYNKSVNV DFTVDTNGVY 720
SEPRPIGTRY LTRNL 735

SEQ ID NO: 12 moltype = AA length = 735
FEATURE Location/Qualifiers
source 1..735
mol_type = protein
note = Amino acid sequence of VP1 variant
organism = synthetic construct
SEQUENCE: 12
MAADGYLPDW LEDTLSEGIR QWWKLKPGPP PPKPAERHKD DSRGLVLPGY KYLGPFNGLD 60
KGEPVNEADA AALEHDKAYD RQLDSGDNPY LKYNHADAEF QERLKEDTSF GGNLGRAVFQ 120
AKKRVLEPLG LVEEPVKTAP GKKRPVEHSP VEPDSSSGTG KAGQQPARKR LNFGQTGDAD 180
SVPDPQPLGQ PPAAPSGLGT NTMATGSGAP MADNNEGADG VGNSSGNWHC DSTWMGDRVI 240
TTSTRTWALP TYNNHLYKQI SSQSGASNDN HYFGYSTPWG YFDFNRFHCH FSPRDWQRLI 300
NNNWGFRPKR LNFKLFNIQV KEVTQNDGTT TIANNLTSTV QVFTDSEYQL PYVLGSAHQG 360
CLPPFPADVF MVPQYGYLTL NNGSQAVGRS SFYCLEYFPS QMLRTGNNFT FSYTFEDVPF 420
HSSYAHSQSL DRLMNPLIDQ YLYYLSRTNT PSGTTTQSRL QFSQAGASDI RDQSRNWLPG 480
PCYRQQRVSK TSADNNNSEY SWTGATKYHL NGRDSLVNPG PAMASHKDDE EKFFPQSGVL 540
IFGKQGSEKT NVDIEKVMIT DESEIAATNP VATEQWGSVA TNRQRGETQA ATADVNTQGV 600
LPGMVWQDRD VYLQGPIWAK IPHTDGHFHP SPLMGGFGLK HPPPQILIKN TPVPANPSTT 660
FSAAKFASFI TQYSTGQVSV EIEWELQKEN SKRWNPEIQY TSNYNKSVNV DFTVDTNGVY 720
SEPRPIGTRY LTRNL 735

SEQ ID NO: 13 moltype = AA length = 735
FEATURE Location/Qualifiers

```
source                      1..735
                            mol_type = protein
                            note = Amino acid sequence of VP1 variant
                            organism = synthetic construct
SEQUENCE: 13
MAADGYLPDW LEDTLSEGIR QWWKLKPGPP PPKPAERHKD DSRGLVLPGY KYLGPFNGLD    60
KGEPVNEADA AALEHDKAYD RQLDS

```
FSAAKFASFI TQYSTGQVSV EIEWELQKEN SKRWNPEIQY TSNYNKSVNV DFTVDTNGVY   720
SEPRPIGTRY LTRNL                                                   735

SEQ ID NO: 17           moltype = AA  length = 735
FEATURE                 Location/Qualifiers
source                  1..735
                        mol_type = protein
                        note = Amino acid sequence of VP1 variant
                        organism = synthetic construct
SEQUENCE: 17
MAADGYLPDW LEDTLSEGIR QWWKLKPGPP PKPAERHKD DSRGLVLPGY KYLGPFNGLD   60
KGEPVNEADA AALEHDKAYD RQLDSGDNPY LKYNHADAEF QERLKEDTSF GGNLGRAVFQ   120
AKKRVLEPLG LVEEPVKTAP GKKRPVEHSP VEPDSSSGTG KAGQQPARKR LNFGQTGDAD   180
SVPDPQPLGQ PPAAPSGLGT NTMATGSGAP MADNNEGADG VGNSSGNWHC DSTWMGDRVI   240
TTSTRTWALP TYNNHLYKQI SSQSGASNDN HYFGYSTPWG YFDFNRFHCH FSPRDWQRLI   300
NNNWGFRPKR LNFKLFNIQV KEVTQNDGTT TIANNLTSTV QVFTDSEYQL PYVLGSAHQG   360
CLPPFPADVF MVPQYGYLTL NNGSQAVGRS SFYCLEYFPS QMLRTGNNFT FSYTFEDVPF   420
HSSYAHSQSL DRLMNPLIDQ YLYYLSRTNT PSGTTTQSRL RDQSRNWLPG             480
PCYRQQRVSK TSADNNNSEY SWTGATKYHL NGRDSLVNPG PAMASHKDDE EKFFPQSGVL   540
IFGKQGSEKT NVDIEKVMIT DEEEIRTTNP VATEQYGSVS TWLQRGNRQA ATADVNTQGV   600
LPGMVWQDRD VYLQGPIWAK IPHTDGHFHP SPLMGGFGLK HPPPQILIKN TPVPANPSTT   660
FSAAKFASFI TQYSTGQVSV EIEWELQKEN SKRWNPEIQY TSNYNKSVNV DFTVDTNGVY   720
SEPRPIGTRY LTRNL                                                   735

SEQ ID NO: 18           moltype = AA  length = 735
FEATURE                 Location/Qualifiers
source                  1..735
                        mol_type = protein
                        note = Amino acid sequence of VP1 variant
                        organism = synthetic construct
SEQUENCE: 18
MAADGYLPDW L

```
CLPPFPADVF MVPQYGYLTL NNGSQAVGRS SFYCLEYFPS QMLRTGNNFT FSYTFEDVPF  420
HSSYAHSQSL DRLMNPLIDQ YLYYLSRTNT PSGTTTQSRL QFSQAGASDI RDQSRNWLPG  480
PCYRQQRVSK TSADNNNSEY SWTGATKYHL NGRDSLVNPG PAMASHKDDE EKFFPQSGVL  540
IFGKQGSEKT NVDIEKVMIT DEWEIRTTNP VATEQYGSVS TNLQRLNRQA ATADVNTQGV  600
LPGMVWQDRD VYLQGPIWAK IPHTDGHFHP SPLMGGFGLK HPPPQILIKN TPVPANPSTT  660
FSAAKFASFI TQYSTGQVSV EIEWELQKEN SKRWNPEIQY TSNYNKSVNV DFTVDTNGVY  720
SEPRPIGTRY LTRNL                                                   735

SEQ ID NO: 21          moltype = AA  length = 735
FEATURE                Location/Qualifiers
source                 1..735
                       mol_type = protein
                       note = Amino acid sequence of VP1 variant
                       organism = synthetic construct
SEQUENCE: 21
MAADGYLPDW LEDTLSEGIR QWWKLKPGPP PPKPAERHKD DSRGLVLPGY KYLGPFNGLD  60
KGEPVNEADA AALEHDKAYD RQLDSGDNPY LKYNHADAEF QERLKEDTSF GGNLGRAVFQ  120
AKKRVLEPLG LVEEPVKTAP GKKRPVEHSP VEPDSSSGTG KAGQQPARKR LNFGQTGDAD  180
SVPDPQPLGQ PPAAPSGLGT NTMATGSGAP MADNNEGADG VGNSSGNWHC DSTWMGDRVI  240
TTSTRTWALP TYNNHLYKQI SSQSGASNDN HYFGYSTPWG YFDFNRFHCH FSPRDWQRLI  300
NNNWGFRPKR LNFKLFNIQV KEVTQNDGTT TIANNLTSTV QVFTDSEYQL PYVLGSAHQG  360
CLPPFPADVF MVPQYGYLTL NNGSQAVGRS SFYCLEYFPS QMLRTGNNFT FSYTFEDVPF  420
HSSYAHSQSL DRLMNPLIDQ YLYYLSRTNT PSGTTTQSRL QFSQAGASDI RDQSRNWLPG  480
PCYRQQRVSK TSADNNNSEY SWTGATKYHL NGRDSLVNPG PAMASHKDDE EKFFPQSGVL  540
IFGKQGSEKT NVDIEKVMIT DEAEIAATNP VATEQWGEVS TNTQNGARQA ATADVNTQGV  600
LPGMVWQDRD VYLQGPIWAK IPHTDGHFHP SPLMGGFGLK HPPPQILIKN TPVPANPSTT  660
FSAAKFASFI TQYSTGQVSV EIEWELQKEN SKRWNPEIQY TSNYNKSVNV DFTVDTNGVY  720
SEPRPIGTRY LTRNL                                                   735

SEQ ID NO: 22          moltype = AA  length = 735
FEATURE                Location/Qualifiers
source                 1..735
                       mol_type = protein
                       note = Amino acid sequence of VP1 variant
                       organism = synthetic construct
SEQUENCE: 22
MAADGYLPDW LEDTLSEGIR QWWKLKPGPP PPKPAERHKD DSRGLVLPGY KYLGPFNGLD  60
KGEPVNEADA AALEHDKAYD RQLDSGDNPY LKYNHADAEF QERLKEDTSF GGNLGRAVFQ  120
AKKRVLEPLG LVEEPVKTAP GKKRPVEHSP VEPDSSSGTG KAGQQPARKR LNFGQTGDAD  180
SVPDPQPLGQ PPAAPSGLGT NTMATGSGAP MADNNEGADG VGNSSGNWHC DSTWMGDRVI  240
TTSTRTWALP TYNNHLYKQI SSQSGASNDN HYFGYSTPWG YFDFNRFHCH FSPRDWQRLI  300
NNNWGFRPKR LNFKLFNIQV KEVTQNDGTT TIANNLTSTV QVFTDSEYQL PYVLGSAHQG  360
CLPPFPADVF MVPQYGYLTL NNGSQAVGRS SFYCLEYFPS QMLRTGNNFT FSYTFEDVPF  420
HSSYAHSQSL DRLMNPLIDQ YLYYLSRTNT PSGTTTQSRL QFSQAGASDI RDQSRNWLPG  480
PCYRQQRVSK TSADNNNSEY SWTGATKYHL NGRDSLVNPG PAMASHKDDE EKFFPQSGVL  540
IFGKQGSEKT NVDIEKVMIT DEQEVAATNP VATEAYGTVS TNLQRQNTQA ATADVNTQGV  600
LPGMVWQDRD VYLQGPIWAK IPHTDGHFHP SPLMGGFGLK HPPPQILIKN TPVPANPSTT  660
FSAAKFASFI TQYSTGQVSV EIEWELQKEN SKRWNPEIQY TSNYNKSVNV DFTVDTNGVY  720
SEPRPIGTRY LTRNL                                                   735

SEQ ID NO: 23          moltype = AA  length = 735
FEATURE                Location/Qualifiers
source                 1..735
                       mol_type = protein
                       note = Amino acid sequence of VP1 variant
                       organism = synthetic construct
SEQUENCE: 23
MAADGYLPDW LEDTLSEGIR QWWKLKPGPP PPKPAERHKD DSRGLVLPGY KYLGPFNGLD  60
KGEPVNEADA AALEHDKAYD RQLDSGDNPY LKYNHADAEF QERLKEDTSF GGNLGRAVFQ  120
AKKRVLEPLG LVEEPVKTAP GKKRPVEHSP VEPDSSSGTG KAGQQPARKR LNFGQTGDAD  180
SVPDPQPLGQ PPAAPSGLGT NTMATGSGAP MADNNEGADG VGNSSGNWHC DSTWMGDRVI  240
TTSTRTWALP TYNNHLYKQI SSQSGASNDN HYFGYSTPWG YFDFNRFHCH FSPRDWQRLI  300
NNNWGFRPKR LNFKLFNIQV KEVTQNDGTT TIANNLTSTV QVFTDSEYQL PYVLGSAHQG  360
CLPPFPADVF MVPQYGYLTL NNGSQAVGRS SFYCLEYFPS QMLRTGNNFT FSYTFEDVPF  420
HSSYAHSQSL DRLMNPLIDQ YLYYLSRTNT PSGTTTQSRL QFSQAGASDI RDQSRNWLPG  480
PCYRQQRVSK TSADNNNSEY SWTGATKYHL NGRDSLVNPG PAMASHKDDE EKFFPQSGVL  540
IFGKQGSEKT NVDIEKVMIT DEAEIAATNP VATEQYGTVS TNLQTGNQQA ATADVNTQGV  600
LPGMVWQDRD VYLQGPIWAK IPHTDGHFHP SPLMGGFGLK HPPPQILIKN TPVPANPSTT  660
FSAAKFASFI TQYSTGQVSV EIEWELQKEN SKRWNPEIQY TSNYNKSVNV DFTVDTNGVY  720
SEPRPIGTRY LTRNL                                                   735

SEQ ID NO: 24          moltype = AA  length = 735
FEATURE                Location/Qualifiers
source                 1..735
                       mol_type = protein
                       note = Amino acid sequence of VP1 variant
                       organism = synthetic construct
SEQUENCE: 24
MAADGYLPDW LEDTLSEGIR QWWKLKPGPP PPKPAERHKD DSRGLVLPGY KYLGPFNGLD  60
```

-continued

```
KGEPVNEADA AALEHDKAYD RQLDSGDNPY LKYNHADAEF QERLKEDTSF GGNLGRAVFQ  120
AKKRVLEPLG LVEEPVKTAP GKKRPVEHSP VEPDSSSGTG KAGQQPARKR LNFGQTGDAD  180
SVPDPQPLGQ PPAAPSGLGT NTMATGSGAP MADNNEGADG VGNSSGNWHC DSTWMGDRVI  240
TTSTRTWALP TYNNHLYKQI SSQSGASNDN HYFGYSTPWG YFDFNRFHCH FSPRDWQRLI  300
NNNWGFRPKR LNFKLFNIQV KEVTQNDGTT TIANNLTSTV QVFTDSEYQL PYVLGSAHQG  360
CLPPFPADVF MVPQYGYLTL NNGSQAVGRS SFYCLEYFPS QMLRTGNNFT FSYTFEDVPF  420
HSSYAHSQSL DRLMNPLIDQ YLYYLSRTNT PSGTTTQSRL QFSQAGASDI RDQSRNWLPG  480
PCYRQQRVSK TSADNNNSEY SWTGATKYHL NGRDSLVNPG PAMASHKDDE EKFFPQSGVL  540
IFGKQGSEKT NVDIEKVMIT DESEIRTTNP VATESYGEVA TNLQTGTTQA ATADVNTQGV  600
LPGMVWQDRD VYLQGPIWAK IPHTDGHFHP SPLMGGFGLK HPPPQILIKN TPVPANPSTT  660
FSAAKFASFI TQYSTGQVSV EIEWELQKEN SKRWNPEIQY TSNYNKSVNV DFTVDTNGVY  720
SEPRPIGTRY LTRNL                                                   735

SEQ ID NO: 25          moltype = AA  length = 735
FEATURE                Location/Qualifiers
source                 1..735
                       mol_type = protein
                       note = Amino acid sequence of VP1 variant
                       organism = synthetic construct
SEQUENCE: 25
MAADGYLPDW LEDTLSEGIR QWWKLKPGPP PPKPAERHKD DSRGLVLPGY KYLGPFNGLD  60
KGEPVNEADA AALEHDKAYD RQLDSGDNPY LKYNHADAEF QERLKEDTSF GGNLGRAVFQ  120
AKKRVLEPLG LVEEPVKTAP GKKRPVEHSP VEPDSSSGTG KAGQQPARKR LNFGQTGDAD  180
SVPDPQPLGQ PPAAPSGLGT NTMATGSGAP MADNNEGADG VGNSSGNWHC DSTWMGDRVI  240
TTSTRTWALP TYNNHLYKQI SSQSGASNDN HYFGYSTPWG YFDFNRFHCH FSPRDWQRLI  300
NNNWGFRPKR LNFKLFNIQV KEVTQNDGTT TIANNLTSTV QVFTDSEYQL PYVLGSAHQG  360
CLPPFPADVF MVPQYGYLTL NNGSQAVGRS SFYCLEYFPS QMLRTGNNFT FSYTFEDVPF  420
HSSYAHSQSL DRLMNPLIDQ YLYYLSRTNT PSGTTTQSRL QFSQAGASDI RDQSRNWLPG  480
PCYRQQRVSK TSADNNNSEY SWTGATKYHL NGRDSLVNPG PAMASHKDDE EKFFPQSGVL  540
IFGKQGSEKT NVDIEKVMIT DEAEIATTNP VATEQWGSVS TNLQGGNLQA ATADVNTQGV  600
LPGMVWQDRD VYLQGPIWAK IPHTDGHFHP SPLMGGFGLK HPPPQILIKN TPVPANPSTT  660
FSAAKFASFI TQYSTGQVSV EIEWELQKEN SKRWNPEIQY TSNYNKSVNV DFTVDTNGVY  720
SEPRPIGTRY LTRNL                                                   735

SEQ ID NO: 26          moltype = AA  length = 735
FEATURE                Location/Qualifiers
source                 1..735
                       mol_type = protein
                       note = Amino acid sequence of VP1 variant
                       organism = synthetic construct
SEQUENCE: 26
MAADGYLPDW LEDTLSEGIR QWWKLKPGPP PPKPAERHKD DSRGLVLPGY KYLGPFNGLD  60
KGEPVNEADA AALEHDKAYD RQLDSGDNPY LKYNHADAEF QERLKEDTSF GGNLGRAVFQ  120
AKKRVLEPLG LVEEPVKTAP GKKRPVEHSP VEPDSSSGTG KAGQQPARKR LNFGQTGDAD  180
SVPDPQPLGQ PPAAPSGLGT NTMATGSGAP MADNNEGADG VGNSSGNWHC DSTWMGDRVI  240
TTSTRTWALP TYNNHLYKQI SSQSGASNDN HYFGYSTPWG YFDFNRFHCH FSPRDWQRLI  300
NNNWGFRPKR LNFKLFNIQV KEVTQNDGTT TIANNLTSTV QVFTDSEYQL PYVLGSAHQG  360
CLPPFPADVF MVPQYGYLTL NNGSQAVGRS SFYCLEYFPS QMLRTGNNFT FSYTFEDVPF  420
HSSYAHSQSL DRLMNPLIDQ YLYYLSRTNT PSGTTTQSRL QFSQAGASDI RDQSRNWLPG  480
PCYRQQRVSK TSADNNNSEY SWTGATKYHL NGRDSLVNPG PAMASHKDDE EKFFPQSGVL  540
IFGKQGSEKT NVDIEKVMIT NESEIAATNP VATEQYGVVA TNLQNGTVQA ATADVNTQGV  600
LPGMVWQDRD VYLQGPIWAK IPHTDGHFHP SPLMGGFGLK HPPPQILIKN TPVPANPSTT  660
FSAAKFASFI TQYSTGQVSV EIEWELQKEN SKRWNPEIQY TSNYNKSVNV DFTVDTNGVY  720
SEPRPIGTRY LTRNL                                                   735

SEQ ID NO: 27          moltype = AA  length = 735
FEATURE                Location/Qualifiers
source                 1..735
                       mol_type = protein
                       note = Amino acid sequence of VP1 variant
                       organism = synthetic construct
SEQUENCE: 27
MAADGYLPDW LEDTLSEGIR QWWKLKPGPP PPKPAERHKD DSRGLVLPGY KYLGPFNGLD  60
KGEPVNEADA AALEHDKAYD RQLDSGDNPY LKYNHADAEF QERLKEDTSF GGNLGRAVFQ  120
AKKRVLEPLG LVEEPVKTAP GKKRPVEHSP VEPDSSSGTG KAGQQPARKR LNFGQTGDAD  180
SVPDPQPLGQ PPAAPSGLGT NTMATGSGAP MADNNEGADG VGNSSGNWHC DSTWMGDRVI  240
TTSTRTWALP TYNNHLYKQI SSQSGASNDN HYFGYSTPWG YFDFNRFHCH FSPRDWQRLI  300
NNNWGFRPKR LNFKLFNIQV KEVTQNDGTT TIANNLTSTV QVFTDSEYQL PYVLGSAHQG  360
CLPPFPADVF MVPQYGYLTL NNGSQAVGRS SFYCLEYFPS QMLRTGNNFT FSYTFEDVPF  420
HSSYAHSQSL DRLMNPLIDQ YLYYLSRTNT PSGTTTQSRL QFSQAGASDI RDQSRNWLPG  480
PCYRQQRVSK TSADNNNSEY SWTGATKYHL NGRDSLVNPG PAMASHKDDE EKFFPQSGVL  540
IFGKQGSEKT NVDIEKVMIT DESEIRTTNP VATEQWGEVA TNLQNGNIQA ATADVNTQGV  600
LPGMVWQDRD VYLQGPIWAK IPHTDGHFHP SPLMGGFGLK HPPPQILIKN TPVPANPSTT  660
FSAAKFASFI TQYSTGQVSV EIEWELQKEN SKRWNPEIQY TSNYNKSVNV DFTVDTNGVY  720
SEPRPIGTRY LTRNL                                                   735

SEQ ID NO: 28          moltype = AA  length = 735
FEATURE                Location/Qualifiers
source                 1..735
```

```
                        mol_type = protein
                        note = Amino acid sequence of VP1 variant
                        organism = synthetic construct
SEQUENCE: 28
MAADGYLPDW LEDTLSEGIR QWWKLKPGPP PPKPAERHKD DSRGLVLPGY KYLGPFNGLD  60
KGEPVNEADA AALEHDKAYD RQLDSGDNPY LKYNHADAEF QERLKEDTSF GGNLGRAVFQ  120
AKKRVLEPLG LVEEPVKTAP GKKRPVEHSP VEPDSSSGTG KAGQQPARKR LNFGQTGDAD  180
SVPDPQPLGQ PPAAPSGLGT NTMATGSGAP MADNNEGADG VGNSSGNWHC DSTWMGDRVI  240
TTSTRTWALP TYNNHLYKQI SSQSGASNDN HYFGYSTPWG YFDFNRFHCH FSPRDWQRLI  300
NNNWGFRPKR LNFKLFNIQV KEVTQNDGTT TIANNLTSTV QVFTDSEYQL PYVLGSAHQG  360
CLPPFPADVF MVPQYGYLTL NNGSQAVGRS SFYCLEYFPS QMLRTGNNFT FSYTFEDVPF  420
HSSYAHSQSL DRLMNPLIDQ YLYYLSRTNT PSGTTTQSRL QFSQAGASDI RDQSRNWLPG  480
PCYRQQRVSK TSADNNNSEY SWTGATKYHL NGRDSLVNPG PAMASHKDDE EKFFPQSGVL  540
IFGKQGSEKT NVDIEKVMIT DEAEIAATNP VATEQYGCVA SNIQNSNTQA ATADVNTQGV  600
LPGMVWQDRD VYLQGPIWAK IPHTDGHFHP SPLMGGFGLK HPPPQILIKN TPVPANPSTT  660
FSAAKFASFI TQYSTGQVSV EIEWELQKEN SKRWNPEIQY TSNYNKSVNV DFTVDTNGVY  720
SEPRPIGTRY LTRNL                                                   735

SEQ ID NO: 29           moltype = AA  length = 735
FEATURE                 Location/Qualifiers
source                  1..735
                        mol_type = protein
                        note = Amino acid sequence of VP1 variant
                        organism = synthetic construct
SEQUENCE: 29
MAADGYLPDW LEDTLSEGIR QWWKLKPGPP PPKPAERHKD DSRGLVLPGY KYLGPFNGLD  60
KGEPVNEADA AALEHDKAYD RQLDSGDNPY LKYNHADAEF QERLKEDTSF GGNLGRAVFQ  120
AKKRVLEPLG LVEEPVKTAP GKKRPVEHSP VEPDSSSGTG KAGQQPARKR LNFGQTGDAD  180
SVPDPQPLGQ PPAAPSGLGT NTMATGSGAP MADNNEGADG VGNSSGNWHC DSTWMGDRVI  240
TTSTRTWALP TYNNHLYKQI SSQSGASNDN HYFGYSTPWG YFDFNRFHCH FSPRDWQRLI  300
NNNWGFRPKR LNFKLFNIQV KEVTQNDGTT TIANNLTSTV QVFTDSEYQL PYVLGSAHQG  360
CLPPFPADVF MVPQYGYLTL NNGSQAVGRS SFYCLEYFPS QMLRTGNNFT FSYTFEDVPF  420
HSSYAHSQSL DRLMNPLIDQ YLYYLSRTNT PSGTTTQSRL QFSQAGASDI RDQSRNWLPG  480
PCYRQQRVSK TSADNNNSEY SWTGATKYHL NGRDSLVNPG PAMASHKDDE EKFFPQSGVL  540
IFGKQGSEKT NVDIEKVMIT DESEIAATNP VAYEQYGSVT TNLQNGNNQA ATADVNTQGV  600
LPGMVWQDRD VYLQGPIWAK IPHTDGHFHP SPLMGGFGLK HPPPQILIKN TPVPANPSTT  660
FSAAKFASFI TQYSTGQVSV EIEWELQKEN SKRWNPEIQY TSNYNKSVNV DFTVDTNGVY  720
SEPRPIGTRY LTRNL                                                   735

SEQ ID NO: 30           moltype = AA  length = 735
FEATURE                 Location/Qualifiers
source                  1..735
                        mol_type = protein
                        note = Amino acid sequence of VP1 variant
                        organism = synthetic construct
SEQUENCE: 30
MAADGYLPDW LEDTLSEGIR QWWKLKPGPP PPKPAERHKD DSRGLVLPGY KYLGPFNGLD  60
KGEPVNEADA AALEHDKAYD RQLDSGDNPY LKYNHADAEF QERLKEDTSF GGNLGRAVFQ  120
AKKRVLEPLG LVEEPVKTAP GKKRPVEHSP VEPDSSSGTG KAGQQPARKR LNFGQTGDAD  180
SVPDPQPLGQ PPAAPSGLGT NTMATGSGAP MADNNEGADG VGNSSGNWHC DSTWMGDRVI  240
TTSTRTWALP TYNNHLYKQI SSQSGASNDN HYFGYSTPWG YFDFNRFHCH FSPRDWQRLI  300
NNNWGFRPKR LNFKLFNIQV KEVTQNDGTT TIANNLTSTV QVFTDSEYQL PYVLGSAHQG  360
CLPPFPADVF MVPQYGYLTL NNGSQAVGRS SFYCLEYFPS QMLRTGNNFT FSYTFEDVPF  420
HSSYAHSQSL DRLMNPLIDQ YLYYLSRTNT PSGTTTQSRL QFSQAGASDI RDQSRNWLPG  480
PCYRQQRVSK TSADNNNSEY SWTGATKYHL NGRDSLVNPG PAMASHKDDE EKFFPQSGVL  540
IFGKQGSEKT NVDIEKVMIT DESEIAATNP VATEQYGCVA TNLQRGYVQA ATADVNTQGV  600
LPGMVWQDRD VYLQGPIWAK IPHTDGHFHP SPLMGGFGLK HPPPQILIKN TPVPANPSTT  660
FSAAKFASFI TQYSTGQVSV EIEWELQKEN SKRWNPEIQY TSNYNKSVNV DFTVDTNGVY  720
SEPRPIGTRY LTRNL                                                   735

SEQ ID NO: 31           moltype = AA  length = 735
FEATURE                 Location/Qualifiers
source                  1..735
                        mol_type = protein
                        note = Amino acid sequence of VP1 variant
                        organism = synthetic construct
SEQUENCE: 31
MAADGYLPDW LEDTLSEGIR QWWKLKPGPP PPKPAERHKD DSRGLVLPGY KYLGPFNGLD  60
KGEPVNEADA AALEHDKAYD RQLDSGDNPY LKYNHADAEF QERLKEDTSF GGNLGRAVFQ  120
AKKRVLEPLG LVEEPVKTAP GKKRPVEHSP VEPDSSSGTG KAGQQPARKR LNFGQTGDAD  180
SVPDPQPLGQ PPAAPSGLGT NTMATGSGAP MADNNEGADG VGNSSGNWHC DSTWMGDRVI  240
TTSTRTWALP TYNNHLYKQI SSQSGASNDN HYFGYSTPWG YFDFNRFHCH FSPRDWQRLI  300
NNNWGFRPKR LNFKLFNIQV KEVTQNDGTT TIANNLTSTV QVFTDSEYQL PYVLGSAHQG  360
CLPPFPADVF MVPQYGYLTL NNGSQAVGRS SFYCLEYFPS QMLRTGNNFT FSYTFEDVPF  420
HSSYAHSQSL DRLMNPLIDQ YLYYLSRTNT PSGTTTQSRL QFSQAGASDI RDQSRNWLPG  480
PCYRQQRVSK TSADNNNSEY SWTGATKYHL NGRDSLVNPG PAMASHKDDE EKFFPQSGVL  540
IFGKQGSEKT NVDIEKVMIT DEQEVAATNP VATEQWGEVS TNLQRGNEQA ATADVNTQGV  600
LPGMVWQDRD VYLQGPIWAK IPHTDGHFHP SPLMGGFGLK HPPPQILIKN TPVPANPSTT  660
FSAAKFASFI TQYSTGQVSV EIEWELQKEN SKRWNPEIQY TSNYNKSVNV DFTVDTNGVY  720
```

```
SEPRPIGTRY LTRNL                                                      735

SEQ ID NO: 32            moltype = AA  length = 598
FEATURE                  Location/Qualifiers
source                   1..598
                         mol_type = protein
                         note = Amino acid sequence of VP2 of wild-type AAV2
                         organism = synthetic construct
SEQUENCE: 32
TAPGKKRPVE HSPVEPDSSS GTGKAGQQPA RKRLNFGQTG DADSVPDPQP LGQPPAAPSG  60
LGTNTMATGS GAPMADNNEG ADGVGNSSGN WHCDSTWMGD RVITTSTRTW ALPTYNNHLY 120
KQISSQSGAS NDNHYFGYST PWGYFDFNRF HCHFSPRDWQ RLINNNWGFR PKRLNFKLFN 180
IQVKEVTQND GTTTIANNLT STVQVFTDSE YQLPYVLGSA HQGCLPPFPA DVFMVPQYGY 240
LTLNNGSQAV GRSSFYCLEY FPSQMLRTGN NFTFSYTFED VPFHSSYAHS QSLDRLMNPL 300
IDQYLYYLSR TNTPSGTTTQ SRLQFSQAGA SDIRDQSRNW LPGPCYRQQR VSKTSADNNN 360
SEYSWTGATK YHLNGRDSLV NPGPAMASHK DDEEKFFPQS GVLIFGKQGS EKTNVDIEKV 420
MITDEEEIRT TNPVATEQYG SVSTNLQRGN RQAATADVNT QGVLPGMVWQ DRDVYLQGPI 480
WAKIPHTDGH FHPSPLMGGF GLKHPPPQIL IKNTPVPANP STTFSAAKFA SFITQYSTGQ 540
VSVEIEWELQ KENSKRWNPE IQYTSNYNKS VNVDFTVDTN GVYSEPRPIG TRYLTRNL   598

SEQ ID NO: 33            moltype = AA  length = 598
FEATURE                  Location/Qualifiers
source                   1..598
                         mol_type = protein
                         note = Amino acid sequence of VP2 variant
                         organism = synthetic construct
SEQUENCE: 33
TAPGKKRPVE HSPVEPDSSS GTGKAGQQPA RKRLNFGQTG DADSVPDPQP LGQPPAAPSG  60
LGTNTMATGS GAPMADNNEG ADGVGNSSGN WHCDSTWMGD RVITTSTRTW ALPTYNNHLY 120
KQISSQSGAS NDNHYFGYST PWGYFDFNRF HCHFSPRDWQ RLINNNWGFR PKRLNFKLFN 180
IQVKEVTQND GTTTIANNLT STVQVFTDSE YQLPYVLGSA HQGCLPPFPA DVFMVPQYGY 240
LTLNNGSQAV GRSSFYCLEY FPSQMLRTGN NFTFSYTFED VPFHSSYAHS QSLDRLMNPL 300
IDQYLYYLSR TNTPSGTTTQ SRLQFSQAGA SDIRDQSRNW LPGPCYRQQR VSKTSADNNN 360
SEYSWTGATK YHLNGRDSLV NPGPAMASHK DDEEKFFPQS GVLIFGKQGS EKTNVDIEKV 420
MITDEEEIAA TNPVATESYG EVATNLQRGN VQAATADVNT QGVLPGMVWQ DRDVYLQGPI 480
WAKIPHTDGH FHPSPLMGGF GLKHPPPQIL IKNTPVPANP STTFSAAKFA SFITQYSTGQ 540
VSVEIEWELQ KENSKRWNPE IQYTSNYNKS VNVDFTVDTN GVYSEPRPIG TRYLTRNL   598

SEQ ID NO: 34            moltype = AA  length = 598
FEATURE                  Location/Qualifiers
source                   1..598
                         mol_type = protein
                         note = Amino acid sequence of VP2 variant
                         organism = synthetic construct
SEQUENCE: 34
TAPGKKRPVE HSPVEPDSSS GTGKAGQQPA RKRLNFGQTG DADSVPDPQP LGQPPAAPSG  60
LGTNTMATGS GAPMADNNEG ADGVGNSSGN WHCDSTWMGD RVITTSTRTW ALPTYNNHLY 120
KQISSQSGAS NDNHYFGYST PWGYFDFNRF HCHFSPRDWQ RLINNNWGFR PKRLNFKLFN 180
IQVKEVTQND GTTTIANNLT STVQVFTDSE YQLPYVLGSA HQGCLPPFPA DVFMVPQYGY 240
LTLNNGSQAV GRSSFYCLEY FPSQMLRTGN NFTFSYTFED VPFHSSYAHS QSLDRLMNPL 300
IDQYLYYLSR TNTPSGTTTQ SRLQFSQAGA SDIRDQSRNW LPGPCYRQQR VSKTSADNNN 360
SEYSWTGATK YHLNGRDSLV NPGPAMASHK DDEEKFFPQS GVLIFGKQGS EKTNVDIEKV 420
MITDEQEVAA TNPVATESWG SVSTNLQRGN TQAATADVNT QGVLPGMVWQ DRDVYLQGPI 480
WAKIPHTDGH FHPSPLMGGF GLKHPPPQIL IKNTPVPANP STTFSAAKFA SFITQYSTGQ 540
VSVEIEWELQ KENSKRWNPE IQYTSNYNKS VNVDFTVDTN GVYSEPRPIG TRYLTRNL   598

SEQ ID NO: 35            moltype = AA  length = 598
FEATURE                  Location/Qualifiers
source                   1..598
                         mol_type = protein
                         note = Amino acid sequence of VP2 variant
                         organism = synthetic construct
SEQUENCE: 35
TAPGKKRPVE HSPVEPDSSS GTGKAGQQPA RKRLNFGQTG DADSVPDPQP LGQPPAAPSG  60
LGTNTMATGS GAPMADNNEG ADGVGNSSGN WHCDSTWMGD RVITTSTRTW ALPTYNNHLY 120
KQISSQSGAS NDNHYFGYST PWGYFDFNRF HCHFSPRDWQ RLINNNWGFR PKRLNFKLFN 180
IQVKEVTQND GTTTIANNLT STVQVFTDSE YQLPYVLGSA HQGCLPPFPA DVFMVPQYGY 240
LTLNNGSQAV GRSSFYCLEY FPSQMLRTGN NFTFSYTFED VPFHSSYAHS QSLDRLMNPL 300
IDQYLYYLSR TNTPSGTTTQ SRLQFSQAGA SDIRDQSRNW LPGPCYRQQR VSKTSADNNN 360
SEYSWTGATK YHLNGRDSLV NPGPAMASHK DDEEKFFPQS GVLIFGKQGS EKTNVDIEKV 420
MITDESEIRT TNPIATEQWG SVSTNLQNGN RQAATADVNT QGVLPGMVWQ DRDVYLQGPI 480
WAKIPHTDGH FHPSPLMGGF GLKHPPPQIL IKNTPVPANP STTFSAAKFA SFITQYSTGQ 540
VSVEIEWELQ KENSKRWNPE IQYTSNYNKS VNVDFTVDTN GVYSEPRPIG TRYLTRNL   598

SEQ ID NO: 36            moltype = AA  length = 598
FEATURE                  Location/Qualifiers
source                   1..598
                         mol_type = protein
                         note = Amino acid sequence of VP2 variant
```

```
                        organism = synthetic construct
SEQUENCE: 36
TAPGKKRPVE HSPVEPDSSS GTGKAGQQPA RKRLNFGQTG DADSVPDPQP LGQPPAAPSG   60
LGTNTMATGS GAPMADNNEG ADGVGNSSGN WHCDSTWMGD RVITTSTRTW ALPTYNNHLY  120
KQISSQSGAS NDNHYFGYST PWGYFDFNRF HCHFSPRDWQ RLINNNWGFR PKRLNFKLFN  180
IQVKEVTQND GTTTIANNLT STVQVFTDSE YQLPYVLGSA HQGCLPPFPA DVFMVPQYGY  240
LTLNNGSQAV GRSSFYCLEY FPSQMLRTGN NFTFSYTFED VPFHSSYAHS QSLDRLMNPL  300
IDQYLYYLSR TNTPSGTTTQ SRLQFSQAGA SDIRDQSRNW LPGPCYRQQR VSKTSADNNN  360
SEYSWTGATK YHLNGRDSLV NPGPAMASHK DDEEKFFPQS GVLIFGKQGS EKTNVDIEKV  420
MITDEEEIAT TNPVATEQWG SVSTNLQRGA TQAATADVNT QGVLPGMVWQ DRDVYLQGPI  480
WAKIPHTDGH FHPSPLMGGF GLKHPPPQIL IKNTPVPANP STTFSAAKFA SFITQYSTGQ  540
VSVEIEWELQ KENSKRWNPE IQYTSNYNKS VNVDFTVDTN GVYSEPRPIG TRYLTRNL    598

SEQ ID NO: 37              moltype = AA  length = 598
FEATURE                    Location/Qualifiers
source                     1..598
                           mol_type = protein
                           note = Amino acid sequence of VP2 variant
                           organism = synthetic construct
SEQUENCE: 37
TAPGKKRPVE HSPVEPDSSS GTGKAGQQPA RKRLNFGQTG DADSVPDPQP LGQPPAAPSG   60
LGTNTMATGS GAPMADNNEG ADGVGNSSGN WHCDSTWMGD RVITTSTRTW ALPTYNNHLY  120
KQISSQSGAS NDNHYFGYST PWGYFDFNRF HCHFSPRDWQ RLINNNWGFR PKRLNFKLFN  180
IQVKEVTQND GTTTIANNLT STVQVFTDSE YQLPYVLGSA HQGCLPPFPA DVFMVPQYGY  240
LTLNNGSQAV GRSSFYCLEY FPSQMLRTGN NFTFSYTFED VPFHSSYAHS QSLDRLMNPL  300
IDQYLYYLSR TNTPSGTTTQ SRLQFSQAGA SDIRDQSRNW LPGPCYRQQR VSKTSADNNN  360
SEYSWTGATK YHLNGRDSLV NPGPAMASHK DDEEKFFPQS GVLIFGKQGS EKTNVDIEKV  420
MITDESEIAT TNPVATESYG EVSTNLQRNP VQAATADVNT QGVLPGMVWQ DRDVYLQGPI  480
WAKIPHTDGH FHPSPLMGGF GLKHPPPQIL IKNTPVPANP STTFSAAKFA SFITQYSTGQ  540
VSVEIEWELQ KENSKRWNPE IQYTSNYNKS VNVDFTVDTN GVYSEPRPIG TRYLTRNL    598

SEQ ID NO: 38              moltype = AA  length = 598
FEATURE                    Location/Qualifiers
source                     1..598
                           mol_type = protein
                           note = Amino acid sequence of VP2 variant
                           organism = synthetic construct
SEQUENCE: 38
TAPGKKRPVE HSPVEPDSSS GTGKAGQQPA RKRLNFGQTG DADSVPDPQP LGQPPAAPSG   60
LGTNTMATGS GAPMADNNEG ADGVGNSSGN WHCDSTWMGD RVITTSTRTW ALPTYNNHLY  120
KQISSQSGAS NDNHYFGYST PWGYFDFNRF HCHFSPRDWQ RLINNNWGFR PKRLNFKLFN  180
IQVKEVTQND GTTTIANNLT STVQVFTDSE YQLPYVLGSA HQGCLPPFPA DVFMVPQYGY  240
LTLNNGSQAV GRSSFYCLEY FPSQMLRTGN NFTFSYTFED VPFHSSYAHS QSLDRLMNPL  300
IDQYLYYLSR TNTPSGTTTQ SRLQFSQAGA SDIRDQSRNW LPGPCYRQQR VSKTSADNNN  360
SEYSWTGATK YHLNGRDSLV NPGPAMASHK DDEEKFFPQS GVLIFGKQGS EKTNVDIEKV  420
MITDEEEIRT TNPVAYEQYG VVATNLQNSN AQAATADVNT QGVLPGMVWQ DRDVYLQGPI  480
WAKIPHTDGH FHPSPLMGGF GLKHPPPQIL IKNTPVPANP STTFSAAKFA SFITQYSTGQ  540
VSVEIEWELQ KENSKRWNPE IQYTSNYNKS VNVDFTVDTN GVYSEPRPIG TRYLTRNL    598

SEQ ID NO: 39              moltype = AA  length = 598
FEATURE                    Location/Qualifiers
source                     1..598
                           mol_type = protein
                           note = Amino acid sequence of VP2 variant
                           organism = synthetic construct
SEQUENCE: 39
TAPGKKRPVE HSPVEPDSSS GTGKAGQQPA RKRLNFGQTG DADSVPDPQP LGQPPAAPSG   60
LGTNTMATGS GAPMADNNEG ADGVGNSSGN WHCDSTWMGD RVITTSTRTW ALPTYNNHLY  120
KQISSQSGAS NDNHYFGYST PWGYFDFNRF HCHFSPRDWQ RLINNNWGFR PKRLNFKLFN  180
IQVKEVTQND GTTTIANNLT STVQVFTDSE YQLPYVLGSA HQGCLPPFPA DVFMVPQYGY  240
LTLNNGSQAV GRSSFYCLEY FPSQMLRTGN NFTFSYTFED VPFHSSYAHS QSLDRLMNPL  300
IDQYLYYLSR TNTPSGTTTQ SRLQFSQAGA SDIRDQSRNW LPGPCYRQQR VSKTSADNNN  360
SEYSWTGATK YHLNGRDSLV NPGPAMASHK DDEEKFFPQS GVLIFGKQGS EKTNVDIEKV  420
MITDEAEIAT TNPVAAEQYG EVSTNLQNGN RQAATADVNT QGVLPGMVWQ DRDVYLQGPI  480
WAKIPHTDGH FHPSPLMGGF GLKHPPPQIL IKNTPVPANP STTFSAAKFA SFITQYSTGQ  540
VSVEIEWELQ KENSKRWNPE IQYTSNYNKS VNVDFTVDTN GVYSEPRPIG TRYLTRNL    598

SEQ ID NO: 40              moltype = AA  length = 598
FEATURE                    Location/Qualifiers
source                     1..598
                           mol_type = protein
                           note = Amino acid sequence of VP2 variant
                           organism = synthetic construct
SEQUENCE: 40
TAPGKKRPVE HSPVEPDSSS GTGKAGQQPA RKRLNFGQTG DADSVPDPQP LGQPPAAPSG   60
LGTNTMATGS GAPMADNNEG ADGVGNSSGN WHCDSTWMGD RVITTSTRTW ALPTYNNHLY  120
KQISSQSGAS NDNHYFGYST PWGYFDFNRF HCHFSPRDWQ RLINNNWGFR PKRLNFKLFN  180
IQVKEVTQND GTTTIANNLT STVQVFTDSE YQLPYVLGSA HQGCLPPFPA DVFMVPQYGY  240
LTLNNGSQAV GRSSFYCLEY FPSQMLRTGN NFTFSYTFED VPFHSSYAHS QSLDRLMNPL  300
```

```
IDQYLYYLSR TNTPSGTTTQ SRLQFSQAGA SDIRDQSRNW LPGPCYRQQR VSKTSADNNN    360
SEYSWTGATK YHLNGRDSLV NPGPAMASHK DDEEKFFPQS GVLIFGKQGS EKTNVDIEKV    420
MITDEQEVAA TNPVATEHYG QVATNLQTGN RQAATADVNT QGVLPGMVWQ DRDVYLQGPI    480
WAKIPHTDGH FHPSPLMGGF GLKHPPPQIL IKNTPVPANP STTFSAAKFA SFITQYSTGQ    540
VSVEIEWELQ KENSKRWNPE IQYTSNYNKS VNVDFTVDTN GVYSEPRPIG TRYLTRNL     598

SEQ ID NO: 41           moltype = AA  length = 598
FEATURE                 Location/Qualifiers
source                  1..598
                        mol_type = protein
                        note = Amino acid sequence of VP2 variant
                        organism = synthetic construct
SEQUENCE: 41
TAPGKKRPVE HSPVEPDSSS GTGKAGQQPA RKRLNFGQTG DADSVPDPQP LGQPPAAPSG    60
LGTNTMATGS GAPMADNNEG ADGVGNSSGN WHCDSTWMGD RVITTSTRTW ALPTYNNHLY   120
KQISSQSGAS NDNHYFGYST PWGYFDFNRF HCHFSPRDWQ RLINNNWGFR PKRLNFKLFN   180
IQVKEVTQND GTTTIANNLT STVQVFTDSE YQLPYVLGSA HQGCLPPFPA DVFMVPQYGY   240
LTLNNGSQAV GRSSFYCLEY FPSQMLRTGN NFTFSYTFED VPFHSSYAHS QSLDRLMNPL   300
IDQYLYYLSR TNTPSGTTTQ SRLQFSQAGA SDIRDQSRNW LPGPCYRQQR VSKTSADNNN   360
SEYSWTGATK YHLNGRDSLV NPGPAMASHK DDEEKFFPQS GVLIFGKQGS EKTNVDIEKV   420
MITDEEEINT TNPVYTEQYG SVSTNLQRGN IQAATADVNT QGVLPGMVWQ DRDVYLQGPI   480
WAKIPHTDGH FHPSPLMGGF GLKHPPPQIL IKNTPVPANP STTFSAAKFA SFITQYSTGQ   540
VSVEIEWELQ KENSKRWNPE IQYTSNYNKS VNVDFTVDTN GVYSEPRPIG TRYLTRNL    598

SEQ ID NO: 42           moltype = AA  length = 598
FEATURE                 Location/Qualifiers
source                  1..598
                        mol_type = protein
                        note = Amino acid sequence of VP2 variant
                        organism = synthetic construct
SEQUENCE: 42
TAPGKKRPVE HSPVEPDSSS GTGKAGQQPA RKRLNFGQTG DADSVPDPQP LGQPPAAPSG    60
LGTNTMATGS GAPMADNNEG ADGVGNSSGN WHCDSTWMGD RVITTSTRTW ALPTYNNHLY   120
KQISSQSGAS NDNHYFGYST PWGYFDFNRF HCHFSPRDWQ RLINNNWGFR PKRLNFKLFN   180
IQVKEVTQND GTTTIANNLT STVQVFTDSE YQLPYVLGSA HQGCLPPFPA DVFMVPQYGY   240
LTLNNGSQAV GRSSFYCLEY FPSQMLRTGN NFTFSYTFED VPFHSSYAHS QSLDRLMNPL   300
IDQYLYYLSR TNTPSGTTTQ SRLQFSQAGA SDIRDQSRNW LPGPCYRQQR VSKTSADNNN   360
SEYSWTGATK YHLNGRDSLV NPGPAMASHK DDEEKFFPQS GVLIFGKQGS EKTNVDIEKV   420
MITDEQEVAA TNPVADEQYG VVATNLQRGN VQAATADVNT QGVLPGMVWQ DRDVYLQGPI   480
WAKIPHTDGH FHPSPLMGGF GLKHPPPQIL IKNTPVPANP STTFSAAKFA SFITQYSTGQ   540
VSVEIEWELQ KENSKRWNPE IQYTSNYNKS VNVDFTVDTN GVYSEPRPIG TRYLTRNL    598

SEQ ID NO: 43           moltype = AA  length = 598
FEATURE                 Location/Qualifiers
source                  1..598
                        mol_type = protein
                        note = Amino acid sequence of VP2 variant
                        organism = synthetic construct
SEQUENCE: 43
TAPGKKRPVE HSPVEPDSSS GTGKAGQQPA RKRLNFGQTG DADSVPDPQP LGQPPAAPSG    60
LGTNTMATGS GAPMADNNEG ADGVGNSSGN WHCDSTWMGD RVITTSTRTW ALPTYNNHLY   120
KQISSQSGAS NDNHYFGYST PWGYFDFNRF HCHFSPRDWQ RLINNNWGFR PKRLNFKLFN   180
IQVKEVTQND GTTTIANNLT STVQVFTDSE YQLPYVLGSA HQGCLPPFPA DVFMVPQYGY   240
LTLNNGSQAV GRSSFYCLEY FPSQMLRTGN NFTFSYTFED VPFHSSYAHS QSLDRLMNPL   300
IDQYLYYLSR TNTPSGTTTQ SRLQFSQAGA SDIRDQSRNW LPGPCYRQQR VSKTSADNNN   360
SEYSWTGATK YHLNGRDSLV NPGPAMASHK DDEEKFFPQS GVLIFGKQGS EKTNVDIEKV   420
MITDESEIAA TNPVATEQWG SVATNRQRGE TQAATADVNT QGVLPGMVWQ DRDVYLQGPI   480
WAKIPHTDGH FHPSPLMGGF GLKHPPPQIL IKNTPVPANP STTFSAAKFA SFITQYSTGQ   540
VSVEIEWELQ KENSKRWNPE IQYTSNYNKS VNVDFTVDTN GVYSEPRPIG TRYLTRNL    598

SEQ ID NO: 44           moltype = AA  length = 598
FEATURE                 Location/Qualifiers
source                  1..598
                        mol_type = protein
                        note = Amino acid sequence of VP2 variant
                        organism = synthetic construct
SEQUENCE: 44
TAPGKKRPVE HSPVEPDSSS GTGKAGQQPA RKRLNFGQTG DADSVPDPQP LGQPPAAPSG    60
LGTNTMATGS GAPMADNNEG ADGVGNSSGN WHCDSTWMGD RVITTSTRTW ALPTYNNHLY   120
KQISSQSGAS NDNHYFGYST PWGYFDFNRF HCHFSPRDWQ RLINNNWGFR PKRLNFKLFN   180
IQVKEVTQND GTTTIANNLT STVQVFTDSE YQLPYVLGSA HQGCLPPFPA DVFMVPQYGY   240
LTLNNGSQAV GRSSFYCLEY FPSQMLRTGN NFTFSYTFED VPFHSSYAHS QSLDRLMNPL   300
IDQYLYYLSR TNTPSGTTTQ SRLQFSQAGA SDIRDQSRNW LPGPCYRQQR VSKTSADNNN   360
SEYSWTGATK YHLNGRDSLV NPGPAMASHK DDEEKFFPQS GVLIFGKQGS EKTNVDIEKV   420
MITDEQEVAA TNPVATEQWG EVSTNLQRST TQAATADVNT QGVLPGMVWQ DRDVYLQGPI   480
WAKIPHTDGH FHPSPLMGGF GLKHPPPQIL IKNTPVPANP STTFSAAKFA SFITQYSTGQ   540
VSVEIEWELQ KENSKRWNPE IQYTSNYNKS VNVDFTVDTN GVYSEPRPIG TRYLTRNL    598

SEQ ID NO: 45           moltype = AA  length = 598
```

```
FEATURE                 Location/Qualifiers
source                  1..598
                        mol_type = protein
                        note = Amino acid sequence of VP2 variant
                        organism = synthetic construct
SEQUENCE: 45
TAPGKKRPVE HSPVEPDSSS GTGKAGQQPA RKRLNFGQTG DADSVPDPQP LGQPPAAPSG    60
LGTNTMATGS GAPMADNNEG ADGVGNSSGN WHCDSTWMGD RVITTSTRTW ALPTYNNHLY   120
KQISSQSGAS NDNHYFGYST PWGYFDFNRF HCHFSPRDWQ RLINNNWGFR PKRLNFKLFN   180
IQVKEVTQND GTTTIANNLT STVQVFTDSE YQLPYVLGSA HQGCLPPFPA DVFMVPQYGY   240
LTLNNGSQAV GRSSFYCLEY FPSQMLRTGN NFTFSYTFED VPFHSSYAHS QSLDRLMNPL   300
IDQYLYYLSR TNTPSGTTTQ SRLQFSQAGA SDIRDQSRNW LPGPCYRQQR VSKTSADNNN   360
SEYSWTGATK YHLNGRDSLV NPGPAMASHK DDEEKFFPQS GVLIFGKQGS EKTNVDIEKV   420
MITQESEIAA TNPVATEQWG VVATNLQNGT RQAATADVNT QGVLPGMVWQ DRDVYLQGPI   480
WAKIPHTDGH FHPSPLMGGF GLKHPPPQIL IKNTPVPANP STTFSAAKFA SFITQYSTGQ   540
VSVEIEWELQ KENSKRWNPE IQYTSNYNKS VNVDFTVDTN GVYSEPRPIG TRYLTRNL    598

SEQ ID NO: 46           moltype = AA  length = 598
FEATURE                 Location/Qualifiers
source                  1..598
                        mol_type = protein
                        note = Amino acid sequence of VP2 variant
                        organism = synthetic construct
SEQUENCE: 46
TAPGKKRPVE HSPVEPDSSS GTGKAGQQPA RKRLNFGQTG DADSVPDPQP LGQPPAAPSG    60
LGTNTMATGS GAPMADNNEG ADGVGNSSGN WHCDSTWMGD RVITTSTRTW ALPTYNNHLY   120
KQISSQSGAS NDNHYFGYST PWGYFDFNRF HCHFSPRDWQ RLINNNWGFR PKRLNFKLFN   180
IQVKEVTQND GTTTIANNLT STVQVFTDSE YQLPYVLGSA HQGCLPPFPA DVFMVPQYGY   240
LTLNNGSQAV GRSSFYCLEY FPSQMLRTGN NFTFSYTFED VPFHSSYAHS QSLDRLMNPL   300
IDQYLYYLSR TNTPSGTTTQ SRLQFSQAGA SDIRDQSRNW LPGPCYRQQR VSKTSADNNN   360
SEYSWTGATK YHLNGRDSLV NPGPAMASHK DDEEKFFPQS GVLIFGKQGS EKTNVDIEKV   420
MITDESEVAA TNPVATEQWG EVSTNNQRGT TQAATADVNT QGVLPGMVWQ DRDVYLQGPI   480
WAKIPHTDGH FHPSPLMGGF GLKHPPPQIL IKNTPVPANP STTFSAAKFA SFITQYSTGQ   540
VSVEIEWELQ KENSKRWNPE IQYTSNYNKS VNVDFTVDTN GVYSEPRPIG TRYLTRNL    598

SEQ ID NO: 47           moltype = AA  length = 598
FEATURE                 Location/Qualifiers
source                  1..598
                        mol_type = protein
                        note = Amino acid sequence of VP2 variant
                        organism = synthetic construct
SEQUENCE: 47
TAPGKKRPVE HSPVEPDSSS GTGKAGQQPA RKRLNFGQTG DADSVPDPQP LGQPPAAPSG    60
LGTNTMATGS GAPMADNNEG ADGVGNSSGN WHCDSTWMGD RVITTSTRTW ALPTYNNHLY   120
KQISSQSGAS NDNHYFGYST PWGYFDFNRF HCHFSPRDWQ RLINNNWGFR PKRLNFKLFN   180
IQVKEVTQND GTTTIANNLT STVQVFTDSE YQLPYVLGSA HQGCLPPFPA DVFMVPQYGY   240
LTLNNGSQAV GRSSFYCLEY FPSQMLRTGN NFTFSYTFED VPFHSSYAHS QSLDRLMNPL   300
IDQYLYYLSR TNTPSGTTTQ SRLQFSQAGA SDIRDQSRNW LPGPCYRQQR VSKTSADNNN   360
SEYSWTGATK YHLNGRDSLV NPGPAMASHK DDEEKFFPQS GVLIFGKQGS EKTNVDIEKV   420
MITDEEEIRT TNPVATEQYG SVSTNIQHGN RQAATADVNT QGVLPGMVWQ DRDVYLQGPI   480
WAKIPHTDGH FHPSPLMGGF GLKHPPPQIL IKNTPVPANP STTFSAAKFA SFITQYSTGQ   540
VSVEIEWELQ KENSKRWNPE IQYTSNYNKS VNVDFTVDTN GVYSEPRPIG TRYLTRNL    598

SEQ ID NO: 48           moltype = AA  length = 598
FEATURE                 Location/Qualifiers
source                  1..598
                        mol_type = protein
                        note = Amino acid sequence of VP2 variant
                        organism = synthetic construct
SEQUENCE: 48
TAPGKKRPVE HSPVEPDSSS GTGKAGQQPA RKRLNFGQTG DADSVPDPQP LGQPPAAPSG    60
LGTNTMATGS GAPMADNNEG ADGVGNSSGN WHCDSTWMGD RVITTSTRTW ALPTYNNHLY   120
KQISSQSGAS NDNHYFGYST PWGYFDFNRF HCHFSPRDWQ RLINNNWGFR PKRLNFKLFN   180
IQVKEVTQND GTTTIANNLT STVQVFTDSE YQLPYVLGSA HQGCLPPFPA DVFMVPQYGY   240
LTLNNGSQAV GRSSFYCLEY FPSQMLRTGN NFTFSYTFED VPFHSSYAHS QSLDRLMNPL   300
IDQYLYYLSR TNTPSGTTTQ SRLQFSQAGA SDIRDQSRNW LPGPCYRQQR VSKTSADNNN   360
SEYSWTGATK YHLNGRDSLV NPGPAMASHK DDEEKFFPQS GVLIFGKQGS EKTNVDIEKV   420
MITDEEEIRT TNPVATEQYG SVSTWLQRGN RQAATADVNT QGVLPGMVWQ DRDVYLQGPI   480
WAKIPHTDGH FHPSPLMGGF GLKHPPPQIL IKNTPVPANP STTFSAAKFA SFITQYSTGQ   540
VSVEIEWELQ KENSKRWNPE IQYTSNYNKS VNVDFTVDTN GVYSEPRPIG TRYLTRNL    598

SEQ ID NO: 49           moltype = AA  length = 598
FEATURE                 Location/Qualifiers
source                  1..598
                        mol_type = protein
                        note = Amino acid sequence of VP2 variant
                        organism = synthetic construct
SEQUENCE: 49
TAPGKKRPVE HSPVEPDSSS GTGKAGQQPA RKRLNFGQTG DADSVPDPQP LGQPPAAPSG    60
```

```
LGTNTMATGS GAPMADNNEG ADGVGNSSGN WHCDSTWMGD RVITTSTRTW ALPTYNNHLY    120
KQISSQSGAS NDNHYFGYST PWGYFDFNRF HCHFSPRDWQ RLINNNWGFR PKRLNFKLFN    180
IQVKEVTQND GTTTIANNLT STVQVFTDSE YQLPYVLGSA HQGCLPPFPA DVFMVPQYGY    240
LTLNNGSQAV GRSSFYCLEY FPSQMLRTGN NFTFSYTFED VPFHSSYAHS QSLDRLMNPL    300
IDQYLYYLSR TNTPSGTTTQ SRLQFSQAGA SDIRDQSRNW LPGPCYRQQR VSKTSADNNN    360
SEYSWTGATK YHLNGRDSLV NPGPAMASHK DDEEKFFPQS GVLIFGKQGS EKTNVDIEKV    420
MITDEQEIAA TNPVATEQYG EVSTNLQNQN RQAATADVNT QGVLPGMVWQ DRDVYLQGPI    480
WAKIPHTDGH FHPSPLMGGF GLKHPPPQIL IKNTPVPANP STTFSAAKFA SFITQYSTGQ    540
VSVEIEWELQ KENSKRWNPE IQYTSNYNKS VNVDFTVDTN GVYSEPRPIG TRYLTRNL     598

SEQ ID NO: 50          moltype = AA  length = 598
FEATURE                Location/Qualifiers
source                 1..598
                       mol_type = protein
                       note = Amino acid sequence of VP2 variant
                       organism = synthetic construct
SEQUENCE: 50
TAPGKKRPVE HSPVEPDSSS GTGKAGQQPA RKRLNFGQTG DADSVPDPQP LGQPPAAPSG     60
LGTNTMATGS GAPMADNNEG ADGVGNSSGN WHCDSTWMGD RVITTSTRTW ALPTYNNHLY    120
KQISSQSGAS NDNHYFGYST PWGYFDFNRF HCHFSPRDWQ RLINNNWGFR PKRLNFKLFN    180
IQVKEVTQND GTTTIANNLT STVQVFTDSE YQLPYVLGSA HQGCLPPFPA DVFMVPQYGY    240
LTLNNGSQAV GRSSFYCLEY FPSQMLRTGN NFTFSYTFED VPFHSSYAHS QSLDRLMNPL    300
IDQYLYYLSR TNTPSGTTTQ SRLQFSQAGA SDIRDQSRNW LPGPCYRQQR VSKTSADNNN    360
SEYSWTGATK YHLNGRDSLV NPGPAMASHK DDEEKFFPQS GVLIFGKQGS EKTNVDIEKV    420
MITQESEIAA TNPVATEQWG EVATNLQRGT TQAATADVNT QGVLPGMVWQ DRDVYLQGPI    480
WAKIPHTDGH FHPSPLMGGF GLKHPPPQIL IKNTPVPANP STTFSAAKFA SFITQYSTGQ    540
VSVEIEWELQ KENSKRWNPE IQYTSNYNKS VNVDFTVDTN GVYSEPRPIG TRYLTRNL     598

SEQ ID NO: 51          moltype = AA  length = 598
FEATURE                Location/Qualifiers
source                 1..598
                       mol_type = protein
                       note = Amino acid sequence of VP2 variant
                       organism = synthetic construct
SEQUENCE: 51
TAPGKKRPVE HSPVEPDSSS GTGKAGQQPA RKRLNFGQTG DADSVPDPQP LGQPPAAPSG     60
LGTNTMATGS GAPMADNNEG ADGVGNSSGN WHCDSTWMGD RVITTSTRTW ALPTYNNHLY    120
KQISSQSGAS NDNHYFGYST PWGYFDFNRF HCHFSPRDWQ RLINNNWGFR PKRLNFKLFN    180
IQVKEVTQND GTTTIANNLT STVQVFTDSE YQLPYVLGSA HQGCLPPFPA DVFMVPQYGY    240
LTLNNGSQAV GRSSFYCLEY FPSQMLRTGN NFTFSYTFED VPFHSSYAHS QSLDRLMNPL    300
IDQYLYYLSR TNTPSGTTTQ SRLQFSQAGA SDIRDQSRNW LPGPCYRQQR VSKTSADNNN    360
SEYSWTGATK YHLNGRDSLV NPGPAMASHK DDEEKFFPQS GVLIFGKQGS EKTNVDIEKV    420
MITDEWEIRT TNPVATEQYG SVSTNLQRLN RQAATADVNT QGVLPGMVWQ DRDVYLQGPI    480
WAKIPHTDGH FHPSPLMGGF GLKHPPPQIL IKNTPVPANP STTFSAAKFA SFITQYSTGQ    540
VSVEIEWELQ KENSKRWNPE IQYTSNYNKS VNVDFTVDTN GVYSEPRPIG TRYLTRNL     598

SEQ ID NO: 52          moltype = AA  length = 598
FEATURE                Location/Qualifiers
source                 1..598
                       mol_type = protein
                       note = Amino acid sequence of VP2 variant
                       organism = synthetic construct
SEQUENCE: 52
TAPGKKRPVE HSPVEPDSSS GTGKAGQQPA RKRLNFGQTG DADSVPDPQP LGQPPAAPSG     60
LGTNTMATGS GAPMADNNEG ADGVGNSSGN WHCDSTWMGD RVITTSTRTW ALPTYNNHLY    120
KQISSQSGAS NDNHYFGYST PWGYFDFNRF HCHFSPRDWQ RLINNNWGFR PKRLNFKLFN    180
IQVKEVTQND GTTTIANNLT STVQVFTDSE YQLPYVLGSA HQGCLPPFPA DVFMVPQYGY    240
LTLNNGSQAV GRSSFYCLEY FPSQMLRTGN NFTFSYTFED VPFHSSYAHS QSLDRLMNPL    300
IDQYLYYLSR TNTPSGTTTQ SRLQFSQAGA SDIRDQSRNW LPGPCYRQQR VSKTSADNNN    360
SEYSWTGATK YHLNGRDSLV NPGPAMASHK DDEEKFFPQS GVLIFGKQGS EKTNVDIEKV    420
MITDEAEIAA TNPVATEQWG EVSTNTQNGA RQAATADVNT QGVLPGMVWQ DRDVYLQGPI    480
WAKIPHTDGH FHPSPLMGGF GLKHPPPQIL IKNTPVPANP STTFSAAKFA SFITQYSTGQ    540
VSVEIEWELQ KENSKRWNPE IQYTSNYNKS VNVDFTVDTN GVYSEPRPIG TRYLTRNL     598

SEQ ID NO: 53          moltype = AA  length = 598
FEATURE                Location/Qualifiers
source                 1..598
                       mol_type = protein
                       note = Amino acid sequence of VP2 variant
                       organism = synthetic construct
SEQUENCE: 53
TAPGKKRPVE HSPVEPDSSS GTGKAGQQPA RKRLNFGQTG DADSVPDPQP LGQPPAAPSG     60
LGTNTMATGS GAPMADNNEG ADGVGNSSGN WHCDSTWMGD RVITTSTRTW ALPTYNNHLY    120
KQISSQSGAS NDNHYFGYST PWGYFDFNRF HCHFSPRDWQ RLINNNWGFR PKRLNFKLFN    180
IQVKEVTQND GTTTIANNLT STVQVFTDSE YQLPYVLGSA HQGCLPPFPA DVFMVPQYGY    240
LTLNNGSQAV GRSSFYCLEY FPSQMLRTGN NFTFSYTFED VPFHSSYAHS QSLDRLMNPL    300
IDQYLYYLSR TNTPSGTTTQ SRLQFSQAGA SDIRDQSRNW LPGPCYRQQR VSKTSADNNN    360
SEYSWTGATK YHLNGRDSLV NPGPAMASHK DDEEKFFPQS GVLIFGKQGS EKTNVDIEKV    420
MITDEQEVAA TNPVATEAYG TVSTNLQRQN TQAATADVNT QGVLPGMVWQ DRDVYLQGPI    480
```

```
WAKIPHTDGH FHPSPLMGGF GLKHPPPQIL IKNTPVPANP STTFSAAKFA SFITQYSTGQ    540
VSVEIEWELQ KENSKRWNPE IQYTSNYNKS VNVDFTVDTN GVYSEPRPIG TRYLTRNL     598

SEQ ID NO: 54              moltype = AA  length = 598
FEATURE                    Location/Qualifiers
source                     1..598
                           mol_type = protein
                           note = Amino acid sequence of VP2 variant
                           organism = synthetic construct
SEQUENCE: 54
TAPGKKRPVE HSPVEPDSSS GTGKAGQQPA RKRLNFGQTG DADSVPDPQP LGQPPAAPSG    60
LGTNTMATGS GAPMADNNEG ADGVGNSSGN WHCDSTWMGD RVITTSTRTW ALPTYNNHLY    120
KQISSQSGAS NDNHYFGYST PWGYFDFNRF HCHFSPRDWQ RLINNNWGFR PKRLNFKLFN    180
IQVKEVTQND GTTTIANNLT STVQVFTDSE YQLPYVLGSA HQGCLPPFPA DVFMVPQYGY    240
LTLNNGSQAV GRSSFYCLEY FPSQMLRTGN NFTFSYTFED VPFHSSYAHS QSLDRLMNPL    300
IDQYLYYLSR TNTPSGTTTQ SRLQFSQAGA SDIRDQSRNW LPGPCYRQQR VSKTSADNNN    360
SEYSWTGATK YHLNGRDSLV NPGPAMASHK DDEEKFFPQS GVLIFGKQGS EKTNVDIEKV    420
MITDEAEIAA TNPVATEQYG TVSTNLQTGN QQAATADVNT QGVLPGMVWQ DRDVYLQGPI    480
WAKIPHTDGH FHPSPLMGGF GLKHPPPQIL IKNTPVPANP STTFSAAKFA SFITQYSTGQ    540
VSVEIEWELQ KENSKRWNPE IQYTSNYNKS VNVDFTVDTN GVYSEPRPIG TRYLTRNL     598

SEQ ID NO: 55              moltype = AA  length = 598
FEATURE                    Location/Qualifiers
source                     1..598
                           mol_type = protein
                           note = Amino acid sequence of VP2 variant
                           organism = synthetic construct
SEQUENCE: 55
TAPGKKRPVE HSPVEPDSSS GTGKAGQQPA RKRLNFGQTG DADSVPDPQP LGQPPAAPSG    60
LGTNTMATGS GAPMADNNEG ADGVGNSSGN WHCDSTWMGD RVITTSTRTW ALPTYNNHLY    120
KQISSQSGAS NDNHYFGYST PWGYFDFNRF HCHFSPRDWQ RLINNNWGFR PKRLNFKLFN    180
IQVKEVTQND GTTTIANNLT STVQVFTDSE YQLPYVLGSA HQGCLPPFPA DVFMVPQYGY    240
LTLNNGSQAV GRSSFYCLEY FPSQMLRTGN NFTFSYTFED VPFHSSYAHS QSLDRLMNPL    300
IDQYLYYLSR TNTPSGTTTQ SRLQFSQAGA SDIRDQSRNW LPGPCYRQQR VSKTSADNNN    360
SEYSWTGATK YHLNGRDSLV NPGPAMASHK DDEEKFFPQS GVLIFGKQGS EKTNVDIEKV    420
MITDESEIRT TNPVATESYG EVATNLQTGT TQAATADVNT QGVLPGMVWQ DRDVYLQGPI    480
WAKIPHTDGH FHPSPLMGGF GLKHPPPQIL IKNTPVPANP STTFSAAKFA SFITQYSTGQ    540
VSVEIEWELQ KENSKRWNPE IQYTSNYNKS VNVDFTVDTN GVYSEPRPIG TRYLTRNL     598

SEQ ID NO: 56              moltype = AA  length = 598
FEATURE                    Location/Qualifiers
source                     1..598
                           mol_type = protein
                           note = Amino acid sequence of VP2 variant
                           organism = synthetic construct
SEQUENCE: 56
TAPGKKRPVE HSPVEPDSSS GTGKAGQQPA RKRLNFGQTG DADSVPDPQP LGQPPAAPSG    60
LGTNTMATGS GAPMADNNEG ADGVGNSSGN WHCDSTWMGD RVITTSTRTW ALPTYNNHLY    120
KQISSQSGAS NDNHYFGYST PWGYFDFNRF HCHFSPRDWQ RLINNNWGFR PKRLNFKLFN    180
IQVKEVTQND GTTTIANNLT STVQVFTDSE YQLPYVLGSA HQGCLPPFPA DVFMVPQYGY    240
LTLNNGSQAV GRSSFYCLEY FPSQMLRTGN NFTFSYTFED VPFHSSYAHS QSLDRLMNPL    300
IDQYLYYLSR TNTPSGTTTQ SRLQFSQAGA SDIRDQSRNW LPGPCYRQQR VSKTSADNNN    360
SEYSWTGATK YHLNGRDSLV NPGPAMASHK DDEEKFFPQS GVLIFGKQGS EKTNVDIEKV    420
MITDEAEIAT TNPVATEQWG SVSTNLQGGN LQAATADVNT QGVLPGMVWQ DRDVYLQGPI    480
WAKIPHTDGH FHPSPLMGGF GLKHPPPQIL IKNTPVPANP STTFSAAKFA SFITQYSTGQ    540
VSVEIEWELQ KENSKRWNPE IQYTSNYNKS VNVDFTVDTN GVYSEPRPIG TRYLTRNL     598

SEQ ID NO: 57              moltype = AA  length = 598
FEATURE                    Location/Qualifiers
source                     1..598
                           mol_type = protein
                           note = Amino acid sequence of VP2 variant
                           organism = synthetic construct
SEQUENCE: 57
TAPGKKRPVE HSPVEPDSSS GTGKAGQQPA RKRLNFGQTG DADSVPDPQP LGQPPAAPSG    60
LGTNTMATGS GAPMADNNEG ADGVGNSSGN WHCDSTWMGD RVITTSTRTW ALPTYNNHLY    120
KQISSQSGAS NDNHYFGYST PWGYFDFNRF HCHFSPRDWQ RLINNNWGFR PKRLNFKLFN    180
IQVKEVTQND GTTTIANNLT STVQVFTDSE YQLPYVLGSA HQGCLPPFPA DVFMVPQYGY    240
LTLNNGSQAV GRSSFYCLEY FPSQMLRTGN NFTFSYTFED VPFHSSYAHS QSLDRLMNPL    300
IDQYLYYLSR TNTPSGTTTQ SRLQFSQAGA SDIRDQSRNW LPGPCYRQQR VSKTSADNNN    360
SEYSWTGATK YHLNGRDSLV NPGPAMASHK DDEEKFFPQS GVLIFGKQGS EKTNVDIEKV    420
MITNESEIAA TNPVATEQYG VVATNLQNGT VQAATADVNT QGVLPGMVWQ DRDVYLQGPI    480
WAKIPHTDGH FHPSPLMGGF GLKHPPPQIL IKNTPVPANP STTFSAAKFA SFITQYSTGQ    540
VSVEIEWELQ KENSKRWNPE IQYTSNYNKS VNVDFTVDTN GVYSEPRPIG TRYLTRNL     598

SEQ ID NO: 58              moltype = AA  length = 598
FEATURE                    Location/Qualifiers
source                     1..598
                           mol_type = protein
```

```
                    note        = Amino acid sequence of VP2 variant
                    organism    = synthetic construct
SEQUENCE: 58
TAPGKKRPVE HSPVEPDSSS GTGKAGQQPA RKRLNFGQTG DADSVPDPQP LGQPPAAPSG    60
LGTNTMATGS GAPMADNNEG ADGVGNSSGN WHCDSTWMGD RVITTSTRTW ALPTYNNHLY   120
KQISSQSGAS NDNHYFGYST PWGYFDFNRF HCHFSPRDWQ RLINNNWGFR PKRLNFKLFN   180
IQVKEVTQND GTTTIANNLT STVQVFTDSE YQLPYVLGSA HQGCLPPFPA DVFMVPQYGY   240
LTLNNGSQAV GRSSFYCLEY FPSQMLRTGN NFTFSYTFED VPFHSSYAHS QSLDRLMNPL   300
IDQYLYYLSR TNTPSGTTTQ SRLQFSQAGA SDIRDQSRNW LPGPCYRQQR VSKTSADNNN   360
SEYSWTGATK YHLNGRDSLV NPGPAMASHK DDEEKFFPQS GVLIFGKQGS EKTNVDIEKV   420
MITDESEIRT TNPVATEQWG EVATNLQNGN IQAATADVNT QGVLPGMVWQ DRDVYLQGPI   480
WAKIPHTDGH FHPSPLMGGF GLKHPPPQIL IKNTPVPANP STTFSAAKFA SFITQYSTGQ   540
VSVEIEWELQ KENSKRWNPE IQYTSNYNKS VNVDFTVDTN GVYSEPRPIG TRYLTRNL    598

SEQ ID NO: 59       moltype = AA  length = 598
FEATURE             Location/Qualifiers
source              1..598
                    mol_type    = protein
                    note        = Amino acid sequence of VP2 variant
                    organism    = synthetic construct
SEQUENCE: 59
TAPGKKRPVE HSPVEPDSSS GTGKAGQQPA RKRLNFGQTG DADSVPDPQP LGQPPAAPSG    60
LGTNTMATGS GAPMADNNEG ADGVGNSSGN WHCDSTWMGD RVITTSTRTW ALPTYNNHLY   120
KQISSQSGAS NDNHYFGYST PWGYFDFNRF HCHFSPRDWQ RLINNNWGFR PKRLNFKLFN   180
IQVKEVTQND GTTTIANNLT STVQVFTDSE YQLPYVLGSA HQGCLPPFPA DVFMVPQYGY   240
LTLNNGSQAV GRSSFYCLEY FPSQMLRTGN NFTFSYTFED VPFHSSYAHS QSLDRLMNPL   300
IDQYLYYLSR TNTPSGTTTQ SRLQFSQAGA SDIRDQSRNW LPGPCYRQQR VSKTSADNNN   360
SEYSWTGATK YHLNGRDSLV NPGPAMASHK DDEEKFFPQS GVLIFGKQGS EKTNVDIEKV   420
MITDEAEIAA TNPVATEQYG CVASNIQNSN TQAATADVNT QGVLPGMVWQ DRDVYLQGPI   480
WAKIPHTDGH FHPSPLMGGF GLKHPPPQIL IKNTPVPANP STTFSAAKFA SFITQYSTGQ   540
VSVEIEWELQ KENSKRWNPE IQYTSNYNKS VNVDFTVDTN GVYSEPRPIG TRYLTRNL    598

SEQ ID NO: 60       moltype = AA  length = 598
FEATURE             Location/Qualifiers
source              1..598
                    mol_type    = protein
                    note        = Amino acid sequence of VP2 variant
                    organism    = synthetic construct
SEQUENCE: 60
TAPGKKRPVE HSPVEPDSSS GTGKAGQQPA RKRLNFGQTG DADSVPDPQP LGQPPAAPSG    60
LGTNTMATGS GAPMADNNEG ADGVGNSSGN WHCDSTWMGD RVITTSTRTW ALPTYNNHLY   120
KQISSQSGAS NDNHYFGYST PWGYFDFNRF HCHFSPRDWQ RLINNNWGFR PKRLNFKLFN   180
IQVKEVTQND GTTTIANNLT STVQVFTDSE YQLPYVLGSA HQGCLPPFPA DVFMVPQYGY   240
LTLNNGSQAV GRSSFYCLEY FPSQMLRTGN NFTFSYTFED VPFHSSYAHS QSLDRLMNPL   300
IDQYLYYLSR TNTPSGTTTQ SRLQFSQAGA SDIRDQSRNW LPGPCYRQQR VSKTSADNNN   360
SEYSWTGATK YHLNGRDSLV NPGPAMASHK DDEEKFFPQS GVLIFGKQGS EKTNVDIEKV   420
MITDESEIAA TNPVAYEQYG SVTTNLQGN NQAATADVNT QGVLPGMVWQ DRDVYLQGPI   480
WAKIPHTDGH FHPSPLMGGF GLKHPPPQIL IKNTPVPANP STTFSAAKFA SFITQYSTGQ   540
VSVEIEWELQ KENSKRWNPE IQYTSNYNKS VNVDFTVDTN GVYSEPRPIG TRYLTRNL    598

SEQ ID NO: 61       moltype = AA  length = 598
FEATURE             Location/Qualifiers
source              1..598
                    mol_type    = protein
                    note        = Amino acid sequence of VP2 variant
                    organism    = synthetic construct
SEQUENCE: 61
TAPGKKRPVE HSPVEPDSSS GTGKAGQQPA RKRLNFGQTG DADSVPDPQP LGQPPAAPSG    60
LGTNTMATGS GAPMADNNEG ADGVGNSSGN WHCDSTWMGD RVITTSTRTW ALPTYNNHLY   120
KQISSQSGAS NDNHYFGYST PWGYFDFNRF HCHFSPRDWQ RLINNNWGFR PKRLNFKLFN   180
IQVKEVTQND GTTTIANNLT STVQVFTDSE YQLPYVLGSA HQGCLPPFPA DVFMVPQYGY   240
LTLNNGSQAV GRSSFYCLEY FPSQMLRTGN NFTFSYTFED VPFHSSYAHS QSLDRLMNPL   300
IDQYLYYLSR TNTPSGTTTQ SRLQFSQAGA SDIRDQSRNW LPGPCYRQQR VSKTSADNNN   360
SEYSWTGATK YHLNGRDSLV NPGPAMASHK DDEEKFFPQS GVLIFGKQGS EKTNVDIEKV   420
MITDESEIAA TNPVATEQYG CVATNLQRGY VQAATADVNT QGVLPGMVWQ DRDVYLQGPI   480
WAKIPHTDGH FHPSPLMGGF GLKHPPPQIL IKNTPVPANP STTFSAAKFA SFITQYSTGQ   540
VSVEIEWELQ KENSKRWNPE IQYTSNYNKS VNVDFTVDTN GVYSEPRPIG TRYLTRNL    598

SEQ ID NO: 62       moltype = AA  length = 598
FEATURE             Location/Qualifiers
source              1..598
                    mol_type    = protein
                    note        = Amino acid sequence of VP2 variant
                    organism    = synthetic construct
SEQUENCE: 62
TAPGKKRPVE HSPVEPDSSS GTGKAGQQPA RKRLNFGQTG DADSVPDPQP LGQPPAAPSG    60
LGTNTMATGS GAPMADNNEG ADGVGNSSGN WHCDSTWMGD RVITTSTRTW ALPTYNNHLY   120
KQISSQSGAS NDNHYFGYST PWGYFDFNRF HCHFSPRDWQ RLINNNWGFR PKRLNFKLFN   180
IQVKEVTQND GTTTIANNLT STVQVFTDSE YQLPYVLGSA HQGCLPPFPA DVFMVPQYGY   240
```

```
LTLNNGSQAV GRSSFYCLEY FPSQMLRTGN NFTFSYTFED VPFHSSYAHS QSLDRLMNPL   300
IDQYLYYLSR TNTPSGTTTQ SRLQFSQAGA SDIRDQSRNW LPGPCYRQQR VSKTSADNNN   360
SEYSWTGATK YHLNGRDSLV NPGPAMASHK DDEEKFFPQS GVLIFGKQGS EKTNVDIEKV   420
MITDEQEVAA TNPVATEQWG EVSTNLQRGN EQAATADVNT QGVLPGMVWQ DRDVYLQGPI   480
WAKIPHTDGH FHPSPLMGGF GLKHPPPQIL IKNTPVPANP STTFSAAKFA SFITQYSTGQ   540
VSVEIEWELQ KENSKRWNPE IQYTSNYNKS VNVDFTVDTN GVYSEPRPIG TRYLTRNL    598

SEQ ID NO: 63             moltype = AA   length = 533
FEATURE                   Location/Qualifiers
source                    1..533
                          mol_type = protein
                          note = Amino acid sequence of VP3 of wild-type AAV2
                          organism = synthetic construct
SEQUENCE: 63
MATGSGAPMA DNNEGADGVG NSSGNWHCDS TWMGDRVITT STRTWALPTY NNHLYKQISS    60
QSGASNDNHY FGYSTPWGYF DFNRFHCHFS PRDWQRLINN NWGFRPKRLN FKLFNIQVKE   120
VTQNDGTTTI ANNLTSTVQV FTDSEYQLPY VLGSAHQGCL PPFPADVFMV PQYGYLTLNN   180
GSQAVGRSSF YCLEYFPSQM LRTGNNFTFS YTFEDVPFHS SYAHSQSLDR LMNPLIDQYL   240
YYLSRTNTPS GTTTQSRLQF SQAGASDIRD QSRWLPGPC YRQQRVSKTS ADNNNSEYSW   300
TGATKYHLNG RDSLVNPGPA MASHKDDEEK FFPQSGVLIF GKQGSEKTNV DIEKVMITDE   360
EEIRTTNPVA TEQYGSVSTN LQRGNRQAAT ADVNTQGVLP GMVWQDRDVY LQGPIWAKIP   420
HTDGHFHPSP LMGGFGLKHP PPQILIKNTP VPANPSTTFS AAKFASFITQ YSTGQVSVEI   480
EWELQKENSK RWNPEIQYTS NYNKSVNVDF TVDTNGVYSE PRPIGTRYLT RNL          533

SEQ ID NO: 64             moltype = AA   length = 533
FEATURE                   Location/Qualifiers
source                    1..533
                          mol_type = protein
                          note = Amino acid sequence of VP3 variant
                          organism = synthetic construct
SEQUENCE: 64
MATGSGAPMA DNNEGADGVG NSSGNWHCDS TWMGDRVITT STRTWALPTY NNHLYKQISS    60
QSGASNDNHY FGYSTPWGYF DFNRFHCHFS PRDWQRLINN NWGFRPKRLN FKLFNIQVKE   120
VTQNDGTTTI ANNLTSTVQV FTDSEYQLPY VLGSAHQGCL PPFPADVFMV PQYGYLTLNN   180
GSQAVGRSSF YCLEYFPSQM LRTGNNFTFS YTFEDVPFHS SYAHSQSLDR LMNPLIDQYL   240
YYLSRTNTPS GTTTQSRLQF SQAGASDIRD QSRWLPGPC YRQQRVSKTS ADNNNSEYSW   300
TGATKYHLNG RDSLVNPGPA MASHKDDEEK FFPQSGVLIF GKQGSEKTNV DIEKVMITDE   360
EEIAATNPVA TESYGEVATN LQRGNVQAAT ADVNTQGVLP GMVWQDRDVY LQGPIWAKIP   420
HTDGHFHPSP LMGGFGLKHP PPQILIKNTP VPANPSTTFS AAKFASFITQ YSTGQVSVEI   480
EWELQKENSK RWNPEIQYTS NYNKSVNVDF TVDTNGVYSE PRPIGTRYLT RNL          533

SEQ ID NO: 65             moltype = AA   length = 533
FEATURE                   Location/Qualifiers
source                    1..533
                          mol_type = protein
                          note = Amino acid sequence of VP3 variant
                          organism = synthetic construct
SEQUENCE: 65
MATGSGAPMA DNNEGADGVG NSSGNWHCDS TWMGDRVITT STRTWALPTY NNHLYKQISS    60
QSGASNDNHY FGYSTPWGYF DFNRFHCHFS PRDWQRLINN NWGFRPKRLN FKLFNIQVKE   120
VTQNDGTTTI ANNLTSTVQV FTDSEYQLPY VLGSAHQGCL PPFPADVFMV PQYGYLTLNN   180
GSQAVGRSSF YCLEYFPSQM LRTGNNFTFS YTFEDVPFHS SYAHSQSLDR LMNPLIDQYL   240
YYLSRTNTPS GTTTQSRLQF SQAGASDIRD QSRWLPGPC YRQQRVSKTS ADNNNSEYSW   300
TGATKYHLNG RDSLVNPGPA MASHKDDEEK FFPQSGVLIF GKQGSEKTNV DIEKVMITDE   360
QEVAATNPVA TESWGSVSTN LQRGNTQAAT ADVNTQGVLP GMVWQDRDVY LQGPIWAKIP   420
HTDGHFHPSP LMGGFGLKHP PPQILIKNTP VPANPSTTFS AAKFASFITQ YSTGQVSVEI   480
EWELQKENSK RWNPEIQYTS NYNKSVNVDF TVDTNGVYSE PRPIGTRYLT RNL          533

SEQ ID NO: 66             moltype = AA   length = 533
FEATURE                   Location/Qualifiers
source                    1..533
                          mol_type = protein
                          note = Amino acid sequence of VP3 variant
                          organism = synthetic construct
SEQUENCE: 66
MATGSGAPMA DNNEGADGVG NSSGNWHCDS TWMGDRVITT STRTWALPTY NNHLYKQISS    60
QSGASNDNHY FGYSTPWGYF DFNRFHCHFS PRDWQRLINN NWGFRPKRLN FKLFNIQVKE   120
VTQNDGTTTI ANNLTSTVQV FTDSEYQLPY VLGSAHQGCL PPFPADVFMV PQYGYLTLNN   180
GSQAVGRSSF YCLEYFPSQM LRTGNNFTFS YTFEDVPFHS SYAHSQSLDR LMNPLIDQYL   240
YYLSRTNTPS GTTTQSRLQF SQAGASDIRD QSRWLPGPC YRQQRVSKTS ADNNNSEYSW   300
TGATKYHLNG RDSLVNPGPA MASHKDDEEK FFPQSGVLIF GKQGSEKTNV DIEKVMITDE   360
SEIRTTNPIA TEQWGSVSTN LQNGNRQAAT ADVNTQGVLP GMVWQDRDVY LQGPIWAKIP   420
HTDGHFHPSP LMGGFGLKHP PPQILIKNTP VPANPSTTFS AAKFASFITQ YSTGQVSVEI   480
EWELQKENSK RWNPEIQYTS NYNKSVNVDF TVDTNGVYSE PRPIGTRYLT RNL          533

SEQ ID NO: 67             moltype = AA   length = 533
FEATURE                   Location/Qualifiers
source                    1..533
                          mol_type = protein
```

```
                        note = Amino acid sequence of VP3 variant
                        organism = synthetic construct
SEQUENCE: 67
MATGSGAPM

```
EWELQKENSK RWNPEIQYTS NYNKSVNVDF TVDTNGVYSE PRPIGTRYLT RNL         533

SEQ ID NO: 72              moltype = AA  length = 533
FEATURE                    Location/Qualifiers
source                     1..533
                           mol_type = protein
                           note = Amino acid sequence of VP3 variant
                           organism = synthetic construct
SEQUENCE: 72
MATGSGAPMA DNNEGADGVG NSSGNWHCDS TWMGDRVITT STRTWALPTY NNHLYKQISS   60
QSGASNDNHY FGYSTPWGYF DFNRFHCHFS PRDWQRLINN NWGFRPKRLN FKLFNIQVKE  120
VTQNDGTTTI ANNLTSTVQV FTDSEYQLPY VLGSAHQGCL PPFPADVFMV PQYGYLTLNN  180
GSQAVGRSSF YCLEYFPSQM LRTGNNFTFS YTFEDVPFHS SYAHSQSLDR LMNPLIDQYL  240
YYLSRTNTPS GTTTQSRLQF SQAGASDIRD QSRNWLPGPC YRQQRVSKTS ADNNNSEYSW  300
TGATKYHLNG RDSLVNPGPA MASHKDDEEK FFPQSGVLIF GKQGSEKTNV DIEKVMITDE  360
EEINTTNPVY TEQYGSVSTN LQRGNIQAAT ADVNTQGVLP GMVWQDRDVY LQGPIWAKIP  420
HTDGHFHPSP LMGGFGLKHP PPQILIKNTP VPANPSTTFS AAKFASFITQ YSTGQVSVEI  480
EWELQKENSK RWNPEIQYTS NYNKSVNVDF TVDTNGVYSE PRPIGTRYLT RNL         533

SEQ ID NO: 73              moltype = AA  length = 533
FEATURE                    Location/Qualifiers
source                     1..533
                           mol_type = protein
                           note = Amino acid sequence of VP3 variant
                           organism = synthetic construct
SEQUENCE: 73
MATGSGAPMA DNNEGADGVG NSSGNWHCDS TWMGDRVITT STRTWALPTY NNHLYKQISS   60
QSGASNDNHY FGYSTPWGYF DFNRFHCHFS PRDWQRLINN NWGFRPKRLN FKLFNIQVKE  120
VTQNDGTTTI ANNLTSTVQV FTDSEYQLPY VLGSAHQGCL PPFPADVFMV PQYGYLTLNN  180
GSQAVGRSSF YCLEYFPSQM LRTGNNFTFS YTFEDVPFHS SYAHSQSLDR LMNPLIDQYL  240
YYLSRTNTPS GTTTQSRLQF SQAGASDIRD QSRNWLPGPC YRQQRVSKTS ADNNNSEYSW  300
TGATKYHLNG RDSLVNPGPA MASHKDDEEK FFPQSGVLIF GKQGSEKTNV DIEKVMITDE  360
QEVAATNPVA DEQYGVVATN LQRGNVQAAT ADVNTQGVLP GMVWQDRDVY LQGPIWAKIP  420
HTDGHFHPSP LMGGFGLKHP PPQILIKNTP VPANPSTTFS AAKFASFITQ YSTGQVSVEI  480
EWELQKENSK RWNPEIQYTS NYNKSVNVDF TVDTNGVYSE PRPIGTRYLT RNL         533

SEQ ID NO: 74              moltype = AA  length = 533
FEATURE                    Location/Qualifiers
source                     1..533
                           mol_type = protein
                           note = Amino acid sequence of VP3 variant
                           organism = synthetic construct
SEQUENCE: 74
MATGSGAPMA DNNEGADGVG NSSGNWHCDS TWMGDRVITT STRTWALPTY NNHLYKQISS   60
QSGASNDNHY FGYSTPWGYF DFNRFHCHFS PRDWQRLINN NWGFRPKRLN FKLFNIQVKE  120
VTQNDGTTTI ANNLTSTVQV FTDSEYQLPY VLGSAHQGCL PPFPADVFMV PQYGYLTLNN  180
GSQAVGRSSF YCLEYFPSQM LRTGNNFTFS YTFEDVPFHS SYAHSQSLDR LMNPLIDQYL  240
YYLSRTNTPS GTTTQSRLQF SQAGASDIRD QSRNWLPGPC YRQQRVSKTS ADNNNSEYSW  300
TGATKYHLNG RDSLVNPGPA MASHKDDEEK FFPQSGVLIF GKQGSEKTNV DIEKVMITDE  360
SEIAATNPVA TEQWGSVATN RQRGETQAAT ADVNTQGVLP GMVWQDRDVY LQGPIWAKIP  420
HTDGHFHPSP LMGGFGLKHP PPQILIKNTP VPANPSTTFS AAKFASFITQ YSTGQVSVEI  480
EWELQKENSK RWNPEIQYTS NYNKSVNVDF TVDTNGVYSE PRPIGTRYLT RNL         533

SEQ ID NO: 75              moltype = AA  length = 533
FEATURE                    Location/Qualifiers
source                     1..533
                           mol_type = protein
                           note = Amino acid sequence of VP3 variant
                           organism = synthetic construct
SEQUENCE: 75
MATGSGAPMA DNNEGADGVG NSSGNWHCDS TWMGDRVITT STRTWALPTY NNHLYKQISS   60
QSGASNDNHY FGYSTPWGYF DFNRFHCHFS PRDWQRLINN NWGFRPKRLN FKLFNIQVKE  120
VTQNDGTTTI ANNLTSTVQV FTDSEYQLPY VLGSAHQGCL PPFPADVFMV PQYGYLTLNN  180
GSQAVGRSSF YCLEYFPSQM LRTGNNFTFS YTFEDVPFHS SYAHSQSLDR LMNPLIDQYL  240
YYLSRTNTPS GTTTQSRLQF SQAGASDIRD QSRNWLPGPC YRQQRVSKTS ADNNNSEYSW  300
TGATKYHLNG RDSLVNPGPA MASHKDDEEK FFPQSGVLIF GKQGSEKTNV DIEKVMITDE  360
QEVAATNPVA TEQWGEVSTN LQRSTTQAAT ADVNTQGVLP GMVWQDRDVY LQGPIWAKIP  420
HTDGHFHPSP LMGGFGLKHP PPQILIKNTP VPANPSTTFS AAKFASFITQ YSTGQVSVEI  480
EWELQKENSK RWNPEIQYTS NYNKSVNVDF TVDTNGVYSE PRPIGTRYLT RNL         533

SEQ ID NO: 76              moltype = AA  length = 533
FEATURE                    Location/Qualifiers
source                     1..533
                           mol_type = protein
                           note = Amino acid sequence of VP3 variant
                           organism = synthetic construct
SEQUENCE: 76
MATGSGAPMA DNNEGADGVG NSSGNWHCDS TWMGDRVITT STRTWALPTY NNHLYKQISS   60
QSGASNDNHY FGYSTPWGYF DFNRFHCHFS PRDWQRLINN NWGFRPKRLN FKLFNIQVKE  120
```

```
VTQNDGTTTI ANNLTSTVQV FTDSEYQLPY VLGSAHQGCL PPFPADVFMV PQYGYLTLNN    180
GSQAVGRSSF YCLEYFPSQM LRTGNNFTFS YTFEDVPFHS SYAHSQSLDR LMNPLIDQYL    240
YYLSRTNTPS GTTTQSRLQF SQAGASDIRD QSRNWLPGPC YRQQRVSKTS ADNNNSEYSW    300
TGATKYHLNG RDSLVNPGPA MASHKDDEEK FFPQSGVLIF GKQGSEKTNV DIEKVMITQE    360
SEIAATNPVA TEQWGVVATN LQNGTRQAAT ADVNTQGVLP GMVWQDRDVY LQGPIWAKIP    420
HTDGHFHPSP LMGGFGLKHP PPQILIKNTP VPANPSTTFS AAKFASFITQ YSTGQVSVEI    480
EWELQKENSK RWNPEIQYTS NYNKSVNVDF TVDTNGVYSE PRPIGTRYLT RNL           533

SEQ ID NO: 77           moltype = AA  length = 533
FEATURE                 Location/Qualifiers
source                  1..533
                        mol_type = protein
                        note = Amino acid sequence of VP3 variant
                        organism = synthetic construct
SEQUENCE:

```
                         mol_type = protein
                         note = Amino acid sequence of VP3 variant
                         organism = synthetic construct
SEQUENCE: 81
MATGSGAPMA DNNEGADGVG NSSGNWHCDS TWMGDRVITT STRTWALPTY NNHLYKQISS    60
QSGASNDNHY FGYSTPWGYF DFNRFHCHFS PRDWQRLINN NWGFRPKRLN FKLFNIQVKE   120
VTQNDGTTTI ANNLTSTVQV FTDSEYQLPY VLGSAHQGCL PPFPADVFMV PQYGYLTLNN   180
GSQAVGRSSF YCLEYFPSQM LRTGNNFTFS YTFEDVPFHS SYAHSQSLDR LMNPLIDQYL   240
YYLSRTNTPS GTTTQSRLQF SQAGASDIRD QSRNWLPGPC YRQQRVSKTS ADNNNSEYSW   300
TGATKYHLNG RDSLVNPGPA MASHKDDEEK FFPQSGVLIF GKQGSEKTNV DIEKVMITQE   360
SEIAATNPVA TEQWGEVATN LQRGTTQAAT ADVNTQGVLP GMVWQDRDVY LQGPIWAKIP   420
HTDGHFHPSP LMGGFGLKHP PPQILIKNTP VPANPSTTFS AAKFASFITQ YSTGQVSVEI   480
EWELQKENSK RWNPEIQYTS NYNKSVNVDF TVDTNGVYSE PRPIGTRYLT RNL          533

SEQ ID NO: 82           moltype = AA   length = 533
FEATURE                 Location/Qualifiers
source                  1..533
                        mol_type = protein
                        note = Amino acid sequence of VP3 variant
                        organism = synthetic construct
SEQUENCE: 82
MATGSGAPMA DNNEGADGVG NSSGNWHCDS TWMGDRVITT STRTWALPTY NNHLYKQISS    60
QSGASNDNHY FGYSTPWGYF DFNRFHCHFS PRDWQRLINN NWGFRPKRLN FKLFNIQVKE   120
VTQNDGTTTI ANNLTSTVQV FTDSEYQLPY VLGSAHQGCL PPFPADVFMV PQYGYLTLNN   180
GSQAVGRSSF YCLEYFPSQM LRTGNNFTFS YTFEDVPFHS SYAHSQSLDR LMNPLIDQYL   240
YYLSRTNTPS GTTTQSRLQF SQAGASDIRD QSRNWLPGPC YRQQRVSKTS ADNNNSEYSW   300
TGATKYHLNG RDSLVNPGPA MASHKDDEEK FFPQSGVLIF GKQGSEKTNV DIEKVMITDE   360
WEIRTTNPVA TEQYGSVSTN LQRLNRQAAT ADVNTQGVLP GMVWQDRDVY LQGPIWAKIP   420
HTDGHFHPSP LMGGFGLKHP PPQILIKNTP VPANPSTTFS AAKFASFITQ YSTGQVSVEI   480
EWELQKENSK RWNPEIQYTS NYNKSVNVDF TVDTNGVYSE PRPIGTRYLT RNL          533

SEQ ID NO: 83           moltype = AA   length = 533
FEATURE                 Location/Qualifiers
source                  1..533
                        mol_type = protein
                        note = Amino acid sequence of VP3 variant
                        organism = synthetic construct
SEQUENCE: 83
MATGSGAPMA DNNEGADGVG NSSGNWHCDS TWMGDRVITT STRTWALPTY NNHLYKQISS    60
QSGASNDNHY FGYSTPWGYF DFNRFHCHFS PRDWQRLINN NWGFRPKRLN FKLFNIQVKE   120
VTQNDGTTTI ANNLTSTVQV FTDSEYQLPY VLGSAHQGCL PPFPADVFMV PQYGYLTLNN   180
GSQAVGRSSF YCLEYFPSQM LRTGNNFTFS YTFEDVPFHS SYAHSQSLDR LMNPLIDQYL   240
YYLSRTNTPS GTTTQSRLQF SQAGASDIRD QSRNWLPGPC YRQQRVSKTS ADNNNSEYSW   300
TGATKYHLNG RDSLVNPGPA MASHKDDEEK FFPQSGVLIF GKQGSEKTNV DIEKVMITDE   360
AEIAATNPVA TEQWGEVSTN TQNGARQAAT ADVNTQGVLP GMVWQDRDVY LQGPIWAKIP   420
HTDGHFHPSP LMGGFGLKHP PPQILIKNTP VPANPSTTFS AAKFASFITQ YSTGQVSVEI   480
EWELQKENSK RWNPEIQYTS NYNKSVNVDF TVDTNGVYSE PRPIGTRYLT RNL          533

SEQ ID NO: 84           moltype = AA   length = 533
FEATURE                 Location/Qualifiers
source                  1..533
                        mol_type = protein
                        note = Amino acid sequence of VP3 variant
                        organism = synthetic construct
SEQUENCE: 84
MATGSGAPMA DNNEGADGVG NSSGNWHCDS TWMGDRVITT STRTWALPTY NNHLYKQISS    60
QSGASNDNHY FGYSTPWGYF DFNRFHCHFS PRDWQRLINN NWGFRPKRLN FKLFNIQVKE   120
VTQNDGTTTI ANNLTSTVQV FTDSEYQLPY VLGSAHQGCL PPFPADVFMV PQYGYLTLNN   180
GSQAVGRSSF YCLEYFPSQM LRTGNNFTFS YTFEDVPFHS SYAHSQSLDR LMNPLIDQYL   240
YYLSRTNTPS GTTTQSRLQF SQAGASDIRD QSRNWLPGPC YRQQRVSKTS ADNNNSEYSW   300
TGATKYHLNG RDSLVNPGPA MASHKDDEEK FFPQSGVLIF GKQGSEKTNV DIEKVMITDE   360
QEVAATNPVA TEAYGTVSTN LQRQNTQAAT ADVNTQGVLP GMVWQDRDVY LQGPIWAKIP   420
HTDGHFHPSP LMGGFGLKHP PPQILIKNTP VPANPSTTFS AAKFASFITQ YSTGQVSVEI   480
EWELQKENSK RWNPEIQYTS NYNKSVNVDF TVDTNGVYSE PRPIGTRYLT RNL          533

SEQ ID NO: 85           moltype = AA   length = 533
FEATURE                 Location/Qualifiers
source                  1..533
                        mol_type = protein
                        note = Amino acid sequence of VP3 variant
                        organism = synthetic construct
SEQUENCE: 85
MATGSGAPMA DNNEGADGVG NSSGNWHCDS TWMGDRVITT STRTWALPTY NNHLYKQISS    60
QSGASNDNHY FGYSTPWGYF DFNRFHCHFS PRDWQRLINN NWGFRPKRLN FKLFNIQVKE   120
VTQNDGTTTI ANNLTSTVQV FTDSEYQLPY VLGSAHQGCL PPFPADVFMV PQYGYLTLNN   180
GSQAVGRSSF YCLEYFPSQM LRTGNNFTFS YTFEDVPFHS SYAHSQSLDR LMNPLIDQYL   240
YYLSRTNTPS GTTTQSRLQF SQAGASDIRD QSRNWLPGPC YRQQRVSKTS ADNNNSEYSW   300
TGATKYHLNG RDSLVNPGPA MASHKDDEEK FFPQSGVLIF GKQGSEKTNV DIEKVMITDE   360
AEIAATNPVA TEQYGTVSTN LQTGNQQAAT ADVNTQGVLP GMVWQDRDVY LQGPIWAKIP   420
```

```
HTDGHFHPSP LMGGFGLKHP PPQILIKNTP VPANPSTTFS AAKFASFITQ YSTGQVSVEI    480
EWELQKENSK RWNPEIQYTS NYNKSVNVDF TVDTNGVYSE PRPIGTRYLT RNL           533

SEQ ID NO: 86            moltype = AA  length = 533
FEATURE                  Location/Qualifiers
source                   1..533
                         mol_type = protein
                         note = Amino acid sequence of VP3 variant
                         organism = synthetic construct
SEQUENCE: 86
MATGSGAPMA DNNEGADGVG NSSGNWHCDS TWMGDRVITT STRTWALPTY NNHLYKQISS    60
QSGASNDNHY FGYSTPWGYF DFNRFHCHFS PRDWQRLINN NWGFRPKRLN FKLFNIQVKE    120
VTQNDGTTTI ANNLTSTVQV FTDSEYQLPY VLGSAHQGCL PPFPADVFMV PQYGYLTLNN    180
GSQAVGRSSF YCLEYFPSQM LRTGNNFTFS YTFEDVPFHS SYAHSQSLDR LMNPLIDQYL    240
YYLSRTNTPS GTTTQSRLQF SQAGASDIRD QSRNWLPGPC YRQQRVSKTS ADNNNSEYSW    300
TGATKYHLNG RDSLVNPGPA MASHKDDEEK FFPQSGVLIF GKQGSEKTNV DIEKVMITDE    360
SEIRTTNPVA TESYGEVATN LQTGTTQAAT ADVNTQGVLP GMVWQDRDVY LQGPIWAKIP    420
HTDGHFHPSP LMGGFGLKHP PPQILIKNTP VPANPSTTFS AAKFASFITQ YSTGQVSVEI    480
EWELQKENSK RWNPEIQYTS NYNKSVNVDF TVDTNGVYSE PRPIGTRYLT RNL           533

SEQ ID NO: 87            moltype = AA  length = 533
FEATURE                  Location/Qualifiers
source                   1..533
                         mol_type = protein
                         note = Amino acid sequence of VP3 variant
                         organism = synthetic construct
SEQUENCE: 87
MATGSGAPMA DNNEGADGVG NSSGNWHCDS TWMGDRVITT STRTWALPTY NNHLYKQISS    60
QSGASNDNHY FGYSTPWGYF DFNRFHCHFS PRDWQRLINN NWGFRPKRLN FKLFNIQVKE    120
VTQNDGTTTI ANNLTSTVQV FTDSEYQLPY VLGSAHQGCL PPFPADVFMV PQYGYLTLNN    180
GSQAVGRSSF YCLEYFPSQM LRTGNNFTFS YTFEDVPFHS SYAHSQSLDR LMNPLIDQYL    240
YYLSRTNTPS GTTTQSRLQF SQAGASDIRD QSRNWLPGPC YRQQRVSKTS ADNNNSEYSW    300
TGATKYHLNG RDSLVNPGPA MASHKDDEEK FFPQSGVLIF GKQGSEKTNV DIEKVMITDE    360
AEIATTNPVA TEQWGSVSTN LQGGNLQAAT ADVNTQGVLP GMVWQDRDVY LQGPIWAKIP    420
HTDGHFHPSP LMGGFGLKHP PPQILIKNTP VPANPSTTFS AAKFASFITQ YSTGQVSVEI    480
EWELQKENSK RWNPEIQYTS NYNKSVNVDF TVDTNGVYSE PRPIGTRYLT RNL           533

SEQ ID NO: 88            moltype = AA  length = 533
FEATURE                  Location/Qualifiers
source                   1..533
                         mol_type = protein
                         note = Amino acid sequence of VP3 variant
                         organism = synthetic construct
SEQUENCE: 88
MATGSGAPMA DNNEGADGVG NSSGNWHCDS TWMGDRVITT STRTWALPTY NNHLYKQISS    60
QSGASNDNHY FGYSTPWGYF DFNRFHCHFS PRDWQRLINN NWGFRPKRLN FKLFNIQVKE    120
VTQNDGTTTI ANNLTSTVQV FTDSEYQLPY VLGSAHQGCL PPFPADVFMV PQYGYLTLNN    180
GSQAVGRSSF YCLEYFPSQM LRTGNNFTFS YTFEDVPFHS SYAHSQSLDR LMNPLIDQYL    240
YYLSRTNTPS GTTTQSRLQF SQAGASDIRD QSRNWLPGPC YRQQRVSKTS ADNNNSEYSW    300
TGATKYHLNG RDSLVNPGPA MASHKDDEEK FFPQSGVLIF GKQGSEKTNV DIEKVMITNE    360
SEIAATNPVA TEQYGVVATN LQNGTVQAAT ADVNTQGVLP GMVWQDRDVY LQGPIWAKIP    420
HTDGHFHPSP LMGGFGLKHP PPQILIKNTP VPANPSTTFS AAKFASFITQ YSTGQVSVEI    480
EWELQKENSK RWNPEIQYTS NYNKSVNVDF TVDTNGVYSE PRPIGTRYLT RNL           533

SEQ ID NO: 89            moltype = AA  length = 533
FEATURE                  Location/Qualifiers
source                   1..533
                         mol_type = protein
                         note = Amino acid sequence of VP3 variant
                         organism = synthetic construct
SEQUENCE: 89
MATGSGAPMA DNNEGADGVG NSSGNWHCDS TWMGDRVITT STRTWALPTY NNHLYKQISS    60
QSGASNDNHY FGYSTPWGYF DFNRFHCHFS PRDWQRLINN NWGFRPKRLN FKLFNIQVKE    120
VTQNDGTTTI ANNLTSTVQV FTDSEYQLPY VLGSAHQGCL PPFPADVFMV PQYGYLTLNN    180
GSQAVGRSSF YCLEYFPSQM LRTGNNFTFS YTFEDVPFHS SYAHSQSLDR LMNPLIDQYL    240
YYLSRTNTPS GTTTQSRLQF SQAGASDIRD QSRNWLPGPC YRQQRVSKTS ADNNNSEYSW    300
TGATKYHLNG RDSLVNPGPA MASHKDDEEK FFPQSGVLIF GKQGSEKTNV DIEKVMITDE    360
SEIRTTNPVA TEQWGEVATN LQNGNIQAAT ADVNTQGVLP GMVWQDRDVY LQGPIWAKIP    420
HTDGHFHPSP LMGGFGLKHP PPQILIKNTP VPANPSTTFS AAKFASFITQ YSTGQVSVEI    480
EWELQKENSK RWNPEIQYTS NYNKSVNVDF TVDTNGVYSE PRPIGTRYLT RNL           533

SEQ ID NO: 90            moltype = AA  length = 533
FEATURE                  Location/Qualifiers
source                   1..533
                         mol_type = protein
                         note = Amino acid sequence of VP3 variant
                         organism = synthetic construct
SEQUENCE: 90
MATGSGAPMA DNNEGADGVG NSSGNWHCDS TWMGDRVITT STRTWALPTY NNHLYKQISS    60
```

```
QSGASNDNHY FGYSTPWGYF DFNRFHCHFS PRDWQRLINN NWGFRPKRLN FKLFNIQVKE    120
VTQNDGTTTI ANNLTSTVQV FTDSEYQLPY VLGSAHQGCL PPFPADVFMV PQYGYLTLNN    180
GSQAVGRSSF YCLEYFPSQM LRTGNNFTFS YTFEDVPFHS SYAHSQSLDR LMNPLIDQYL    240
YYLSRTNTPS GTTTQSRLQF SQAGASDIRD QSRNWLPGPC YRQQRVSKTS ADNNNSEYSW    300
TGATKYHLNG RDSLVNPGPA MASHKDDEEK FFPQSGVLIF GKQGSEKTNV DIEKVMITDE    360
AEIAATNPVA TEQYGCVASN IQNSNTQAAT ADVNTQGVLP GMVWQDRDVY LQGPIWAKIP    420
HTDGHFHPSP LMGGFGLKHP PPQIIKNTP  VPANPSTTFS AAKFASFITQ YSTGQVSVEI    480
EWELQKENSK RWNPEIQYTS NYNKSVNVDF TVDTNGVYSE PRPIGTRYLT RNL           533

SEQ ID NO: 91              moltype = AA  length = 533
FEATURE                    Location/Qualifiers
source                     1..533
                           mol_type = protein
                           note = Amino acid sequence of VP3 variant
                           organism = synthetic construct
SEQUENCE: 91
MATGSGAPMA DNNEGADGVG NSSGNWHCDS TWMGDRVITT STRTWALPTY NNHLYKQISS     60
QSGASNDNHY FGYSTPWGYF DFNRFHCHFS PRDWQRLINN NWGFRPKRLN FKLFNIQVKE    120
VTQNDGTTTI ANNLTSTVQV FTDSEYQLPY VLGSAHQGCL PPFPADVFMV PQYGYLTLNN    180
GSQAVGRSSF YCLEYFPSQM LRTGNNFTFS YTFEDVPFHS SYAHSQSLDR LMNPLIDQYL    240
YYLSRTNTPS GTTTQSRLQF SQAGASDIRD QSRNWLPGPC YRQQRVSKTS ADNNNSEYSW    300
TGATKYHLNG RDSLVNPGPA MASHKDDEEK FFPQSGVLIF GKQGSEKTNV DIEKVMITDE    360
SEIAATNPVA YEQYGSVTTN LQNGNNQAAT ADVNTQGVLP GMVWQDRDVY LQGPIWAKIP    420
HTDGHFHPSP LMGGFGLKHP PPQIIKNTP  VPANPSTTFS AAKFASFITQ YSTGQVSVEI    480
EWELQKENSK RWNPEIQYTS NYNKSVNVDF TVDTNGVYSE PRPIGTRYLT RNL           533

SEQ ID NO: 92              moltype = AA  length = 533
FEATURE                    Location/Qualifiers
source                     1..533
                           mol_type = protein
                           note = Amino acid sequence of VP3 variant
                           organism = synthetic construct
SEQUENCE: 92
MATGSGAPMA DNNEGADGVG NSSGNWHCDS TWMGDRVITT STRTWALPTY NNHLYKQISS     60
QSGASNDNHY FGYSTPWGYF DFNRFHCHFS PRDWQRLINN NWGFRPKRLN FKLFNIQVKE    120
VTQNDGTTTI ANNLTSTVQV FTDSEYQLPY VLGSAHQGCL PPFPADVFMV PQYGYLTLNN    180
GSQAVGRSSF YCLEYFPSQM LRTGNNFTFS YTFEDVPFHS SYAHSQSLDR LMNPLIDQYL    240
YYLSRTNTPS GTTTQSRLQF SQAGASDIRD QSRNWLPGPC YRQQRVSKTS ADNNNSEYSW    300
TGATKYHLNG RDSLVNPGPA MASHKDDEEK FFPQSGVLIF GKQGSEKTNV DIEKVMITDE    360
SEIAATNPVA TEQYGCVATN LQRGYVQAAT ADVNTQGVLP GMVWQDRDVY LQGPIWAKIP    420
HTDGHFHPSP LMGGFGLKHP PPQIIKNTP  VPANPSTTFS AAKFASFITQ YSTGQVSVEI    480
EWELQKENSK RWNPEIQYTS NYNKSVNVDF TVDTNGVYSE PRPIGTRYLT RNL           533

SEQ ID NO: 93              moltype = AA  length = 533
FEATURE                    Location/Qualifiers
source                     1..533
                           mol_type = protein
                           note = Amino acid sequence of VP3 variant
                           organism = synthetic construct
SEQUENCE: 93
MATGSGAPMA DNNEGADGVG NSSGNWHCDS TWMGDRVITT STRTWALPTY NNHLYKQISS     60
QSGASNDNHY FGYSTPWGYF DFNRFHCHFS PRDWQRLINN NWGFRPKRLN FKLFNIQVKE    120
VTQNDGTTTI ANNLTSTVQV FTDSEYQLPY VLGSAHQGCL PPFPADVFMV PQYGYLTLNN    180
GSQAVGRSSF YCLEYFPSQM LRTGNNFTFS YTFEDVPFHS SYAHSQSLDR LMNPLIDQYL    240
YYLSRTNTPS GTTTQSRLQF SQAGASDIRD QSRNWLPGPC YRQQRVSKTS ADNNNSEYSW    300
TGATKYHLNG RDSLVNPGPA MASHKDDEEK FFPQSGVLIF GKQGSEKTNV DIEKVMITDE    360
QEVAATNPVA TEQWGEVSTN LQRGNEQAAT ADVNTQGVLP GMVWQDRDVY LQGPIWAKIP    420
HTDGHFHPSP LMGGFGLKHP PPQIIKNTP  VPANPSTTFS AAKFASFITQ YSTGQVSVEI    480
EWELQKENSK RWNPEIQYTS NYNKSVNVDF TVDTNGVYSE PRPIGTRYLT RNL           533

SEQ ID NO: 94              moltype = AA  length = 28
FEATURE                    Location/Qualifiers
source                     1..28
                           mol_type = protein
                           note = Wild-type amino acid sequence in a region at
                             positions VP1 561-588
                           organism = synthetic construct
SEQUENCE: 94
DEEEIRTTNP VATEQYGSVS TNLQRGNR                                        28

SEQ ID NO: 95              moltype = AA  length = 28
FEATURE                    Location/Qualifiers
source                     1..28
                           mol_type = protein
                           note = Mutation amino acid sequence in a region at
                             positions VP1 561-588
                           organism = synthetic construct
SEQUENCE: 95
DEEEIAATNP VATESYGEVA TNLQRGNV                                        28
```

```
SEQ ID NO: 96          moltype = AA  length = 28
FEATURE                Location/Qualifiers
source                 1..28
                       mol_type = protein
                       note = Mutation amino acid sequence in a region at
                         positions VP1 561-588
                       organism = synthetic construct
SEQUENCE: 96
DEQEVAATNP VATESWGSVS TNLQRGNT                                              28

SEQ ID NO: 97          moltype = AA  length = 28
FEATURE                Location/Qualifiers
source                 1..28
                       mol_type = protein
                       note = Mutation amino acid sequence in a region at
                         positions VP1 561-588
                       organism = synthetic construct
SEQUENCE: 97
DESEIRTTNP IATEQWGSVS TNLQNGNR                                              28

SEQ ID NO: 98          moltype = AA  length = 28
FEATURE                Location/Qualifiers
source                 1..28
                       mol_type = protein
                       note = Mutation amino acid sequence in a region at
                         positions VP1 561-588
                       organism = synthetic construct
SEQUENCE: 98
DEEEIATTNP VATEQWGSVS TNLQRGAT                                              28

SEQ ID NO: 99          moltype = AA  length = 28
FEATURE                Location/Qualifiers
source                 1..28
                       mol_type = protein
                       note = Mutation amino acid sequence in a region at
                         positions VP1 561-588
                       organism = synthetic construct
SEQUENCE: 99
DESEIATTNP VATESYGEVS TNLQRNPV                                              28

SEQ ID NO: 100         moltype = AA  length = 28
FEATURE                Location/Qualifiers
source                 1..28
                       mol_type = protein
                       note = Mutation amino acid sequence in a region at
                         positions VP1 561-588
                       organism = synthetic construct
SEQUENCE: 100
DEEEIRTTNP VAYEQYGVVA TNLQNSNA                                              28

SEQ ID NO: 101         moltype = AA  length = 28
FEATURE                Location/Qualifiers
source                 1..28
                       mol_type = protein
                       note = Mutation amino acid sequence in a region at
                         positions VP1 561-588
                       organism = synthetic construct
SEQUENCE: 101
DEAEIATTNP VAAEQYGEVS TNLQNGNR                                              28

SEQ ID NO: 102         moltype = AA  length = 28
FEATURE                Location/Qualifiers
source                 1..28
                       mol_type = protein
                       note = Mutation amino acid sequence in a region at
                         positions VP1 561-588
                       organism = synthetic construct
SEQUENCE: 102
DEQEVAATNP VATEHYGQVA TNLQTGNR                                              28

SEQ ID NO: 103         moltype = AA  length = 28
FEATURE                Location/Qualifiers
source                 1..28
                       mol_type = protein
                       note = Mutation amino acid sequence in a region at
                         positions VP1 561-588
                       organism = synthetic construct
SEQUENCE: 103
```

```
DEEEINTTNP VYTEQYGSVS TNLQRGNI                                          28

SEQ ID NO: 104          moltype = AA  length = 28
FEATURE                 Location/Qualifiers
source                  1..28
                        mol_type = protein
                        note = Mutation amino acid sequence in a region at
                          positions VP1 561-588
                        organism = synthetic construct
SEQUENCE: 104
DEQEVAATNP VADEQYGVVA TNLQRGNV                                          28

SEQ ID NO: 105          moltype = AA  length = 28
FEATURE                 Location/Qualifiers
source                  1..28
                        mol_type = protein
                        note = Mutation amino acid sequence in a region at
                          positions VP1 561-588
                        organism = synthetic construct
SEQUENCE: 105
DESEIAATNP VATEQWGSVA TNRQRGET                                          28

SEQ ID NO: 106          moltype = AA  length = 28
FEATURE                 Location/Qualifiers
source                  1..28
                        mol_type = protein
                        note = Mutation amino acid sequence in a region at
                          positions VP1 561-588
                        organism = synthetic construct
SEQUENCE: 106
DEQEVAATNP VATEQWGEVS TNLQRSTT                                          28

SEQ ID NO: 107          moltype = AA  length = 28
FEATURE                 Location/Qualifiers
source                  1..28
                        mol_type = protein
                        note = Mutation amino acid sequence in a region at
                          positions VP1 561-588
                        organism = synthetic construct
SEQUENCE: 107
QESEIAATNP VATEQWGVVA TNLQNGTR                                          28

SEQ ID NO: 108          moltype = AA  length = 28
FEATURE                 Location/Qualifiers
source                  1..28
                        mol_type = protein
                        note = Mutation amino acid sequence in a region at
                          positions VP1 561-588
                        organism = synthetic construct
SEQUENCE: 108
DESEVAATNP VATEQWGEVS TNNQRGTT                                          28

SEQ ID NO: 109          moltype = AA  length = 28
FEATURE                 Location/Qualifiers
source                  1..28
                        mol_type = protein
                        note = Mutation amino acid sequence in a region at
                          positions VP1 561-588
                        organism = synthetic construct
SEQUENCE: 109
DEEEIRTTNP VATEQYGSVS TNIQHGNR                                          28

SEQ ID NO: 110          moltype = AA  length = 28
FEATURE                 Location/Qualifiers
source                  1..28
                        mol_type = protein
                        note = Mutation amino acid sequence in a region at
                          positions VP1 561-588
                        organism = synthetic construct
SEQUENCE: 110
DEEEIRTTNP VATEQYGSVS TWLQRGNR                                          28

SEQ ID NO: 111          moltype = AA  length = 28
FEATURE                 Location/Qualifiers
source                  1..28
                        mol_type = protein
                        note = Mutation amino acid sequence in a region at
                          positions VP1 561-588
                        organism = synthetic construct
```

```
SEQUENCE: 111
DEQEIAATNP VATEQYGEVS TNLQNQNR                                        28

SEQ ID NO: 112          moltype = AA  length = 28
FEATURE                 Location/Qualifiers
source                  1..28
                        mol_type = protein
                        note = Mutation amino acid sequence in a region at
                         positions VP1 561-588
                        organism = synthetic construct
SEQUENCE: 112
QESEIAATNP VATEQWGEVA TNLQRGTT                                        28

SEQ ID NO: 113          moltype = AA  length = 28
FEATURE                 Location/Qualifiers
source                  1..28
                        mol_type = protein
                        note = Mutation amino acid sequence in a region at
                         positions VP1 561-588
                        organism = synthetic construct
SEQUENCE: 113
DEWEIRTTNP VATEQYGSVS TNLQRLNR                                        28

SEQ ID NO: 114          moltype = AA  length = 28
FEATURE                 Location/Qualifiers
source                  1..28
                        mol_type = protein
                        note = Mutation amino acid sequence in a region at
                         positions VP1 561-588
                        organism = synthetic construct
SEQUENCE: 114
DEAEIAATNP VATEQWGEVS TNTQNGAR                                        28

SEQ ID NO: 115          moltype = AA  length = 28
FEATURE                 Location/Qualifiers
source                  1..28
                        mol_type = protein
                        note = Mutation amino acid sequence in a region at
                         positions VP1 561-588
                        organism = synthetic construct
SEQUENCE: 115
DEQEVAATNP VATEAYGTVS TNLQRQNT                                        28

SEQ ID NO: 116          moltype = AA  length = 28
FEATURE                 Location/Qualifiers
source                  1..28
                        mol_type = protein
                        note = Mutation amino acid sequence in a region at
                         positions VP1 561-588
                        organism = synthetic construct
SEQUENCE: 116
DEAEIAATNP VATEQYGTVS TNLQTGNQ                                        28

SEQ ID NO: 117          moltype = AA  length = 28
FEATURE                 Location/Qualifiers
source                  1..28
                        mol_type = protein
                        note = Mutation amino acid sequence in a region at
                         positions VP1 561-588
                        organism = synthetic construct
SEQUENCE: 117
DESEIRTTNP VATESYGEVA TNLQTGTT                                        28

SEQ ID NO: 118          moltype = AA  length = 28
FEATURE                 Location/Qualifiers
source                  1..28
                        mol_type = protein
                        note = Mutation amino acid sequence in a region at
                         positions VP1 561-588
                        organism = synthetic construct
SEQUENCE: 118
DEAEIATTNP VATEQWGSVS TNLQGGNL                                        28

SEQ ID NO: 119          moltype = AA  length = 28
FEATURE                 Location/Qualifiers
source                  1..28
                        mol_type = protein
                        note = Mutation amino acid sequence in a region at
                         positions VP1 561-588
```

```
                                   organism = synthetic construct
SEQUENCE: 119
NESEIAATNP VATEQYGVVA TNLQNGTV                                         28

SEQ ID NO: 120          moltype = AA  length = 28
FEATURE                 Location/Qualifiers
source                  1..28
                        mol_type = protein
                        note = Mutation amino acid sequence in a region at
                          positions VP1 561-588
                        organism = synthetic construct
SEQUENCE: 120
DESEIRTTNP VATEQWGEVA TNLQNGNI                                         28

SEQ ID NO: 121          moltype = AA  length = 28
FEATURE                 Location/Qualifiers
source                  1..28
                        mol_type = protein
                        note = Mutation amino acid sequence in a region at
                          positions VP1 561-588
                        organism = synthetic construct
SEQUENCE: 121
DEAEIAATNP VATEQYGCVA SNIQNSNT                                         28

SEQ ID NO: 122          moltype = AA  length = 28
FEATURE                 Location/Qualifiers
source                  1..28
                        mol_type = protein
                        note = Mutation amino acid sequence in a region at
                          positions VP1 561-588
                        organism = synthetic construct
SEQUENCE: 122
DESEIAATNP VAYEQYGSVT TNLQNGNN                                         28

SEQ ID NO: 123          moltype = AA  length = 28
FEATURE                 Location/Qualifiers
source                  1..28
                        mol_type = protein
                        note = Mutation amino acid sequence in a region at
                          positions VP1 561-588
                        organism = synthetic construct
SEQUENCE: 123
DESEIAATNP VATEQYGCVA TNLQRGYV                                         28

SEQ ID NO: 124          moltype = AA  length = 28
FEATURE                 Location/Qualifiers
source                  1..28
                        mol_type = protein
                        note = Mutation amino acid sequence in a region at
                          positions VP1 561-588
                        organism = synthetic construct
SEQUENCE: 124
DEQEVAATNP VATEQWGEVS TNLQRGNE                                         28

SEQ ID NO: 125          moltype = DNA  length = 84
FEATURE                 Location/Qualifiers
source                  1..84
                        mol_type = other DNA
                        note = DNA sequence encoding the mutation amino acid
                          sequence in a region at positions VP1 561-588
                        organism = synthetic construct
SEQUENCE: 125
gacgaggagg agatcgccgc caccaacccc gtggccaccg agagctacgg cgaggtggcc      60
accaacctgc agagaggcaa cgtg                                             84

SEQ ID NO: 126          moltype = DNA  length = 84
FEATURE                 Location/Qualifiers
source                  1..84
                        mol_type = other DNA
                        note = DNA sequence encoding the mutation amino acid
                          sequence in a region at positions VP1 561-588
                        organism = synthetic construct
SEQUENCE: 126
gacgagcagg aggtggccgc caccaacccc gtggccaccg agagctgggg cagcgtgagc      60
accaacctgc agagaggcaa cacc                                             84

SEQ ID NO: 127          moltype = DNA  length = 84
FEATURE                 Location/Qualifiers
source                  1..84
```

```
                            mol_type = other DNA
                            note = DNA sequence encoding the mutation amino acid
                              sequence in a region at positions VP1 561-588
                            organism = synthetic construct
SEQUENCE: 127
gacgagagcg agatcagaac caccaacccc atcgccaccg agcagtgggg cagcgtgagc   60
accaacctgc agaacggcaa caga                                          84

SEQ ID NO: 128              moltype = DNA  length = 84
FEATURE                     Location/Qualifiers
source                      1..84
                            mol_type = other DNA
                            note = DNA sequence encoding the mutation amino acid
                              sequence in a region at positions VP1 561-588
                            organism = synthetic construct
SEQUENCE: 128
gacgaggagg agatcgccac caccaacccc gtggccaccg agcagtgggg cagcgtgagc   60
accaacctgc agagaggcgc cacc                                          84

SEQ ID NO: 129              moltype = DNA  length = 84
FEATURE                     Location/Qualifiers
source                      1..84
                            mol_type = other DNA
                            note = DNA sequence encoding the mutation amino acid
                              sequence in a region at positions VP1 561-588
                            organism = synthetic construct
SEQUENCE: 129
gacgagagcg agatcgccac caccaacccc gtggccaccg agagctacgg cgaggtgagc   60
accaacctgc agagaaaccc cgtg                                          84

SEQ ID NO: 130              moltype = DNA  length = 84
FEATURE                     Location/Qualifiers
source                      1..84
                            mol_type = other DNA
                            note = DNA sequence encoding the mutation amino acid
                              sequence in a region at positions VP1 561-588
                            organism = synthetic construct
SEQUENCE: 130
gacgaggagg agatcagaac caccaacccc gtggcctacg agcagtacgg cgtggtggcc   60
accaacctgc agaacagcaa cgcc                                          84

SEQ ID NO: 131              moltype = DNA  length = 84
FEATURE                     Location/Qualifiers
source                      1..84
                            mol_type = other DNA
                            note = DNA sequence encoding the mutation amino acid
                              sequence in a region at positions VP1 561-588
                            organism = synthetic construct
SEQUENCE: 131
gacgaggccg agatcgccac caccaacccc gtggccgccg agcagtacgg cgaggtgagc   60
accaacctgc agaacggcaa caga                                          84

SEQ ID NO: 132              moltype = DNA  length = 84
FEATURE                     Location/Qualifiers
source                      1..84
                            mol_type = other DNA
                            note = DNA sequence encoding the mutation amino acid
                              sequence in a region at positions VP1 561-588
                            organism = synthetic construct
SEQUENCE: 132
gacgagcagg aggtggccgc caccaacccc gtggccaccg agcactacgg ccaggtggcc   60
accaacctgc agaccggcaa caga                                          84

SEQ ID NO: 133              moltype = DNA  length = 84
FEATURE                     Location/Qualifiers
source                      1..84
                            mol_type = other DNA
                            note = DNA sequence encoding the mutation amino acid
                              sequence in a region at positions VP1 561-588
                            organism = synthetic construct
SEQUENCE: 133
gacgaagagg aaatcaacac aaccaatccc gtgtacacgg agcagtatgg ttctgtatct   60
accaacctcc agagaggcaa catc                                          84

SEQ ID NO: 134              moltype = DNA  length = 84
FEATURE                     Location/Qualifiers
source                      1..84
                            mol_type = other DNA
                            note = DNA sequence encoding the mutation amino acid
```

```
                              sequence in a region at positions VP1 561-588
                              organism = synthetic construct
SEQUENCE: 134
gacgagcagg aggtggccgc caccaacccc gtggccgacg agcagtacgg cgtggtggcc     60
accaacctgc agagaggcaa cgtg                                            84

SEQ ID NO: 135                moltype = DNA   length = 84
FEATURE                       Location/Qualifiers
source                        1..84
                              mol_type = other DNA
                              note = DNA sequence encoding the mutation amino acid
                              sequence in a region at positions VP1 561-588
                              organism = synthetic construct
SEQUENCE: 135
gacgagagcg agatcgccgc caccaacccc gtggccaccg agcagtgggg cagcgtggcc     60
accaacagac agagaggcga gacc                                            84

SEQ ID NO: 136                moltype = DNA   length = 84
FEATURE                       Location/Qualifiers
source                        1..84
                              mol_type = other DNA
                              note = DNA sequence encoding the mutation amino acid
                              sequence in a region at positions VP1 561-588
                              organism = synthetic construct
SEQUENCE: 136
gacgagcagg aggtggccgc caccaacccc gtggccaccg agcagtgggg cgaggtgagc     60
accaacctgc agagaagcac cacc                                            84

SEQ ID NO: 137                moltype = DNA   length = 84
FEATURE                       Location/Qualifiers
source                        1..84
                              mol_type = other DNA
                              note = DNA sequence encoding the mutation amino acid
                              sequence in a region at positions VP1 561-588
                              organism = synthetic construct
SEQUENCE: 137
caggagagcg agatcgccgc caccaacccc gtggccaccg agcagtgggg cgtggtggcc     60
accaacctgc agaacggcac caga                                            84

SEQ ID NO: 138                moltype = DNA   length = 84
FEATURE                       Location/Qualifiers
source                        1..84
                              mol_type = other DNA
                              note = DNA sequence encoding the mutation amino acid
                              sequence in a region at positions VP1 561-588
                              organism = synthetic construct
SEQUENCE: 138
gacgagagcg aggtggccgc caccaacccc gtggccaccg agcagtgggg cgaggtgagc     60
accaacaacc agagaggcac cacc                                            84

SEQ ID NO: 139                moltype = DNA   length = 84
FEATURE                       Location/Qualifiers
source                        1..84
                              mol_type = other DNA
                              note = DNA sequence encoding the mutation amino acid
                              sequence in a region at positions VP1 561-588
                              organism = synthetic construct
SEQUENCE: 139
gacgaagagg aaatcaggac aaccaatccc gtggctacgg agcagtatgg ttctgtatct     60
accaacatcc agcacggcaa caga                                            84

SEQ ID NO: 140                moltype = DNA   length = 84
FEATURE                       Location/Qualifiers
source                        1..84
                              mol_type = other DNA
                              note = DNA sequence encoding the mutation amino acid
                              sequence in a region at positions VP1 561-588
                              organism = synthetic construct
SEQUENCE: 140
gacgaagagg aaatcaggac aaccaatccc gtggctacgg agcagtatgg ttctgtatct     60
acctggctcc agagaggcaa caga                                            84

SEQ ID NO: 141                moltype = DNA   length = 84
FEATURE                       Location/Qualifiers
source                        1..84
                              mol_type = other DNA
                              note = DNA sequence encoding the mutation amino acid
                              sequence in a region at positions VP1 561-588
                              organism = synthetic construct
```

```
SEQUENCE: 141
gacgagcagg agatcgccgc caccaacccc gtggccaccg agcagtacgg cgaggtgagc    60
accaacctgc agaaccagaa caga                                          84

SEQ ID NO: 142          moltype = DNA   length = 84
FEATURE                 Location/Qualifiers
source                  1..84
                        mol_type = other DNA
                        note = DNA sequence encoding the mutation amino acid
                          sequence in a region at positions VP1 561-588
                        organism = synthetic construct
SEQUENCE: 142
caggagagcg agatcgccgc caccaacccc gtggccaccg agcagtgggg cgaggtggcc    60
accaacctgc agagaggcac cacc                                          84

SEQ ID NO: 143          moltype = DNA   length = 84
FEATURE                 Location/Qualifiers
source                  1..84
                        mol_type = other DNA
                        note = DNA sequence encoding the mutation amino acid
                          sequence in a region at positions VP1 561-588
                        organism = synthetic construct
SEQUENCE: 143
gacgaatggg aaatcaggac aaccaatccc gtggctacgg agcagtatgg ttctgtatct    60
accaacctcc agagactgaa caga                                          84

SEQ ID NO: 144          moltype = DNA   length = 84
FEATURE                 Location/Qualifiers
source                  1..84
                        mol_type = other DNA
                        note = DNA sequence encoding the mutation amino acid
                          sequence in a region at positions VP1 561-588
                        organism = synthetic construct
SEQUENCE: 144
gacgaggccg agatcgccgc caccaacccc gtggccaccg agcagtgggg cgaggtgagc    60
accaacaccc agaacggcgc caga                                          84

SEQ ID NO: 145          moltype = DNA   length = 84
FEATURE                 Location/Qualifiers
source                  1..84
                        mol_type = other DNA
                        note = DNA sequence encoding the mutation amino acid
                          sequence in a region at positions VP1 561-588
                        organism = synthetic construct
SEQUENCE: 145
gacgagcagg aggtggccgc caccaacccc gtggccaccg aggcctacgg caccgtgagc    60
accaacctgc agagacagaa cacc                                          84

SEQ ID NO: 146          moltype = DNA   length = 84
FEATURE                 Location/Qualifiers
source                  1..84
                        mol_type = other DNA
                        note = DNA sequence encoding the mutation amino acid
                          sequence in a region at positions VP1 561-588
                        organism = synthetic construct
SEQUENCE: 146
gacgaggccg agatcgccgc caccaacccc gtggccaccg agcagtacgg caccgtgagc    60
accaacctgc agaccggcaa ccag                                          84

SEQ ID NO: 147          moltype = DNA   length = 84
FEATURE                 Location/Qualifiers
source                  1..84
                        mol_type = other DNA
                        note = DNA sequence encoding the mutation amino acid
                          sequence in a region at positions VP1 561-588
                        organism = synthetic construct
SEQUENCE: 147
gacgagagcg agatcagaac caccaacccc gtggccaccg agagctacgg cgaggtggcc    60
accaacctgc agaccggcac cacc                                          84

SEQ ID NO: 148          moltype = DNA   length = 84
FEATURE                 Location/Qualifiers
source                  1..84
                        mol_type = other DNA
                        note = DNA sequence encoding the mutation amino acid
                          sequence in a region at positions VP1 561-588
                        organism = synthetic construct
SEQUENCE: 148
gacgaggccg agatcgccac caccaacccc gtggccaccg agcagtgggg cagcgtgagc    60
```

```
accaacctgc agggcggcaa cctg                                            84

SEQ ID NO: 149         moltype = DNA   length = 84
FEATURE                Location/Qualifiers
source                 1..84
                       mol_type = other DNA
                       note = DNA sequence encoding the mutation amino acid
                         sequence in a region at positions VP1 561-588
                       organism = synthetic construct
SEQUENCE: 149
aacgagagcg agatcgccgc caccaacccc gtggccaccg agcagtacgg cgtggtggcc    60
accaacctgc agaacggcac cgtg                                            84

SEQ ID NO: 150         moltype = DNA   length = 84
FEATURE                Location/Qualifiers
source                 1..84
                       mol_type = other DNA
                       note = DNA sequence encoding the mutation amino acid
                         sequence in a region at positions VP1 561-588
                       organism = synthetic construct
SEQUENCE: 150
gacgagagcg agatcagaac caccaacccc gtggccaccg agcagtgggg cgaggtggcc    60
accaacctgc agaacggcaa catc                                            84

SEQ ID NO: 151         moltype = DNA   length = 84
FEATURE                Location/Qualifiers
source                 1..84
                       mol_type = other DNA
                       note = DNA sequence encoding the mutation amino acid
                         sequence in a region at positions VP1 561-588
                       organism = synthetic construct
SEQUENCE: 151
gacgaggccg agatcgccgc caccaacccc gtggccaccg agcagtacgg ctgcgtggcc    60
agcaacatcc agaacagcaa cacc                                            84

SEQ ID NO: 152         moltype = DNA   length = 84
FEATURE                Location/Qualifiers
source                 1..84
                       mol_type = other DNA
                       note = DNA sequence encoding the mutation amino acid
                         sequence in a region at positions VP1 561-588
                       organism = synthetic construct
SEQUENCE: 152
gacgagagcg agatcgccgc caccaacccc gtggcctacg agcagtacgg cagcgtgacc    60
accaacctgc agaacggcaa caac                                            84

SEQ ID NO: 153         moltype = DNA   length = 84
FEATURE                Location/Qualifiers
source                 1..84
                       mol_type = other DNA
                       note = DNA sequence encoding the mutation amino acid
                         sequence in a region at positions VP1 561-588
                       organism = synthetic construct
SEQUENCE: 153
gacgagagcg agatcgccgc caccaacccc gtggccaccg agcagtacgg ctgcgtggcc    60
accaacctgc agagaggcta cgtg                                            84

SEQ ID NO: 154         moltype = DNA   length = 84
FEATURE                Location/Qualifiers
source                 1..84
                       mol_type = other DNA
                       note = DNA sequence encoding the mutation amino acid
                         sequence in a region at positions VP1 561-588
                       organism = synthetic construct
SEQUENCE: 154
gacgagcagg aggtggccgc caccaacccc gtggccaccg agcagtgggg cgaggtgagc    60
accaacctgc agagaggcaa cgag                                            84

SEQ ID NO: 155         moltype = DNA   length = 21
FEATURE                Location/Qualifiers
source                 1..21
                       mol_type = other DNA
                       note = DNA sequence of forward primer
                       organism = synthetic construct
```

-continued

```
SEQUENCE: 155
gagcggggtt ctcatctttg g                                     21

SEQ ID NO: 156         moltype = DNA  length = 20
FEATURE                Location/Qualifiers
source                 1..20
                       mol_type = other DNA
                       note = DNA sequence of reverse primer
                       organism = synthetic construct
SEQUENCE: 156
tgcctggaag aacgccttgt                                       20
```